US011148393B2

(12) United States Patent
Sugamata et al.

(10) Patent No.: US 11,148,393 B2
(45) Date of Patent: Oct. 19, 2021

(54) ELECTROSTATIC ADSORBABLE LAMINATED SHEET AND DISPLAY MATERIAL

(71) Applicant: YUPO CORPORATION, Tokyo (JP)

(72) Inventors: Yutaro Sugamata, Ibaraki (JP); Hiroshi Koike, Ibaraki (JP)

(73) Assignee: YUPO CORPORATION, Tokyo (JP)

(*) Notice: Subject to any disclaimer, the term of this patent is extended or adjusted under 35 U.S.C. 154(b) by 148 days.

(21) Appl. No.: 16/315,308

(22) PCT Filed: Jul. 7, 2017

(86) PCT No.: PCT/JP2017/025029
§ 371 (c)(1),
(2) Date: Jan. 4, 2019

(87) PCT Pub. No.: WO2018/008755
PCT Pub. Date: Jan. 11, 2018

(65) Prior Publication Data

US 2019/0344535 A1 Nov. 14, 2019

(30) Foreign Application Priority Data

Jul. 8, 2016 (JP) ............................ JP2016-136405

(51) Int. Cl.
*B32B 7/06* (2019.01)
*B32B 7/02* (2019.01)
(Continued)

(52) U.S. Cl.
CPC .................. *B32B 7/06* (2013.01); *B32B 7/02* (2013.01); *B32B 27/08* (2013.01); *B32B 27/32* (2013.01);
(Continued)

(58) Field of Classification Search
CPC .. B32B 7/06; B32B 7/02; B32B 27/32; B32B 2255/10; B32B 2255/26; B32B 2270/00;
(Continued)

(56) References Cited

U.S. PATENT DOCUMENTS 3,823,061 A * 7/1974 Frayer et al. ....... B29C 48/9165 428/516
3,967,022 A 6/1976 Hasei
(Continued)

FOREIGN PATENT DOCUMENTS

CN 104379346 A 2/2015
CN 105517798 A 4/2016
(Continued)

OTHER PUBLICATIONS

International Search Report in International Patent Application No. PCT/JP2017/025029, dated Aug. 1, 2017, along with an English translation thereof.
(Continued)

*Primary Examiner* — Jeffry H Aftergut
(74) *Attorney, Agent, or Firm* — Greenblum & Bernstein, P.L.C.

(57) ABSTRACT

It is intended to provide an electrostatic adsorbable laminated sheet which is less likely to cause paste residues, etc. upon peeling from an adherend, exhibits further enhanced adsorbability to an adherend, additionally exhibits enhanced adhesiveness at an electrostatic adsorbable interface, and thereby has enhanced handleability. Electrostatic adsorbable laminated sheet includes label layer, support layer, and grip layer disposed between the label layer and the support layer, wherein the label layer and the support layer are electrostatically adsorbed to each other via the grip layer.

12 Claims, 9 Drawing Sheets

(51) Int. Cl.

| | |
|---|---|
| ***B32B 27/08*** | (2006.01) |
| ***B32B 27/32*** | (2006.01) |
| ***G09F 3/04*** | (2006.01) |

(52) U.S. Cl.
CPC ............ *G09F 3/04* (2013.01); *B32B 2255/10* (2013.01); *B32B 2255/26* (2013.01); *B32B 2270/00* (2013.01); *B32B 2307/21* (2013.01); *B32B 2307/50* (2013.01); *B32B 2457/20* (2013.01); *B32B 2519/00* (2013.01)

(58) Field of Classification Search
CPC ............ B32B 2307/21; B32B 2307/50; B32B 2457/20; B32B 2519/00; B32B 27/08; G09F 2003/0255; G09F 3/04; C09J 2423/046; C09J 2423/106; C09J 2203/318; C09J 7/29
See application file for complete search history.

(56) References Cited

U.S. PATENT DOCUMENTS

| | | | | |
|---|---|---|---|---|
| 4,096,013 | A * | 6/1978 | Lutzmann | B32B 15/20 156/272.6 |
| 2007/0094904 | A1 | 5/2007 | Frank et al. | |
| 2011/0143104 | A1 | 6/2011 | Koike et al. | |
| 2013/0309461 | A1* | 11/2013 | Koike | B32B 7/02 428/195.1 |
| 2015/0210045 | A1* | 7/2015 | Koike | B32B 27/08 428/41.8 |
| 2016/0193814 | A1* | 7/2016 | Koike | B32B 27/06 428/215 |

FOREIGN PATENT DOCUMENTS

| | | | |
|---|---|---|---|
| EP | 0970806 | A1 | 1/2000 |
| JP | S50-141624 | A | 11/1975 |
| JP | 2005-280026 | | 10/2005 |
| JP | 2010-23502 | A | 2/2010 |
| JP | 2010-266474 | A | 11/2010 |
| JP | 2012-145935 | A | 8/2012 |
| JP | 2012-145936 | A | 8/2012 |
| JP | 2014-24326 | A | 2/2014 |
| JP | 2015-71297 | A | 4/2015 |
| WO | WO-2015/034019 | A1 * | 3/2015 |

OTHER PUBLICATIONS

International Preliminary Report on Patentability in International Patent Application No. PCT/JP2017/025029, dated Jan. 8, 2019, along with an English translation thereof.

Japanese Office Action (Decision of Refusal) in JP Application No. 2018-526458, dated Sep. 17, 2019; and English-language translation thereof.

JP Office Action for JP Application No. 2018-526458, dated May 17, 2019 and English-language translation.

EESR issued in EP patent application No. 17824358.0, dated Feb. 14, 2020.

CN Office Action issued in CN Patent Application No. 201780042631.1, dated Aug. 4, 2020, English translation.

Office Action issued in JP Patent Application No. 2019-227688, dated Feb. 2, 2021, English translation.

Office Action issued in JP Patent Application No. 2019-227688, dated Aug. 31, 2021, English translation.

* cited by examiner

ELECTROSTATIC ADSORBABLE LAMINATED SHEET AND DISPLAY MATERIAL

TECHNICAL FIELD

The present invention relates to an electrostatic adsorbable laminated sheet and a display material having a novel self-adhesive electrostatic adsorbable layer.

BACKGROUND ART

Heretofore, adhesives, adhesive tapes, double-stick tapes, and the like have been utilized for attaching sheets such as seals, labels, posters, or advertisements to adherends. In the case where these sheets are attached to adherends by use of adhesives, adhesive tapes, double-stick tapes, or the like, paste may remain on the adherends or coating on the adherend surface may come off, upon peeling of the sheets.

Accordingly, an electrostatic adsorbable sheet that enables adsorption to an adherend through electrostatic adsorbability exploiting static electricity has been proposed (see Patent Literatures 1 to 5). The electrostatic adsorbable sheet, as compared with the case of performing attachment through the use of adhesives, adhesive tapes, double-stick tapes, or the like, has the advantage that paste residues on the adherend or coming off of coating on the adherend surface is less likely to occur upon peeling from the adherend. Furthermore, the electrostatic adsorbable sheet is less likely to cause air bubbles between the sheet and an adherend upon attachment, and can be neatly attached because the attachment position is adjustable even after the sheet is once attached to an adherend.

For example, Patent Literatures 1 and 2 describe an electrostatic adsorbable sheet in which a label layer comprising a resin film layer having a recording layer on at least one surface, and a support layer are laminated with each other by electrostatic adsorption after electrostatically charge. For the electrostatic adsorbable sheet of Patent Literature 1 or 2, the resin film layer of the label layer peeled from the support layer can be attached to an adherend via electrostatic adsorbability.

Also, Patent Literature 3 describes an electrostatic adsorbable sheet in which an adsorbable sheet comprising a resin film layer provided on one surface with a pressure-sensitive adhesive layer is electrostatically adsorbed to a support layer. Furthermore, Patent Literature 4 describes an electrostatic adsorbable sheet obtained by laminating two electrostatic adsorbable laminates via an adhesive such that their respective thermoplastic resin films are in contact with each other, wherein in each of the electrostatic adsorbable laminates, a protective layer is laminated through electrostatic adsorption with one surface of a thermoplastic resin film that has undergone electrostatically charge. This electrostatic adsorbable sheet of Patent Literature 3 or 4 is attached on one surface with printed matter, while the support layer or the protective layer on the other surface is peeled and this surface after the peeling is attached to an adherend via electrostatic adsorbability, so that the resultant can be utilized as a mount film.

Moreover, Patent Literature 5 states that in a laminated film in which a recording layer, a resin film layer, a peelable layer, and a support layer are laminated in order, the resin film layer peeled from the peelable layer serves as an electrostatic adsorbable film capable of being electrostatically adsorbed to an adherend. Also, in Patent Literature 5, the peeling strength between the resin film layer and the peelable layer is predetermined strength or larger, whereby the resin film layer and the peelable layer are difficult to peel in the process of fabrication.

CITATION LIST

Patent Literature

Patent Literature 1: Japanese Patent Laid-Open No. 2012-145935

Patent Literature 2: Japanese Patent Laid-Open No. 2012-145936

Patent Literature 3: Japanese Patent Laid-Open No. 2014-024326

Patent Literature 4: Japanese Patent Laid-Open No. 2015-071297

Patent Literature 5: Japanese Patent Laid-Open No. 2010-023502

SUMMARY OF INVENTION

Technical Problem

The electrostatic adsorbable sheets of Patent Literatures 1 to 5 do not always have sufficient electrostatic adsorbability to an adherend. Thus, there has been a demand for improvement in adsorbability that permits more firm attachment.

Meanwhile, electrostatic adsorbable sheets may be subjected in advance to fabrication such as surface treatment, chopping, or cutting, or printing onto recording layers, after production of the electrostatic adsorbable sheets and before electrostatic adsorption. In this operation, for example, upon printing in a printing machine, stress is applied to the electrostatic adsorbable sheet by roll transfer, contact with a plate cylinder, or the like on the printing machine, so that displacement, deflection, or voids may occur at the electrostatic adsorbable interface between the label layer and the support layer. The occurrence of such displacement or deflection may reduce printing accuracy (location accuracy). Furthermore, charge injected by electrostatically charge is dissipated due to displacement or deflection, so that adsorbability may also be reduced. Moreover, also in the case of rolling up an electrostatic adsorbable sheet in order to perform transport or preservation, similar problems may arise because stress is applied to the electrostatic adsorbable sheet. From the viewpoint of such handleability, high adhesiveness is required for electrostatic adsorbable interfaces.

The present invention has been made in light of such a background art. An object of the present invention is to provide an electrostatic adsorbable laminated sheet which is less likely to cause paste residues, etc. upon peeling from an adherend, exhibits further enhanced adsorbability to an adherend, additionally exhibits enhanced adhesiveness at an electrostatic adsorbable interface, and thereby has enhanced handleability.

The present invention is not limited by the object described herein, and other objects of the present invention can be to exert working effects that are derived from each configuration shown in "Description of Embodiments" mentioned later, and cannot be obtained by conventional techniques.

Solution to Problem

The present inventors have conducted diligent studies to attain the object described above and consequently completed the present invention by finding that a novel grip layer (self-adhesive electrostatic adsorbable layer) is disposed at an electrostatic adsorbable interface between a label layer and a support layer, whereby the object described above can be attained.

Specifically, the present invention provides the following various specific aspects:

[1] An electrostatic adsorbable laminated sheet comprising a label layer, a support layer, and a grip layer disposed between the label layer and the support layer, wherein the label layer and the support layer are electrostatically adsorbed to each other via the grip layer.

[2] The electrostatic adsorbable laminated sheet according to [1], further comprising a second grip layer disposed between the grip layer and the support layer, wherein the grip layer and the second grip layer are electrostatically adsorbed to each other.

[3] The electrostatic adsorbable laminated sheet according to [1], further comprising a second support layer placed on a surface, opposite to the surface where the support layer is placed, of the label layer, and a grip layer disposed between the label layer and the second support layer, wherein the label layer and the second support layer are electrostatically adsorbed to each other via the grip layer disposed between the label layer and the second support layer.

[4] The electrostatic adsorbable laminated sheet according to [1] or [2], further comprising a pressure-sensitive adhesive layer at the outer side of the label layer.

[5] The electrostatic adsorbable laminated sheet according to [4], further comprising a protective layer as an outermost layer at the label layer side or the pressure-sensitive adhesive layer side.

[6] The electrostatic adsorbable laminated sheet according to any one of [1] to [5], wherein the label layer is a layer containing a thermoplastic resin.

[7] The grip layer satisfies the following conditions (1) and/or (2):

(1) the grip layer comprises a propylene resin, wherein when maximum values of absorbance in the ranges of 920±0.5 $cm^{-1}$, 974±0.5 $cm^{-1}$, and 998±0.5 $cm^{-1}$ measured on the grip layer surface by ATR infrared spectroscopy are defined as $A_{920}$, $A_{974}$, and $A_{998}$, respectively, a degree of isotactic crystallinity of the grip layer determined according to the following (Expression 1) is 20 to 75%:

$$\text{Degree of isotactic crystallinity (\%)}=109\times(A_{998}-A_{920})/(A_{974}-A_{920})-31.4 \quad \text{(Expression 1); and}$$

(2) the grip layer comprises an ethylene resin, wherein when maximum values of absorbance in the ranges of 731±1 $cm^{-1}$ and 720±1 $cm^{-1}$ measured on the grip layer surface by ATR infrared spectroscopy are defined as $A_{731}$ and $A_{720}$, respectively, a degree of polyethylene crystallinity of the grip layer determined according to the following (Expression 2) is 20 to 85%:

$$\text{Degree of polyethylene crystallinity (\%)}=100\times(A_{731}/A_{720}) \quad \text{(Expression 2),}$$

except that in the case where the grip layer satisfies the conditions (1) and (2), the condition (1) is applied when $A_{720}/A_{974}$ is less than 1.0, and the condition (2) is applied when $A_{720}/A_{974}$ is 1.0 or more.

[8] The electrostatic adsorbable laminated sheet according to any one of [1] to [7], wherein arithmetic mean roughness (Ra) of at least one surface of the grip layer measured according to JIS B0601: 2003 is 0.1 to 1.0 μm.

[9] The electrostatic adsorbable laminated sheet according to any one of [1] to [8], wherein surface resistivity of at least one surface of the grip layer measured according to JIS C2151: 2006 is $1\times10^{13}$ to $9\times10^{17}\Omega$.

[10] The electrostatic adsorbable laminated sheet according to any one of [1] to [9], wherein bending stiffness (Gurley method) of the label layer and the grip layer, or the label layer and the support layer measured according to bending repulsion method A of JIS L1096: 2010 is 0.05 to 10 mN.

[11] A display material comprising a label layer, and a grip layer in contact with the label layer, wherein the display material has electrostatic adsorbability.

Advantageous Effects of Invention

According to the present invention, an electrostatic adsorbable laminated sheet can be achieved which is less likely to cause paste residues, etc. upon peeling from an adherend, exhibits further enhanced adsorbability to an adherend, additionally exhibits enhanced adhesiveness at an electrostatic adsorbable interface between a label layer and a support layer, and thereby has enhanced handleability.

DESCRIPTION OF EMBODIMENTS

Figure 1:
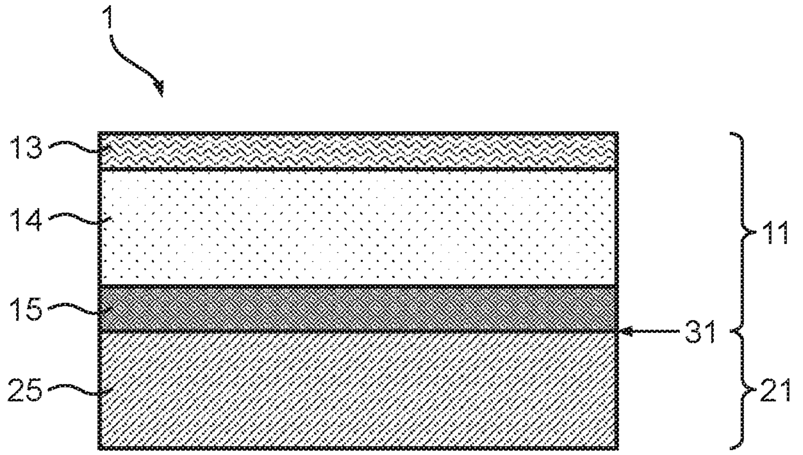
FIG. 1 is a cross-sectional view schematically showing one example of the layer configuration of an electrostatic adsorbable laminated sheet (i) of the first example.

Hereinafter, each embodiment of the present invention will be described with reference to the drawings. Each embodiment described below is given for merely illustrating the present invention, and the present invention is not limited by the embodiment. In the description below, the positional relationship indicated by the words "up", "down", "right", and "left" is based on the positional relationship shown in the drawings, unless otherwise specified. The dimensional ratios in the drawings are not limited to the illustrated ratios. In the present specification, the notation of the numeric range of, for example, "1 to 100" includes both the lower limit value "1" and the upper limit value "100". The same holds true for the notation of the other numeric ranges.

[1. Electrostatic Adsorbable Sheet]

<Layer Configuration>

Figure 14:
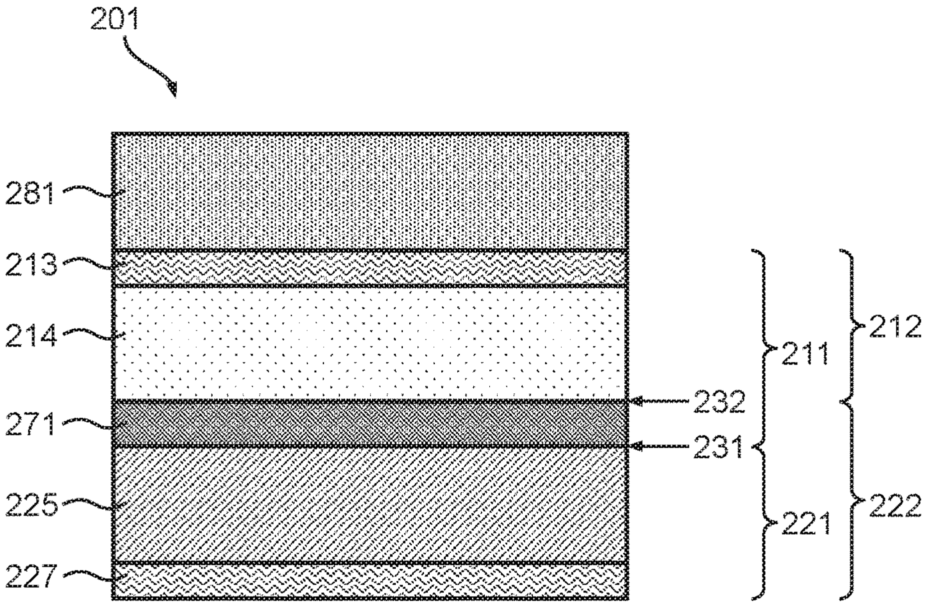
FIG. 14 is a cross-sectional view schematically showing one example of the layer configuration of an electrostatic adsorbable laminated sheet according to an embodiment.

The layer configuration of the electrostatic adsorbable laminated sheet according to the present embodiment will be described with reference to FIGS. 14 to 16. As shown in FIG. 14, electrostatic adsorbable sheet 201 has label layer 214, support layer 225, and grip layer 271 disposed between the label layer 214 and the support layer 225. Specifically, the electrostatic adsorbable sheet 201 has at least the label layer 214, the grip layer 271, and the support layer 225 in this order. Further, the label layer 214 and the support layer 225 are electrostatically adsorbed to each other via the grip layer 271. In this respect, usually, the grip layer 271 and at least one of the label layer 214 and the support layer 225 are electrostatically adsorbed to each other. Preferably, the grip layer 271 and the label layer 214, or the grip layer 271 and the support layer 225 are electrostatically adsorbed to each other.

It is preferred that the electrostatic adsorbable sheet 201 should have recording layer 213 placed on a surface, opposite to the surface where the grip layer 271 is placed, of the label layer 214. It is also preferred that the electrostatic adsorbable sheet 201 should have recording layer 227 placed on a surface, opposite to the surface where the grip layer 271 is placed, of the support layer 225. In other words, it is preferred that the electrostatic adsorbable sheet 201 should have the recording layer 213 on a surface at the outer side of the label layer 214 in a laminate having the label layer 214, the grip layer 271, and the support layer 225. It is also preferred that the electrostatic adsorbable sheet 201 should have the recording layer 227 on a surface at the outer side of the support layer 225.

It is preferred for the electrostatic adsorbable sheet 201 that label part 211 having at least the label layer 214 and the grip layer 271, and support part 221 having at least the support layer 225 should be electrostatically adsorbed to each other at electrostatic adsorbable interface 231 between the grip layer 271 and the support layer 225. Alternatively, it is preferred for the electrostatic adsorbable sheet 201 that label part 212 having at least the label layer 214, and support part 222 having at least the grip layer 271 and the support layer 225 should be electrostatically adsorbed to each other at electrostatic adsorbable interface 232 between the label layer 214 and the grip layer 271. As mentioned above, in the electrostatic adsorbable sheet 201, the label part 211 or 212 and the support layer 221 or 222 are electrostatically adsorbed to each other via the grip layer 271. The label part 211 or 212 may further have the recording layer 213. Also, the support part 221 or 212 may further have the recording layer 227.

In the electrostatic adsorbable sheet 201, for example, label part 211 integrally formed from the recording layer 213, the label layer 214, and the grip layer 271, and support part 221 integrally formed from the support layer 225 and the recording layer 227 may adhere closely to each other through electrostatic adsorbability and self-adhesiveness such that the grip layer 271 and the support layer 225 face each other. In this case, the label part 211 and the support part 221 are detached at the electrostatic adsorbable interface 231 to expose the grip layer 271 and the support layer 225. Further, their exposed surfaces are contacted with an adherend, whereby the label part 211 and the support part 221 can be attached as a display material to the adherend. Also, in the electrostatic adsorbable sheet 201, for example, label part 212 integrally formed from the recording layer 213 and the label layer 214, and support part 222 integrally formed from the grip layer 271, the support layer 225, and the recording layer 227 may adhere closely to each other through electrostatic adsorbability and self-adhesiveness such that the label layer 214 and the grip layer 271 face each other. In this case, the label part 212 and the support part 222 are detached at the electrostatic adsorbable interface 232 to expose the label layer 214 and the grip layer 271. Further, their exposed surfaces are contacted with an adherend, whereby the label part 212 and the support part 222 can be attached as a display material to the adherend.

In the present specification, the term "integrally formed" refers to the state where in a laminate having two or more layers, these layers adhere closely to each other in a manner other than electrostatic adsorbability or self-adhesiveness brought about by the grip layer. Such an integrally formed laminate can be obtained, for example, by laminating one layer with another layer through a dry lamination system, a wet lamination system, a melt lamination system, or the like using an adhesive. Alternatively, the integrally formed laminate can be obtained by coextrusion-molding a plurality of layers. Alternatively, the integrally formed laminate can be obtained by directly coating one layer with another layer and thereby establishing a coating layer.

It is preferred that the electrostatic adsorbable sheet 201 should further have protective layer 281 on a surface, opposite to the surface where the support part 221 or 222 is placed, of the label part 211 or 212. In other words, it is preferred that the electrostatic adsorbable sheet 201 should further have the protective layer 281 as an outermost layer at the label layer 214 side. Specifically, the electrostatic adsorbable sheet 201 may have the protective layer 281, the label layer 214, the grip layer 271, and the support layer 225 in this order. In the case where the label part 211 or 212 has recording layer 213, the protective layer 281 is disposed at the outer side of the recording layer 213. It is also preferred that the electrostatic adsorbable sheet 201 should further have a protective layer (not shown) on a surface, opposite to the surface where the label part 211 or 212 is placed, of the support part 221 or 222. In other words, it is preferred that the electrostatic adsorbable sheet 201 should further have the protective layer (not shown) as an outermost layer at the support layer 225 side. In the case where the support part 221 or 222 has recording layer 227, the protective layer is disposed at the outer side of the recording layer 227.

The electrostatic adsorbable sheet 201 may further have a second grip layer (not shown) disposed between the grip layer 271 and the support layer 225. In this case, in the electrostatic adsorbable sheet 201, a label part integrally formed from the recording layer 213, the label layer 214, and the grip layer 271, and a support part integrally formed from the second grip layer, the support layer 225, and the recording layer 227 may adhere closely to each other through electrostatic adsorbability and self-adhesiveness such that the grip layer 271 and the second grip layer face each other. In this respect, the label layer 214 and the support layer 225 are electrostatically adsorbed to each other via the grip layer 271 and the second grip layer. The label part and the support part are detached at an interface between the grip layer 271 and the second grip layer to expose the grip layer 271 and the second grip layer. Further, their exposed surfaces are contacted with an adherend, whereby the label part and the support part can be attached as a display material to the adherend.

Figure 15:
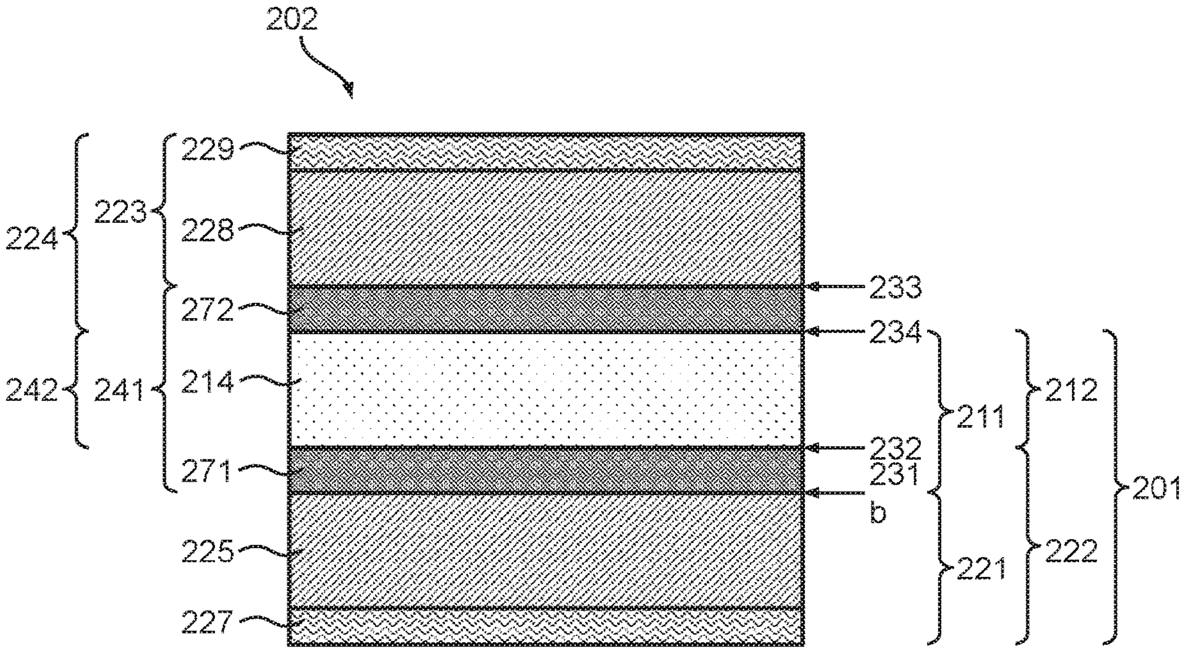
FIG. 15 is a cross-sectional view schematically showing an alternative example of the layer configuration of the electrostatic adsorbable laminated sheet according to an embodiment.

As shown in FIG. 15, it is preferred for electrostatic adsorbable sheet 202 that the electrostatic adsorbable sheet 201 having the label layer 214, the grip layer 271, and the support layer 225 in this order should further have second support layer 228 placed on a surface, opposite to the surface where the support layer 225 is placed, of the label layer 214, and grip layer 272 disposed between the label layer 214 and the second support layer 228. Specifically, it is preferred that the electrostatic adsorbable sheet 202 should have at least the support layer 228, the grip layer 272, the label layer 214, the grip layer 271, and the support layer 225 in this order. Further, the label layer 214 and the support layer 225 are electrostatically adsorbed to each other via the grip layer 271. Also, the label layer 214 and the support layer 228 are electrostatically adsorbed to each other via the grip layer 272. In this respect, usually, the grip layer 271 and at least one of the label layer 214 and the support layer 225 are electrostatically adsorbed to each other. Preferably, the grip layer 271 and the label layer 214, or the grip layer 271 and the support layer 225 are electrostatically adsorbed to each other. Alternatively, usually, the grip layer 272 and at least one of the label layer 214 and the support layer 228 are electrostatically adsorbed to each other. Preferably, the grip layer 272 and the label layer 214, or the grip layer 272 and the support layer 228 are electrostatically adsorbed to each other. More preferably, the grip layer 271 and the support layer 225 are electrostatically adsorbed to each other while the grip layer 272 and the support layer 228 are electrostatically adsorbed to each other. It is also preferred that the electrostatic adsorbable sheet 202 should have recording layer 227 on a surface at the outer side of the support layer 225. It is also preferred that the electrostatic adsorbable laminated sheet 202 should further have recording layer 229 on a surface at the outer side of the support layer 228.

It is preferred for the electrostatic adsorbable laminated sheet 202 that label part 211 and support part 221 should be electrostatically adsorbed to each other at electrostatic adsorbable interface 231 between the grip layer 271 and the support layer 225, as in the electrostatic adsorbable laminated sheet 201. Alternatively, it is preferred for the electrostatic adsorbable sheet 202 that label part 212 and support part 222 should be electrostatically adsorbed to each other at electrostatic adsorbable interface 232 between the label layer 214 and the grip layer 271. Furthermore, it is preferred for the electrostatic adsorbable laminated sheet 202 that label part 241 having at least the grip layer 272, the label layer 214, and the grip layer 271, and the support part 221 should be electrostatically adsorbed to each other at the electrostatic adsorbable interface 231 between the grip layer 271 and the support layer 225. Alternatively, it is preferred that the label part 241 and support part 223 having at least the support layer 228 should be electrostatically adsorbed to each other at electrostatic adsorbable interface 233 between the grip layer 272 and the support layer 228. Furthermore, it is preferred for the electrostatic adsorbable laminated sheet 202 that label part 242 having at least the label layer 214, and the support part 222 should be electrostatically adsorbed to each other at the electrostatic adsorbable interface 232 between the label layer 214 and the grip layer 271. It is also preferred that the label part 242 and support part 224 having at least the support layer 228 and the grip layer 272 should be electrostatically adsorbed to each other at electrostatic adsorbable interface 234 between the label layer 214 and the grip layer 272. The support part 223 or 214 may further have recording layer 229. Also, the label part 241 or 242 may further have a recording layer (not shown) on at least one surface of the label layer 214.

In the electrostatic adsorbable sheet 202, for example, support part 223 integrally formed from the recording layer 229 and the support layer 228, label part 241 integrally formed from the grip layer 272, the label layer 214, and the grip layer 271, and support part 221 integrally formed from the support layer 225 and the recording layer 227 may adhere closely to each other through electrostatic adsorbability and self-adhesiveness such that the support layer 228 and the grip layer 272 face each other while the grip layer 271 and the support layer 225 face each other. In this case, the label part 241 and the support part 221 are detached at the electrostatic adsorbable interface 231 while the label part 241 and the support part 223 are detached at the electrostatic adsorbable interface 233 to expose the grip layer 271 and the support layer 225 and to expose the support layer 228 and the grip layer 272. Further, their exposed surfaces are contacted with an adherend, whereby the label part 241 and the support parts 221 and 223 can be attached as a display material to the adherend. A printing sheet layer (not shown) is further bonded to any one of the grip layer 271 and the grip layer 272 in the label part 241, whereby a laminate having the label part 241 and the printing sheet layer can be attached as a display material to the adherend via the other grip layer 271 or 272.

In the electrostatic adsorbable sheet 202, for example, support part 224 integrally formed from the recording layer 229, the support layer 228, and the grip layer 272, label part 242 having the label layer 214, and support part 222 integrally formed from the grip layer 271, the support layer 225, and the recording layer 227 may adhere closely to each other through electrostatic adsorbability and self-adhesiveness such that the grip layer 272 and the label layer 214 face each other while the label layer 214 and the grip layer 271 face each other. In this case, the label part 242 and the support part 222 are detached at the electrostatic adsorbable interface 232 while the label part 242 and the support part 224 are detached at the electrostatic adsorbable interface 234 to expose the label layer 214 and the grip layer 271 and to expose the grip layer 272 and the label layer 214. Further, their exposed surfaces are contacted with an adherend, whereby the label part 242 and the support parts 222 and 224 can be attached as a display material to the adherend. A printing sheet layer (not shown) is further bonded to one surface of the label part 242, whereby a laminate having the label part 242 and the printing sheet layer can be attached as a display material to the adherend via the other surface of the label part 242.

It is preferred that the electrostatic adsorbable sheet 202 should further have a protective layer (not shown) on a surface, opposite to the surface where the label part 241 or 242 is placed, of the support part 221 or 222. In other words, it is preferred that the electrostatic adsorbable sheet 202 should further have the protective layer (not shown) as an outermost layer at the support layer 225 side. In the case where the support part 221 or 222 has recording layer 227, the protective layer is disposed at the outer side of the recording layer 227. It is also preferred that the electrostatic adsorbable sheet 202 should further have a protective layer (not shown) on a surface, opposite to the surface where the label part 241 or 242 is placed, of the support part 223 or 224. In other words, it is preferred that the electrostatic adsorbable sheet 202 should further have the protective layer (not shown) as an outermost layer at the support layer 228 side. In the case where the support part 223 or 224 has recording layer 229, the protective layer is disposed at the outer side of the recording layer 229.

Figure 16:
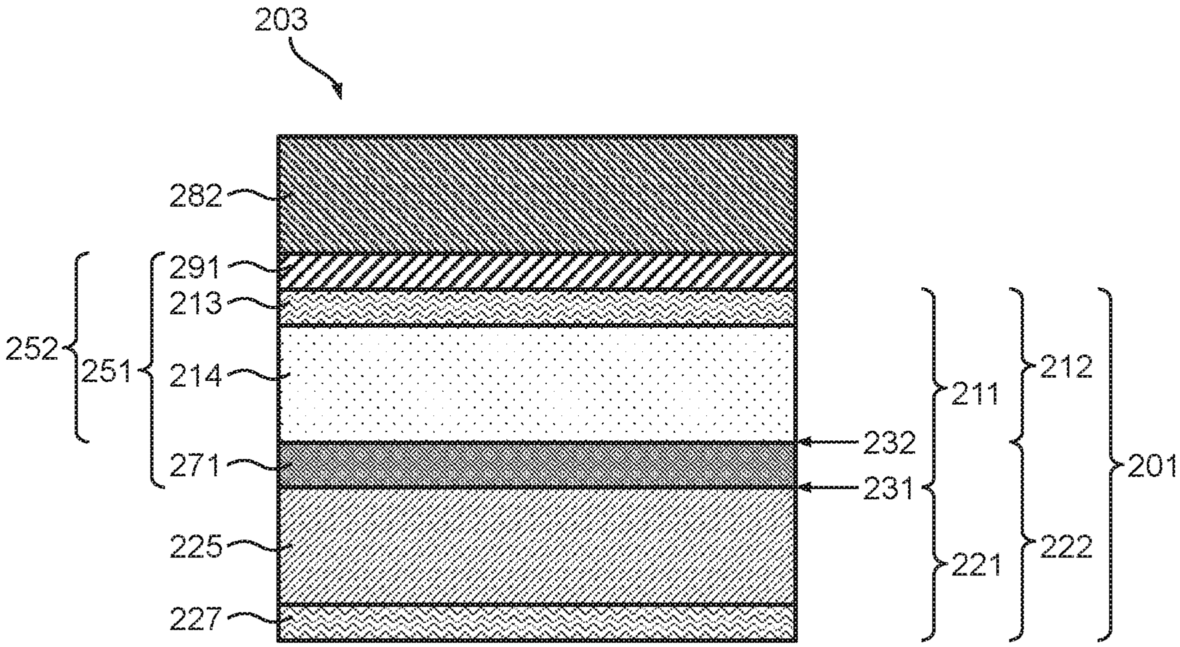
FIG. 16 is a cross-sectional view schematically showing a further alternative example of the layer configuration of the electrostatic adsorbable laminated sheet according to an embodiment.

As shown in FIG. 16, it is preferred for electrostatic adsorbable sheet 203 that the electrostatic adsorbable sheet 201 having the label layer 214, the grip layer 271, and the support layer 225 in this order should further have pressure-sensitive adhesive layer 291 placed on a surface, opposite to the surface where the support layer 225 is placed, of the label layer 214. In other words, it is preferred that the electrostatic adsorbable sheet 203 should further have the pressure-sensitive adhesive layer 291 at the outer side of the label layer 214. Specifically, it is preferred that the electrostatic adsorbable sheet 203 should have at least the pressure-sensitive adhesive layer 291, the label layer 214, the grip layer 271, and the support layer 225 in this order. Further, the label layer 214 and the support layer 225 are electrostatically adsorbed to each other via the grip layer 271. In this respect, usually, the grip layer 271 and the label layer 214, or the grip layer 271 and the support layer 225 are electrostatically adsorbed to each other. Preferably, the grip layer 271 and the label layer 214, or the grip layer 271 and the support layer 225 are electrostatically adsorbed to each other. In the case of having recording layer 213 on a surface at the outer side of the label layer 214, the pressure-sensitive adhesive layer 291 is disposed at the outer side of the recording layer 213.

It is preferred for the electrostatic adsorbable laminated sheet 203 that label part 251 having at least the pressure-sensitive adhesive layer 291, the label layer 214, and the grip layer 271, and support part 221 should be electrostatically adsorbed to each other at electrostatic adsorbable interface 231 between the grip layer 271 and the support layer 225. Alternatively, it is preferred for the electrostatic adsorbable sheet 203 that label part 252 having at least the pressure-sensitive adhesive layer 291 and the label layer 214, and support part 222 should be electrostatically adsorbed to each other at electrostatic adsorbable interface 232 between the label layer 214 and the grip layer 271. The label part 251 or 252 may further have recording layer 213.

In the electrostatic adsorbable sheet 203, for example, label part 251 integrally formed from the pressure-sensitive adhesive layer 291, the recording layer 213, the label layer 214, and the grip layer 271, and support part 221 integrally formed from the support layer 225 and the recording layer 227 may adhere closely to each other through electrostatic adsorbability and self-adhesiveness such that the grip layer 271 and the support layer 225 face each other. In this case, the label part 251 and the support part 221 are detached at the electrostatic adsorbable interface 231 to expose the grip layer 271 and the support layer 225. Further, their exposed surfaces are contacted with an adherend, whereby the label part 251 and the support part 221 can be attached as a display material to the adherend. In the electrostatic adsorbable sheet 203, for example, label part 252 integrally formed from the pressure-sensitive adhesive layer 291, the recording layer 213, and the label layer 214, and support part 222 integrally formed from the grip layer 271, the support layer 225, and the recording layer 227 may adhere closely to each other through electrostatic adsorbability and self-adhesiveness such that the label layer 214 and the grip layer 271 face each other. In this case, the label part 252 and the support part 222 are detached at the electrostatic adsorbable interface 232 to expose the label layer 214 and the grip layer 271. Further, their exposed surfaces are contacted with an adherend, whereby the label part 252 and the support part 222 can be attached as a display material to the adherend. A printing sheet layer (not shown) is further bonded to a surface at the pressure-sensitive adhesive layer 291 side of the label part 251 or 252, whereby a laminate having the label part 251 or 252 and the printing sheet layer can be attached as a display material to the adherend via the other surface of the label part 251 or 252.

It is preferred that the electrostatic adsorbable sheet 203 should further have protective layer 282 on a surface, opposite to the surface where the label layer 214 and the support layer 225 are placed, of the pressure-sensitive adhesive layer 291. In other words, it is preferred that the electrostatic adsorbable sheet 203 should further have the protective layer 282 as an outermost layer at the pressure-sensitive adhesive layer 291 side. Specifically, the electrostatic adsorbable sheet 203 may have the protective layer 282, the pressure-sensitive adhesive layer 291, the label layer 214, the grip layer 271, and the support layer 225 in this order. It is also preferred that the electrostatic adsorbable sheet 203 should further have a protective layer (not shown) on a surface, opposite to the surface where the label layer 214 is placed, of the support layer 225. In other words, it is preferred that the electrostatic adsorbable sheet 203 should further have the protective layer (not shown) as an outermost layer at the support layer 225 side. In the case where the support part 221 or 222 has recording layer 227, the protective layer is disposed at the outer side of the recording layer 227.

As mentioned above, in the electrostatic adsorbable laminated sheets 201 to 203, some layers are peeled, whereby these some layers or remnant layers can be used as a display material that can be attached to an adherend. Specifically, it is preferred that the display material of the present embodiment should have label layer 214 having electrostatic adsorbability, and further have grip layer 271 or grip layer 272 having self-adhesiveness, in contact with the label layer 214. Alternatively, it is preferred that the display material of the present embodiment should have support layer 225 or 228 having electrostatic adsorbability, and further have grip layer 271 or grip layer 272 having self-adhesiveness, in contact with the support layer 225 or 228. In this context, the electrostatic adsorbability refers to the property of being adsorbed to an adherend through electrostatic adsorption force exploiting static electricity. The self-adhesiveness refers to the property of being attachable to an adherend through adhering force exhibited by a resin film layer containing a thermoplastic resin, without the use of an additional pressure-sensitive adhesive.

Hereinafter, each layer will be described in more detail.

<Grip Layer>

The grip layer adheres closely to the label layer or the support layer through electrostatic adsorbability brought about by electrostatic charge retained at the electrostatic adsorbable interface, and self-adhesiveness (tackiness), and is adsorbed to an adherend through the electrostatic adsorbability and the self-adhesiveness in use. Specifically, the grip layer is a self-adhesive electrostatic adsorbable layer. Also, the grip layer is a layer that imparts slip resistance to the label layer and the support layer in the state of the electrostatic adsorbable laminated sheet. The gripping properties of the grip layer for the label layer and the support and for an adherend can be represented by adhesiveness and adsorbability mentioned later. It is preferred for the grip layer to satisfy adhesiveness mentioned later, and it is more preferred to satisfy both adhesiveness and an amount of adsorption mentioned later. It is preferred that the grip layer should be integrally formed with any one of the label layer and the support layer and should adhere closely to the other layer through electrostatic adsorbability and self-adhesiveness. Alternatively, two grip layers may face each other, so that the grip layers adhere closely to each other through electrostatic adsorbability and self-adhesiveness. The grip layer is preferably a resin film layer containing an olefin resin and among others, it is more preferred to contain a propylene resin or an ethylene resin.

(Adhesiveness)

The adhesiveness of the grip layer is preferably 50 g/cm$^2$ or more, more preferably 60 g/cm$^2$ or more, further preferably 70 g/cm$^2$ or more, particularly preferably 100 g/cm$^2$ or more. The upper limit of the adhesiveness is not particularly limited and is usually 2000 g/cm$^2$ or less. When the adhesiveness of the grip layer is equal to or more than the lower limit described above, there is a tendency that: the adhesiveness between the label part and the support part improves; lifting or coming off ascribable to displacement or deflection is prevented between the label part and the support part; and the handleability of the electrostatic adsorbable laminated sheet improves. In the present specification, the adhesiveness of the grip layer refers to a value evaluated by a method for measuring the adhesiveness of the label part as described in Examples.

(Adsorbability)

The adsorbability of the grip layer is preferably 10 kg/m$^2$ or more, more preferably 15 kg/m$^2$ or more, further preferably 20 kg/m$^2$ or more, particularly preferably 30 kg/m$^2$ or more. The upper limit of the amount of adsorption is not particularly limited and is usually 500 kg/m$^2$ or less. When the adsorbability of the grip layer is equal to or more than the lower limit described above, the shear resistance in the surface direction between the display material and an adherend increases to enable more firm attachment to the adherend. In the present specification, a specific method for measuring the adsorbability of the grip layer will be described in Examples. In the present specification, the adsorbability of the grip layer refers to a value evaluated by a method for measuring the adsorbability of the label part as described in Examples.

(Resin Component)

Examples of the propylene resin for use in the grip layer include: propylene homopolymers; and copolymers of a propylene component, an ethylene component and/or an α-olefin component having 4 to 20 carbon atoms (including propylene thermoplastic elastomers, and propylene thermoplastic elastomers which are so-called reactor-made copolymers (R-TPO)). In this context, examples of the α-olefin having 4 to 20 carbon atoms include, but are not particularly limited to, butene-1, pentene-1, 2-methylbutene-1, 3-methylbutene-1, hexene-1, 3-methylpentene-1, 4-methyl-1-pentene, 3,3-dimethylbutene-1, heptene-1, methylhexene-1, dimethylpentene-1, trimethylbutene-1, ethylpentene-1, octene-1, methylpentene-1, dimethylhexene-1, trimethylpentene-1, ethylhexene-1, methylethylpentene-1, diethylbutene-1, propylpentene-1, decene-1, methylnonene-1, dimethyloctene-1, trimethylheptene-1, ethyloctene-1, methylethylheptene-1, diethylhexene-1, dodecene-1, tetradecene-1, hexadecene-1, octadecene-1, and eicosane-1. The copolymer may be a binary copolymer or a ternary or higher multi-component copolymer of monomer components, and may be a random copolymer or a block copolymer. These propylene resins can each be used alone or can be used in combination of two or more thereof.

The grip layer may contain a resin component other than the propylene resin described above (hereinafter, also referred to as an “additional resin component”). The additional resin component is preferably a thermoplastic resin. Examples thereof include: polyolefin resins such as polyethylene resins (high-density polyethylene, medium-density polyethylene, low-density polyethylene, etc.), polymethyl-1-pentene, and ethylene-cyclic olefin copolymers; functional group-containing polyolefin resins such as ethylene-vinyl acetate copolymers, ethylene-acrylic acid copolymers, ethylene-methacrylic acid copolymers, metal salts (ionomers) of ethylene-methacrylic acid copolymers, ethylene-acrylic acid alkyl ester copolymers, ethylene-methacrylic acid alkyl ester copolymers, maleic acid-modified polyethylene, and maleic acid-modified polypropylene; polyamide resins such as nylon-6, nylon-6,6, nylon-6,10, and nylon-6,12; thermoplastic polyester resins such as aromatic polyester (polyethylene terephthalate and its copolymers, polyethylene naphthalate, polybutylene terephthalate, etc.) and aliphatic polyester (polybutylene succinate, polylactic acid, etc.); polycarbonate resins such as aromatic polycarbonate and aliphatic polycarbonate; styrene resins such as atactic polystyrene, syndiotactic polystyrene, acrylonitrile-styrene (AS) copolymers, styrene-butadiene copolymers (ABS), acrylonitrile-butadiene-styrene (ABS) copolymers, and hydrogenated polymers thereof; polyvinyl chloride resins; and polyphenylene sulfide. These additional resin components can each be used alone or can be used in combination of two or more thereof.

In this context, it is preferred for the grip layer that the degree of crystallinity of the grip layer surface determined by ATR (Attenuated Total Reflection) infrared spectroscopy should be 20 to 75%. For the degree of crystallinity of the grip layer within the range described above, it is preferred that the grip layer should comprise a propylene resin having an endothermic peak at 120 to 180° C. and a resin having no endothermic peak at 0 to 200° C. in differential scanning calorimetry. The mode of use of each of these components may be a blend of the components, may be a copolymer comprising the components, or may be an arbitrary combination thereof. From such a viewpoint, it is preferred that the grip layer should comprise a propylene component and an ethylene component and/or an α-olefin component having 4 to 20 carbon atoms, or a styrene component.

In the case of a propylene resin, the endothermic peak at 120 to 180° C. in differential scanning calorimetry is a peak derived from the melting of a crystalline moiety in the polymer. Thus, the contained propylene resin having an endothermic peak at 120 to 180° C. in differential scanning calorimetry has an effect of enhancing the degree of crystallinity of the grip layer. The resin having no endothermic peak at 0 to 200° C. has an effect of decreasing the degree of crystallinity of the grip layer and exerts an effect of improving self-adhesiveness brought about by the grip layer, improving a coefficient of static friction on glass, or improving adhesiveness to an adherend. In the present specification, the endothermic peak temperature of a resin means an endothermic peak top temperature measured in accordance with JIS K7121: 1987.

A homopolymer of propylene, or a copolymer of propylene as a main component copolymerized with ethylene and/or α-olefin having 4 to 20 carbon atoms (including the propylene thermoplastic elastomers described above; hereinafter, these are also collectively referred to as a "specific copolymer") can be preferably used as the propylene resin having an endothermic peak at 120 to 180° C. In this context, the main component means a component contained at 95% by mol or more and less than 100% by mol in the specific copolymer. The specific copolymer comprises a propylene component as a main component, whereby an endothermic peak of 120° C. or higher appears. Examples of the specific copolymer include, but are not particularly limited to, a binary copolymer comprising propylene and ethylene, a binary copolymer comprising propylene and α-olefin, and a ternary copolymer comprising propylene, ethylene, and α-olefin.

Specific examples of the specific copolymer can include, but are not particularly limited to, propylene/ethylene copolymers, propylene/ethylene/1-butene copolymers, propylene/ethylene/1-pentene copolymers, propylene/ethylene/1-hexene copolymers, propylene/ethylene/4-methyl-1-pentene copolymers, propylene/ethylene/1-heptene copolymers, propylene/ethylene/1-octene copolymers, propylene/ethylene/1-nonene copolymers, and propylene/ethylene/1-decene copolymers. These polymers can each be used alone or can be used as a mixture of two or more thereof. For these copolymers, it is preferred to use a propylene-ethylene random copolymer or the like comprising the propylene unit at a content in the range of preferably 90% by mass, more preferably 95% by mass, further preferably 98% by mass, in terms of the lower limit thereof, and preferably 99.9% by mass, more preferably 99.5% by mass, further preferably 99.0% by mass, in terms of the upper limit thereof based on the mass of the copolymer. More specifically, it is preferred to use a propylene-ethylene random copolymer or the like comprising the propylene unit at a content in the range of preferably 90 to 99.9% by mass, more preferably 95 to 99.5% by mass, further preferably 98 to 99.0% by mass. The content of the propylene unit is equal to or more than the lower limit in the range described above, whereby the flexibility of the electrostatic adsorbable laminated sheet is prevented from becoming excessive, and blocking can be suppressed.

On the other hand, a copolymer of propylene and ethylene and/or α-olefin that does not contain a propylene resin as a main component, a copolymer of ethylene and α-olefin, or hydrogenated styrene butadiene can be preferably used as the resin having no endothermic peak at 0 to 200° C. In the case of a copolymer of propylene and ethylene and/or α-olefin, the propylene component occupies less than 70% by mol in the copolymer, whereby self-adhesiveness can be improved. Examples of the hydrogenated styrene resin include, but are not particularly limited to, hydrogenated styrene-butadiene copolymers (HSBR), styrene-ethylene/butylene-ethylene copolymers (SEBC), and styrene-ethylene/butylene-styrene copolymers (SEBS). Among them, a hydrogenated styrene-butadiene copolymer (HSBR) is preferred. The styrene content of the hydrogenated styrene resin is preferably 0.1 to 30% by mass, more preferably 1 to 20% by mass. The styrene content of the hydrogenated styrene resin falls within the range described above, whereby there is a tendency that: the grip layer is excellent in flexibility; and self-adhesiveness improves.

A commercially available product can be used as the propylene resin comprising a propylene resin having an endothermic peak at 120 to 180° C. and a resin having no endothermic peak at 0 to 200° C. Specific examples thereof can include TAFMER PN-2060 manufactured by Mitsui Chemicals, Inc. and ZELAS MC717R4 manufactured by Mitsui Chemicals, Inc. ZELAS MC717R4 is a propylene elastomer produced by a continuous polymerization method of performing polymerization for crystalline polypropylene at the first stage and polymerizing ethylene at the second stage, and it is predicted that only the endothermic peak of polypropylene obtained by the polymerization at the first stage is observed without having the endothermic peak of the ethylene component polymerized at the second stage. A commercially available product can be used as the hydrogenated styrene resin described above. Specific examples thereof can include DYNARON 1320P manufactured by JSR Corp.

[a] A copolymer of a propylene resin and ethylene and/or α-olefin that is a mixture with a ternary copolymer that does not contain a propylene resin as a main component, [b] a mixture of a propylene resin with polyethylene, or [c] a mixture of a propylene resin with a hydrogenated styrene resin can be preferably used as a mixture of the propylene resin having an endothermic peak at 120 to 180° C. and the resin having no endothermic peak at 0 to 200° C. The compositional ratios of these mixtures comprising a propylene resin are preferably 50 to 90% by mass of the ternary copolymer with respect to 10 to 50% by mass of the propylene resin, more preferably 60 to 80% by mass of the ternary copolymer with respect to 20 to 40% by mass of the propylene resin, in the case of [a] described above. The compositional ratio in the case of [b] described above is preferably 10 to 50% by mass of the polyethylene with respect to 50 to 90% by mass of the propylene resin, more preferably 20 to 40% by mass of the polyethylene with respect to 60 to 80% by mass of the propylene resin. The compositional ratio in the case of [c] described above is preferably 50 to 80% by mass of the hydrogenated styrene resin with respect to 20 to 50% by mass of the propylene resin, more preferably 60 to 70% by mass of the hydrogenated styrene resin with respect to 30 to 40% by mass of the propylene resin. The compositional ratio of the mixture comprising a propylene resin falls within the range described above, whereby the coefficient of static friction and adsorbability to an adherend, of the grip layer improve, and blocking can be suppressed.

The method for producing a resin composition of the propylene resin constituting the grip layer is not particularly limited, and any production method may be used as long as the characteristics described above are satisfied. Examples thereof can include production by continuous polymerization for polypropylene and a copolymer by multi-stage polymerization. Specific examples thereof can include a method which involves using a plurality of polymerization vessels, performing polymerization for polypropylene at the first stage, and subsequently polymerizing ethylene or α-olefin in the presence of the polypropylene at the second stage. Alternatively, polypropylene and an ethylene-α-olefin copolymer individually obtained by polymerization may be mixed by melt kneading or the like to produce the resin composition. Specific examples thereof can include a method of melt-kneading polypropylene with an ethylene-α-olefin copolymer obtained by polymerization using a Ziegler-Natta catalyst such as a titanium-supported catalyst.

Alternatively, as the resin component for use in the grip layer, an ethylene resin may be used as a main component, or an ethylene resin may be used alone. In this context, the main component means a component contained at 50% by mass or more in the grip layer with respect to the total amount of the grip layer. Examples of the ethylene resin include, but are not particularly limited to, high-density polyethylene, medium-density polyethylene, low-density polyethylene, linear low-density polyethylene, and ultralow-density polyethylene. Among them, low-density polyethylene is preferred. These ethylene resins can each be used alone or can be used in combination of two or more thereof. The melting point of the ethylene resin for use in the grip layer is preferably 60° C., more preferably 70° C., further preferably 80° C., in terms of the lower limit thereof, and is preferably 120° C., more preferably 115° C., further preferably 110° C., in terms of the upper limit thereof. When the melting point of the ethylene resin falls within the range described above, there is a tendency that the grip layer easily exerts self-adhesiveness.

(Degree of Isotactic Crystallinity)

For the grip layer, the degree of isotactic crystallinity of the grip layer surface determined by ATR infrared spectroscopy is preferably 20%, more preferably 35%, further preferably 40%, in terms of the lower limit thereof, and is preferably 75%, more preferably 65%, further preferably 62%, particularly preferably 60%, in terms of the upper limit thereof. More specifically, the degree of isotactic crystallinity is preferably 20 to 75%, more preferably 20 to 65%, further preferably 35 to 62%, particularly preferably 40 to 60%. The value of the degree of isotactic crystallinity is equal to or more than the lower limit in the range described above, whereby molding processability improves in the production of the electrostatic adsorbable laminated sheet, and blocking can be suppressed when the electrostatic adsorbable laminated sheet is taken up or when a plurality of such sheets are arranged. Also, the value of the degree of isotactic crystallinity is equal to or less than the upper limit in the range described above, whereby: self-adhesiveness brought about by the grip layer improves; the coefficient of static friction on glass improves; and sufficient adsorbability to an adherend can be exerted. In this context, the degree of isotactic crystallinity of the grip layer surface means the ratio of an isotactic crystalline resin to the grip layer surface constituted by an isotactic polypropylene resin. A specific method for measuring the degree of isotactic crystallinity will be described in Examples.

For the degree of isotactic crystallinity of the grip layer within the range described above, the isotactic crystallinity of the grip layer may be reduced by mixing homopropylene exhibiting isotactic crystallinity with an amorphous resin, or the isotactic crystallinity may be reduced by including an additional monomer copolymerizable with propylene as a copolymer component.

In the case of reducing the isotactic crystallinity by including an additional monomer copolymerizable with propylene as a copolymer component, it is preferred to comprise 5% by mass or more of the propylene component in the grip layer, and it is more preferred to comprise 10% by mass thereof. On the other hand, the propylene component is contained at preferably 60% by mass or less, more preferably 50% by mass or less, in the grip layer. More specifically, the propylene component is contained at preferably 5 to 60% by mass, more preferably 10 to 50% by mass, in the grip layer.

In the case of reducing the isotactic crystallinity by mixing homopropylene with an amorphous resin, a mixture of a propylene resin with a ternary copolymer of propylene-ethylene-α-olefin having 4 to 20 carbon atoms, a mixture of a propylene resin with polyethylene, or a mixture of a propylene resin with a hydrogenated styrene resin can be preferably used. In this case, the compositional ratio therebetween is 50 to 90% by mass of the ternary copolymer with respect to 50 to 10% by mass of the propylene resin, preferably 60 to 80% by mass of the ternary copolymer with respect to 40 to 20% by mass of the propylene resin, is 50 to 10% by mass of the polyethylene with respect to 50 to 90% by mass of the propylene resin, preferably 60 to 80% by mass of the polyethylene with respect to 40 to 20% by mass of the propylene resin, and is 50 to 80% by mass of the hydrogenated styrene resin with respect to 20 to 50% by mass of the propylene resin, preferably 60 to 70% by mass of the hydrogenated styrene resin with respect to 40 to 30% by mass of the propylene resin. The compositional ratio falls within the range described above, whereby the coefficient of static friction improves, and adhesiveness to an adherend improves. In addition, this is preferred from the viewpoint of the prevention of blocking.

(Degree of Polyethylene Crystallinity)

In the case where the grip layer comprises an ethylene resin, it is preferred for the grip layer having sufficient adhesion strength that the degree of polyethylene crystallinity of the grip layer determined by ATR infrared spectroscopy should fall within a specific range. Specifically, a higher value of the degree of polyethylene crystallinity is preferred in view of the suppression of take-up blocking, and a lower value thereof is preferred in view of adhesiveness. Specifically, the degree of polyethylene crystallinity is preferably 20%, more preferably 30%, further preferably 40%, in terms of the lower limit thereof, and is preferably 85%, more preferably 75%, further preferably 70%, in terms of the upper limit thereof. More specifically, the degree of polyethylene crystallinity is preferably 20 to 85%, more preferably 30 to 75%, further preferably 40 to 70%.

It is preferred that the grip layer should satisfy the following condition (1), in view of adhesiveness and the prevention of blocking:

(1) the grip layer comprises a propylene resin, and the degree of isotactic crystallinity obtained by the measurement of the grip layer surface by ATR infrared spectroscopy is 20 to 75%.

It is also preferred that the grip layer should satisfy the following condition (2), in view of adhesiveness and the prevention of blocking:

(2) the grip layer comprises an ethylene resin, and the degree of polyethylene crystallinity obtained by the measurement of the grip layer surface by ATR infrared spectroscopy is 20 to 85%.

Maximum values of absorbance in the ranges of 720±1 $cm^{-1}$ and 974±0.5 $cm^{-1}$ measured on the grip layer surface by ATR infrared spectroscopy are defined as $A_{720}$ and $A_{974}$, respectively. In the case where the grip layer satisfies the conditions (1) and (2), it is preferred that the condition (1) should be applied and the grip layer should satisfy the condition (1), when $A_{720}/A_{974}$ is less than 1.0. In the case where the grip layer satisfies the conditions (1) and (2), it is preferred that the condition (2) should be applied and the grip layer should satisfy the condition (2), when $A_{720}/A_{974}$ is 1.0 or more.

(Arithmetic Mean Roughness (Ra))

For the grip layer, the arithmetic mean roughness (Ra) measured in accordance with JIS-B-0601: 1994 is preferably 0.1 μm, more preferably 0.2 μm, further preferably 0.3 μm, in terms of the lower limit thereof, and is preferably 1.0 μm, more preferably 0.7 μm, further preferably 0.6 μm, in terms of the upper limit thereof, from the viewpoint of adhesiveness. More specifically, the arithmetic mean roughness (Ra) is preferably 0.1 to 1.0 μm, more preferably 0.2 to 0.7 μm, further preferably 0.3 to 0.6 μm. The arithmetic mean roughness of the grip layer is equal to or more than the lower limit in the range described above, whereby the self-adhesiveness of the grip layer is prevented from increasing excessively, and contamination after peeling can be suppressed. Also, the arithmetic mean roughness of the grip layer is equal to or less than the upper limit in the range described above, whereby a self-adhesive layer surface in contact with an adherend produces higher smoothness and adheres closely to the adherend, thereby sufficiently exerting electrostatic adsorbability and self-adhesiveness. For setting the surface roughness of the grip layer to the desired value, it is preferred to select a material itself that has surface roughness in the range described above, or to undulate the surface in the range described above by emboss processing or surface texturing.

(Surface Resistivity)

For possessing the electrostatic adsorption ability, it is preferred that the grip layer should have a structure that easily undergoes electrostatically charge and easily retains, internally, charge brought about by the electrostatically charge. Easy electrostatically charge and charge retention performance can be indicated by surface resistivity. In the present specification, the surface resistivity in the case where the surface resistivity is $1\times10^{7}\Omega$ or more means a value measured in accordance with JIS K 6911 using electrodes based on a concentric ring method under conditions involving a temperature of 23° C. and a relative humidity of 50%. The surface resistivity in the case where the surface resistivity is less than $1\times10^{7}\Omega$ means a value measured in accordance with JIS K 7194 using a 4-point probe under conditions involving a temperature of 23° C. and a relative humidity of 50%.

For the grip layer, the surface resistivity is preferably $1\times10^{13}\Omega$, more preferably $5\times10^{13}\Omega$, further preferably $1\times10^{14}\Omega$, in terms of the lower limit thereof, and is preferably $9\times10^{17}\Omega$, more preferably $9\times10^{16}\Omega$, further preferably $9\times10^{15}\Omega$, in terms of the upper limit thereof. More specifically, the surface resistivity is preferably $1\times10^{13}$ to $9\times10^{17}\Omega$, more preferably $5\times10^{13}$ to $9\times10^{16}\Omega$, further preferably $1\times10^{14}$ to $9\times10^{15}\Omega$. The surface resistivity of the grip layer is equal to or more than the lower limit value in the range described above, whereby: charge given upon electrostatically charge is prevented from escaping along the surface; the efficiency of charge injection to the label part or the support part elevates; and electrostatic adsorption performance improves by the effect of electrostatically charge. Also, there is a tendency that charge once applied to the label part or the support part is less likely to escape to the outside (into the atmosphere, etc.) along the surface of the grip layer, and the grip layer can retain charge for a long period and thereby easily maintains its electrostatic adsorbability. The surface resistivity of the grip layer has no problem in terms of performance even if exceeding the upper limit value in the range described above. The surface resistivity equal to or less than the upper limit value in the range described above is preferred in view of production cost. The grip layer having such surface resistivity can be achieved by the selection of a resin constituting it, the presence or absence of surface treatment on the grip layer, etc.

(Coefficient of Friction)

In a surface of the grip layer in the label part or the support part, i.e., the grip layer carried by the label part or the support part, the coefficient of static friction of a surface at a side in contact with the support layer or the label layer facing the grip layer, on a glass plate is preferably 0.5, more preferably 0.6, further preferably 0.7, in terms of the lower limit thereof, and is preferably 1.7, more preferably 1.3, further preferably 1.1, in terms of the upper limit thereof. More specifically, the coefficient of static friction on a glass plate is preferably 0.5 to 1.7, more preferably 0.6 to 1.3, further preferably 0.7 to 1.1. The coefficient of dynamic friction of the surface of the grip layer in the label part or the support part on a glass plate is preferably 0.4, more preferably 0.5, further preferably 0.6, in terms of the lower limit thereof, and is preferably 1.1, more preferably 1.0, further preferably 0.9, in terms of the upper limit thereof. More specifically, the coefficient of dynamic friction on a glass plate is 0.4 to 1.1, more preferably 0.5 to 1.0, further preferably 0.6 to 0.9. The coefficient of friction is also influenced by the arithmetic mean roughness of the grip layer. There is a tendency that as this arithmetic mean roughness gets larger, the coefficient of friction decreases and adsorbability to a glass plate decreases. There is a tendency that favorable adsorbability to a glass plate is exhibited as long as the coefficient of static friction and the coefficient of dynamic friction fall within the ranges described above. In the present specification, the coefficient of static friction and the coefficient of dynamic friction mean values measured in accordance with JIS K7125: 1999.

For the arithmetic mean roughness (Ra), the surface resistivity, and the coefficient of friction (hereinafter, these are also collectively referred to as "surface parameters of the grip layer") of the grip layer described above, it is preferred that at least one principal surface of the grip layer should satisfy any of the surface parameters of the grip layer described above. Among others, it is preferred that a surface that is exposed at the outer side in the label part or the support part and is located at a side in contact with an adherend should satisfy any of the surface parameters of the grip layer described above. More specifically, it is preferred that in a label part having the label layer and the grip layer, which is obtained by the peeling of the support part from the electrostatic adsorbable laminated sheet, a surface, opposite to the surface where the label layer is disposed, of the grip layer should satisfy the surface parameters of the grip layer described above. In this case, it is preferred that in the state of the electrostatic adsorbable laminated sheet, a surface that adheres closely to the support part through electrostatic adsorbability and self-adhesiveness should satisfy any of the surface parameters of the grip layer described above. It is also preferred that in a support part having the grip layer and the support layer, which is obtained by the peeling of the label layer from the electrostatic adsorbable laminated sheet, a surface, at a side in no contact with the support layer, of the grip layer should satisfy any of the surface parameters of the grip layer described above. In this case, it is preferred that in the state of the electrostatic adsorbable laminated sheet, a surface that adheres closely to the label part through electrostatic adsorbability and self-adhesiveness should satisfy any of the surface parameters of the grip layer described above.

(Thickness)

The thickness of the grip layer is preferably 0.5 μm, more preferably 1 μm, further preferably 2 μm, in terms of the lower limit thereof, and is preferably 20 μm, more preferably 12 μm, further preferably 10 μm, in terms of the upper limit thereof. More specifically, the thickness of the grip layer is preferably 0.5 to 20 μm, more preferably 1 to 12 μm, further preferably 2 to 10 μm. The thickness of the grip layer exceeds the lower limit value in the range described above, whereby there is a tendency that adsorbability to an adherend improves. Also, the thickness of the grip layer falls below the upper limit value in the range described above, whereby the curl of the electrostatic adsorbable laminated sheet can be suppressed.

It is preferred that the grip layer should be thinner than a resin film layer constituting the label layer mentioned later. The ratio of the thickness of the grip layer to the thickness of the resin film layer is preferably 0.01, more preferably 0.02, further preferably 0.03, in terms of the lower limit thereof, and is preferably 0.49, more preferably 0.3, further preferably 0.2, in terms of the upper limit thereof. More specifically, the ratio of the thickness of the grip layer to the thickness of the resin film layer is preferably 0.01 to 0.49, more preferably 0.02 to 0.3, further preferably 0.03 to 0.2. The thickness ratio falls within this range, whereby the curl of the electrostatic adsorbable laminated sheet can be suppressed.

(Formation of Grip Layer)

The method for forming the grip layer is not particularly limited. The grip layer can be formed by various known molding methods, for example, cast molding, calendar molding, roll molding, or inflation molding, which involve extruding a melted polyolefin resin into a sheet shape using a single-layer or multilayer T-die or I-die connected to a screw-type extruder. Further, the obtained grip layer may be drawn and may be subjected to discharge surface treatment. Also, the grip layer can be formed by forming a film-shaped grip layer in advance according to the molding method mentioned above and laminating this grip layer with a resin film layer constituting the label layer or the support layer. The lamination can be performed by an approach, such as a dry lamination system, a wet lamination system, or a melt lamination system, using various adhesives. Alternatively, the grip layer may be formed by an extrusion lamination molding which involves forming in advance a film of at least one of the grip layer and the resin film layer, and extruding a heat-melted thermoplastic resin composition constituting the other layer to laminate the extrudate with the film. Also, the grip layer may be formed by coextrusion molding which involves laminating and extruding melted resins of the grip layer and the resin film layer in one die into a sheet shape. Alternatively, the grip layer can be formed by directly disposing a coating layer comprising the components described above on the resin film layer by coating.

<Label Part>

The label part is a layer or a laminate that can be used as a display material by peeling the support part from the electrostatic adsorbable laminated sheet. Features of the label part are that: the label part is attachable to various adherends for display; electrostatic adsorbability is high in display use; the electrostatic adsorbability is also sufficiently sustained; the label part can be used for display over a long period; the electrostatic adsorbability is less susceptible to humidity; and the label part can be easily peeled after use. It is preferred that the label part should have flexibility. The flexibility of the label part can be represented by bending stiffness mentioned later.

It is preferred that the label part should be a recordable layer. The recordable layer refers to a layer that can form information by printing or writing. Examples of the information to be formed in the label part include optically detectable information, electrically detectable information, and magnetically detectable information. Among them, optically detectable information is preferred, and visually recognizable information is more preferred. Examples of the visually recognizable information include letters, symbols, graphics, sketches, patterns, images, colors, and combinations thereof.

The label part has at least a label layer. It is preferred that the label layer should comprise a resin film layer containing a thermoplastic resin mentioned later. It is also preferred that the label layer should be a recordable layer. It is preferred that the label part should further have a recording layer which is a recordable layer mentioned later. It is also preferred that the label part should further have a grip layer mentioned later. It is preferred that the label layer carried by the label part should be a recordable layer, whereby the label part serves as a recordable layer. Alternatively, the label part may have a recording layer and thereby serve as a recordable layer. In the case where the label part has a recording layer, the label layer may be a recordable layer or may not be a recordable layer because the label part serves as a recordable layer owing to the recording layer. The label layer may comprise a layer other than the resin film layer, such as paper, synthetic paper, a woven fabric, or a nonwoven fabric. Further, this layer other than the resin film layer may be a recordable layer.

It is preferred that the label part should be integrally formed with the grip layer or the recording layer. Therefore, it is preferred that at least the label layer should satisfy the bending stiffness, the thickness, and the internal charge quantity of the label part described below, it is more preferred that a laminate having the label layer and the grip layer should satisfy these factors, and it is further preferred that a laminate having the label part, the grip layer, and the recording layer should satisfy these factors.

(Bending Stiffness)

The label part is also suitable for use in notices such as posters, and for this purpose, it is preferred to have rigidity to some extent, from the viewpoint of easy handling at the time of attachment. The bending stiffness of the label part is preferably 0.05 mN, more preferably 0.1 mN, further preferably 0.3 mN, in terms of the lower limit thereof, and is 10 mN, more preferably 7 mN, further preferably 4 mN, in terms of the upper limit thereof. More specifically, the bending stiffness of the label part is preferably 0.05 to 10 mN, more preferably 0.1 to 7 mN, further preferably 0.3 to 4 mN. When the bending stiffness is 0.05 mN or more, the label part is moderately rigid in itself, is easily handled, permits the fine operation of attachment to an adherend, and is less likely to be wrinkled when attached. On the other hand, when the bending stiffness is 10 mN or less, the label part is less likely to come off from an adherend and can be neatly attached even if small curl occurs before attachment. In the present specification, the bending stiffness is based on bending repulsion method A (Gurley method) according to JIS L1096: 2010. It is preferred for the bending stiffness that the bending stiffness in at least one of the MD direction and the TD direction of the resin film should satisfy the range described above, and it is more preferred that both the MD direction and the TD direction should satisfy the range described above.

(Thickness)

The thickness of the label part is preferably 20 μm, more preferably 25 μm, further preferably 30 μm, particularly preferably 40 μm, in terms of the lower limit thereof, and is preferably 500 m, more preferably 400 μm, further preferably 200 μm, particularly preferably 150 μm, in terms of the upper limit thereof. More specifically, the thickness of the label part is preferably 20 to 500 μm, more preferably 25 to 400 μm, further preferably 30 to 200 μm, particularly preferably 40 to 150 μm. The thickness of the label part is equal to or more than the lower limit value in the range described above, whereby the label part is less likely to be wrinkled when attached to an adherend, can be beautifully attached, and is excellent in appearance. Also, the thickness of the label part is equal to or less than the upper limit value in the range described above, whereby the self weight of the label part is reduced, and drop from an adherend can be prevented by supporting the self weight through electrostatic adsorbability.

(Internal Charge Quantity)

The internal charge quantity of the label part is preferably 100 $\mu C/m^2$, more preferably 200 $\mu C/m^2$, further preferably 300 $\mu C/m^2$, in terms of the lower limit thereof, and is preferably 800 $\mu C/m^2$, more preferably 700 $\mu C/m^2$, further preferably 600 $\mu C/m^2$, in terms of the upper limit thereof. More specifically, the internal charge quantity of the label part is preferably 100 to 800 $\mu C/m^2$, more preferably 200 to 700 $\mu C/m^2$, further preferably 300 to 600 $\mu C/m^2$. The internal charge quantity of the label part falls within the range described above, whereby there is a tendency that electrostatic adsorbability improves owing to charge stored in the label part, and favorable adsorbability and adhesiveness are obtained. In the present specification, a specific method for measuring the internal charge quantity will be described in Examples. In the case where the support part has the grip layer and the support part is attached as a display material, it is preferred that the internal charge quantity of the support should satisfy the range described above.

<Resin Film Layer>

(Thermoplastic Resin)

The resin film layer is usually a layer containing a thermoplastic resin. It is preferred that the resin film layer should be a thermoplastic resin film. It is preferred to use a thermoplastic resin excellent in insulating properties, because internally accumulated charge is easily retained. Examples of the thermoplastic resin for use in the resin film layer include, but are not particularly limited to: polyolefin resins such as high-density polyethylene, medium-density polyethylene, low-density polyethylene, propylene resins, and polymethyl-1-pentene; functional group-containing polyolefin resins such as ethylene/vinyl acetate copolymers, ethylene/acrylic acid copolymers, maleic acid-modified polyethylene, and maleic acid-modified polypropylene; polyamide resins such as nylon-6 and nylon-6,6; thermoplastic polyester resins such as polyethylene terephthalate and its copolymers, polybutylene terephthalate, and aliphatic polyester; and polycarbonate, atactic polystyrene, and syndiotactic polystyrene. Among these thermoplastic resins, it is preferred to use a polyolefin resin or a functional group-containing polyolefin resin excellent in insulating properties and workability.

More specific examples of the polyolefin resin include homopolymers of olefins having 2 to 20 carbon atoms such as ethylene, propylene, butylene, pentene, hexene, butadiene, isoprene, chloroprene, and methyl-1-pentene, and copolymers consisting of two or more types of these olefins.

More specific examples of the functional group-containing polyolefin resin include copolymers of the olefins described above and functional group-containing monomers copolymerizable therewith. Examples of such a functional group-containing monomer include, but are not particularly limited to: styrenes such as styrene and α-methylstyrene; carboxylic acid vinyl esters such as vinyl acetate, vinyl alcohol, vinyl propionate, vinyl butyrate, vinyl pivalate, vinyl caproate, vinyl laurate, vinyl stearate, vinyl benzoate, vinyl butylbenzoate, and vinyl cyclohexanecarboxylate; acrylic acid, methacrylic acid, and (meth)acrylic acid esters such as methyl (meth)acrylate, ethyl (meth)acrylate, butyl (meth)acrylate, hexyl (meth)acrylate, octyl (meth)acrylate, 2-ethylhexyl (meth)acrylate, stearyl (meth)acrylate, benzyl (meth)acrylate, cyclohexyl (meth)acrylate, isobornyl (meth) acrylate, dicyclopentanyl (meth)acrylate, (meth)acrylamide, and N-metalol (meth)acrylamide; and vinyl ethers such as methyl vinyl ether, ethyl vinyl ether, propyl vinyl ether, butyl vinyl ether, cyclopentyl vinyl ether, cyclohexyl vinyl ether, benzyl vinyl ether, and phenyl vinyl ether. One type of these functional group-containing monomers, or a copolymer of two or more types thereof appropriately selected can be used according to the need.

The polyolefin resin and the functional group-containing polyolefin resin may be used in graft-modified forms, if necessary.

A known approach can be used in the graft modification. Specific examples thereof include graft modification with unsaturated carboxylic acid or its derivative. Examples of this unsaturated carboxylic acid can include acrylic acid, methacrylic acid, maleic acid, fumaric acid, and itaconic acid. Acid anhydride, ester, amide, imide, a metal salt, or the like may be used as the derivative of the unsaturated carboxylic acid. Specific examples of the unsaturated carboxylic acid include maleic anhydride, itaconic anhydride, citraconic anhydride, methyl (meth)acrylate, ethyl (meth) acrylate, butyl (meth)acrylate, glycidyl (meth)acrylate, maleic acid monoethyl ester, maleic acid diethyl ester, fumaric acid monomethyl ester, fumaric acid dimethyl ester, itaconic acid monomethyl ester, itaconic acid diethyl ester, (meth)acrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monoethylamide, fumaric acid-N,N-diethylamide, fumaric acid-N-monobutylamide, fumaric acid-N,N-dibutylamide, maleimide, N-butylmaleimide, N-phenylmaleimide, sodium (meth)acrylate, and potassium (meth)acrylate. A polyolefin resin or a functional group-containing polyolefin resin graft-modified with usually 0.005 to 10% by mass, preferably 0.01 to 5% by mass, of a graft monomer can be used as the graft-modified form.

As the thermoplastic resin for use in the resin film layer, one member may be selected from among the thermoplastic resins described above and used alone, or two or more members may be selected therefrom and used in combination.

Among these polyolefin resins, a propylene resin is preferred in view of insulating properties, workability, chemical resistance, cost, etc. It is desirable for the propylene resin to use, as a main component, a propylene homopolymer which is isotactic or syndiotactic polypropylene that exhibits stereoregularity to various extents, or a copolymer of propylene as a main component copolymerized with α-olefin such as ethylene, 1-butene, 1-hexene, 1-heptene, or 4-methyl-1-pentene. This copolymer may be a binary copolymer or a ternary or higher copolymer, and may be a random copolymer or a block copolymer. It is preferred for use that the propylene resin should be supplemented with 2 to 25% by mass of a resin having a lower melting point than that of a propylene homopolymer. Examples of such a resin having a lower melting point can include high-density to low-density polyethylene.

The amount of the thermoplastic resin added in the resin film layer is preferably 50% by mass, more preferably 60% by mass, in terms of the lower limit thereof, and is preferably 100% by mass in terms of the upper limit thereof, with respect to the total amount of the resin film layer. More specifically, the amount of the thermoplastic resin added is preferably 50 to 100% by mass, more preferably 60 to 100% by mass. The amount of the thermoplastic resin added is equal to or more than the lower limit in the range described above, whereby there is a tendency that the resin film layer is easily formed, and charge is easily retained in the thermoplastic resin in the resulting resin film layer.

(Inorganic Powder and Organic Filler)

The resin film layer may comprise at least one of an inorganic fine powder and an organic filler. The addition of the inorganic fine powder or the organic filler and a drawing step mentioned later form pores in the inside of the resin film layer, enable weight reduction of the label layer, and facilitate internally retaining charge. Furthermore, the inorganic fine powder or the organic filler is contained therein, whereby the permittivity of the resin film layer can be adjusted.

Examples of the inorganic fine powder include calcium carbonate, baked clay, silica, diatomaceous earth, white clay, talc, titanium oxide, barium sulfate, barium titanate, alumina, zeolite, mica, sericite, bentonite, sepiolite, vermiculite, dolomite, wollastonite, and glass fiber. Among them, calcium carbonate, talc, and titanium oxide are preferred, and calcium carbonate and titanium oxide are more preferred, from the viewpoint of whitening, opacification, and resinous formability.

In the case of adding the inorganic fine powder, the average particle size of the inorganic fine powder can be appropriately set according to the desired performance and is not particularly limited. The average particle size is preferably 0.01 μm, more preferably 0.1 μm, in terms of the lower limit thereof, and is preferably 10 μm, more preferably 5 μm, in terms of the upper limit thereof. More specifically, the average particle size of the inorganic fine powder is preferably 0.01 to 10 μm, more preferably 0.1 to 5 μm. The average particle size of the inorganic fine powder falls within the range described above, whereby flow characteristics at the time of film formation processing become favorable while the breakage of a film can be suppressed. In the present specification, the average particle size means a volume-based median size ($D_{50}$) measured by laser diffractometry using a particle size distribution measurement apparatus.

The content of the inorganic fine powder in the resin film layer can be appropriately set according to the desired performance and is not particularly limited. The content is preferably 0.01% by mass, more preferably 0.1% by mass, further preferably 1% by mass, in terms of the lower limit thereof, and is preferably 50% by mass, more preferably 30% by mass, further preferably 20% by mass, in terms of the upper limit thereof, with respect to the total amount of the resin film layer from the viewpoint of the stability of drawing at the time of the production of the resin film layer. More specifically, the content of the inorganic fine powder is preferably 0.01 to 50% by mass, more preferably 0.1 to 30% by mass, further preferably 1 to 20% by mass.

In the case of adding the organic filler, it is preferred to select a resin of type different from that of the thermoplastic resin serving as a main component in the resin film layer. Among others, it is more preferred to select a resin that exhibits a higher melting point or glass transition point than that of the thermoplastic resin serving as a main component in the resin film layer. In the case where the thermoplastic resin serving as a main component in the resin film layer is, for example, a polyolefin resin (melting point: 80 to 170° C.), the melting point of the organic filler is preferably 180 to 300° C., and the glass transition point of the organic filler is preferably 180 to 280° C. Examples of the organic filler that exhibits such a melting point or a glass transition point include polyethylene terephthalate, polybutylene terephthalate, polycarbonate, nylon-6, and nylon-6,6. It is more preferred to select a resin incompatible with the thermoplastic resin serving as a main component in the resin film layer.

The content of the organic filler in the resin film layer can be appropriately set according to the desired performance and is not particularly limited. The content is preferably 0.01% by mass, more preferably 0.1% by mass, in terms of the lower limit thereof, and is preferably 20% by mass, more preferably 10% by mass, in terms of the upper limit thereof, with respect to the total amount of the resin film layer from the viewpoint of exerting the functions of the organic filler and improving appearance after printing. More specifically, the content of the organic filler is preferably 0.01 to 20% by mass, more preferably 0.1 to 10% by mass.

A heat stabilizer (antioxidant), a light stabilizer, a dispersant, a lubricant, or the like can be added, if necessary, to the resin film layer. In the case of adding the heat stabilizer, the heat stabilizer is usually added within the range of 0.001 to 1% by mass with respect to the total amount of the resin film layer. For example, a stabilizer such as a sterically hindered phenol-type antioxidant, a phosphorus-type antioxidant, an amine-type antioxidant, or a sulfur-type antioxidant can be used as the heat stabilizer. In the case of using the light stabilizer, the light stabilizer is usually used within the range of 0.001 to 1% by mass with respect to the total amount of the resin film layer. For example, a sterically hindered amine-type light stabilizer, a benzotriazole-type light stabilizer, or a benzophenone-type light stabilizer can be used as the light stabilizer. The dispersant or the lubricant is used for the purpose of dispersing, for example, the inorganic fine powder. In the case of adding the dispersant or the lubricant, the dispersant or the lubricant is usually used within the range of 0.01 to 4% by mass with respect to the total amount of the resin film layer. For example, a silane coupling agent, higher fatty acid such as oleic acid or stearic acid, metallic soap, polyacrylic acid, polymethacrylic acid, or a salt thereof can be used as the dispersant.

(Thickness)

The thickness of the resin film layer can be appropriately set according to the desired performance and is not particularly limited. The thickness is preferably 10 μm, more preferably 30 μm, further preferably 50 μm, in terms of the lower limit thereof, and is preferably 500 μm, more preferably 400 μm, further preferably 300 pun, in terms of the upper limit thereof. More specifically, the thickness of the resin film layer is preferably 10 to 500 μm, more preferably 30 to 400 μm, further preferably 50 to 300 μm. The thickness of the resin film layer is equal to or more than the lower limit value in the range described above, whereby sufficient mechanical strength is obtained while the label part is less likely to be wrinkled when attached to an adherend, can be beautifully attached, and is excellent in appearance. Also, the thickness of the resin film layer is equal to or less than the upper limit value in the range described above, whereby curl is suppressed, and winding can be facilitated. In addition, the self weight of the label part is reduced, and drop from an adherend can be prevented by supporting the self weight through electrostatic adsorbability and self-adhesiveness.

(Formation of Resin Film Layer)

The method for forming the resin film layer is not particularly limited. The resin film layer can be formed by various known molding methods, for example, cast molding, calendar molding, roll molding, or inflation molding, which involve extruding a melted polyolefin resin into a sheet shape using a single-layer or multilayer T-die or I-die connected to a screw-type extruder. Further, the obtained resin film layer may be drawn and may be subjected to discharge surface treatment.

(Multilayer Formation)

The resin film layer may have a single-layer structure or may have a two-layer structure or a three-layer or more multilayer structure. The number of a draw axis of this multilayer structure may be uniaxial/uniaxial, uniaxial/biaxial, biaxial/uniaxial, uniaxial/uniaxial/biaxial, uniaxial/biaxial/uniaxial, biaxial/uniaxial/uniaxial, uniaxial/biaxial/biaxial, biaxial/biaxial/uniaxial, or biaxial/biaxial/biaxial. The multilayer formation of the resin film layer enables addition of various functions such as improvement in voltage resistance performance and improvement in fabrication suitability.

In the case of forming the multilayer structure of the resin film layer, various known methods can be used. Specific examples thereof include dry lamination systems, wet lamination systems, and melt lamination systems using various adhesives, multilayer die systems (coextrusion systems) using feed blocks and multi-manifolds, extrusion lamination systems using a plurality of dies, and coating methods using various coaters. Also, a multilayer die and extrusion lamination may be used in combination.

(Drawing)

It is preferred that the resin film layer should comprise a drawn resin film layer obtained by drawing at least in the uniaxial direction. The drawing of the resin film layer can be performed by any of various methods usually used.

The drawing temperature can be in the range of temperatures that are equal to or higher than the glass transition temperature of the thermoplastic resin mainly used in the resin film layer and are equal to and lower than the melting point of a crystalline moiety, and can be in a known temperature range suitable for the thermoplastic resin. Specifically, in the case where the thermoplastic resin of the resin film layer is a propylene homopolymer (melting point: 155 to 167° C.), the drawing temperature is 100 to 166° C. In the case of high-density polyethylene (melting point: 121 to 136° C.), the drawing temperature is 70 to 135° C. Thus, the drawing temperature is a temperature lower by 1 to 70° C. than the melting point. It is preferred that the drawing rate should be set to 20 to 350 m/min.

Examples of the drawing method can include machine-direction drawing exploiting difference in peripheral speed among rolls, transverse drawing using a tenter oven, sequential biaxial drawing combining machine-direction drawing with transverse drawing, simultaneous biaxial drawing using rolling, a tenter oven, and a linear motor in combination, and simultaneous biaxial drawing using a tenter oven and a pantograph in combination. Examples of the method for drawing an inflation film can include simultaneous biaxial drawing by a tubular method.

The draw ratio is not particularly limited and is appropriately determined in consideration of the characteristics of the thermoplastic resin for use in the resin film layer, etc. In the case of using, for example, a propylene homopolymer or its copolymer as the thermoplastic resin and drawing this in one direction, the draw ratio is usually approximately 1.2 or more, preferably 2 or more, and is usually 12 or less, preferably 10 or less. More specifically, the draw ratio for drawing in one direction is usually approximately 1.2 to 12, preferably 2 to 10. In the case of biaxial drawing, the draw ratio in terms of area ratio is usually 1.5 or more, preferably 4 or more, and is usually 60 or less, preferably 50 or less. More specifically, the draw ratio for biaxial drawing is usually 1.5 to 60, preferably 4 to 50. In the case of using any of other thermoplastic resins and drawing this in one direction, the draw ratio is usually 1.2 or more, preferably 2 or more, and is usually 10 or less, preferably 5 or less. More specifically, the draw ratio is usually 1.2 to 10, preferably 2 to 5. In the case of biaxial drawing using any of other thermoplastic resins, the draw ratio in terms of area ratio is usually 1.5 or more, preferably 4 or more, and is usually 20 or less, preferably 12 or less. More specifically, the draw ratio is 1.5 to 20, preferably 4 to 12.

The resin film layer thus obtained has a large number of fine pores in the inside of the film, and the porosity calculated according to the expression (1) given below is preferably 5%, more preferably 10%, in terms of the lower limit thereof, and is preferably 60%, more preferably 45%, in terms of the upper limit thereof. More specifically, the porosity is preferably 5 to 60%, more preferably 10 to 45%. As compared with a resin film where pores are absent, the presence of pores increases the number of interfaces within the resin film and facilitates internally retaining charge. In this way, performance that can internally accumulate charge improves. Hence, adsorption performance is less reduced even in a highly humid environment.

[Expression 1]

$$\text{Porosity (\%)} = \frac{\rho_o - \rho}{\rho_o} \times 100 \quad (1)$$

($\rho_0$ represents the true density of the resin film layer ($A$), and $\rho$ represents the density of the resin film layer ($A$).)

(Surface Resistivity)

The surface resistivity of the resin film layer is preferably $1\times10^{13}\Omega$, more preferably $5\times10^{13}\Omega$, further preferably $1\times10^{14}$, in terms of the lower limit thereof, and is preferably $9\times10^{17}\Omega$, more preferably $9\times10^{16}\Omega$, further preferably $9\times10^{15}\Omega$, in terms of the upper limit thereof. More specifically, the surface resistivity is in the range of preferably $1\times10^{13}$ to $9\times10^{17}\Omega$, more preferably $5\times10^{3}$ to $9\times10^{16}\Omega$, further preferably $1\times10^{14}$ to $9\times10^{15}\Omega$. The surface resistivity is equal to or more than the lower limit value in the range described above, whereby: charge is prevented from escaping along the surface upon electrostatically charge; the efficiency of charge injection to the label part or the support part elevates; and electrostatic adsorption performance improves by the effect of electrostatically charge. Also, there is a tendency that the charge of the label part or the support part is less likely to escape to the outside along the resin film layer when the label part and the support part are in contact with each other via the grip layer, and the label part or the support part can retain charge for a long period and thereby easily maintains the electrostatic adsorbability of the electrostatic adsorbable laminated sheet. The surface resistivity has no problem in terms of performance even if exceeding the upper limit value in the range described above. The surface resistivity equal to or less than the upper limit value in the range described above is preferred in view of production cost. The surface resistivity of the resin film layer in the desired range can be achieved by using a polyolefin resin excellent in insulating properties as the thermoplastic resin, or adjusting the type or amount of the inorganic fine powder added thereto.

It is preferred for the surface resistivity of the resin film layer that at least one principal surface of the resin film layer should satisfy the range described above. Among others, it is preferred that in the resin film layer contained in the label layer, a surface at the support layer side of the resin film layer in the state where the label part and the support part adhere closely to each other should satisfy the surface resistivity described above. Specifically, it is preferred that a surface at the support layer side of the label layer should satisfy the surface resistivity described above. It is also preferred that in the resin film layer contained in the support layer, a surface at the label layer side of the resin film layer in the state where the label part and the support part adhere closely to each other should satisfy the surface resistivity described above. Specifically, it is preferred that a surface at the label layer side of the support layer should satisfy the surface resistivity described above.

<Recording Layer>

The recording layer is a layer that has an antistatic function and improves handleability by imparting antistatic performance to the label part and thereby preventing troubles in a printing step. Also, the recording layer is a recordable layer. Among others, it is preferred that the recording layer should be a printable layer that improves adhesiveness to printing ink and improves the recordability of the label part. As a result, the electrostatic adsorbable laminated sheet can respond to diverse printing systems. It is preferred that the recording layer should be disposed at the outer side of the label layer or the support layer, from the viewpoint of sufficiently exerting the effect of the recording layer. It is also preferred that the recording layer should be disposed as an outer layer at the label part side or the support part side of the electrostatic adsorbable laminated sheet, and it is more preferred that the recording layer should be disposed as an outermost layer. The electrostatic adsorbable laminated sheet has the recording layer on the label layer or the support layer, whereby the electrostatic adsorbable sheet is recordable even in the case where the label layer or the support layer is not recordable. It is preferred that the recording layer should be formed by molding a solution containing an antistatic polymer, a polymer binder, and the like into a thin film shape by a molding method mentioned later.

The recording layer has antistatic performance, whereby the recording layer surface has low electrostatic adsorbability even in the case where the electrostatic adsorbable laminated sheet internally has charge. Furthermore, in a state before separation between the label part and the support part, the electrostatic adsorbable laminated sheet does not exert electrostatic adsorption performance. Thus, the electrostatic adsorbable laminated sheet is less likely to cause troubles such as adhesion to a roll in a printing step or blocking between sheets.

(Composition of Recording Layer)

It is preferred that the recording layer should comprise an antistatic agent. It is also preferred that the recording layer should comprise a polymer binder and a pigment particle. The content of the antistatic agent is usually 0.1% by mass, preferably 0.5% by mass, more preferably 1% by mass, in terms of the lower limit thereof, and is usually 100% by mass, more preferably 70% by mass, further preferably 50% by mass, in terms of the upper limit thereof. The content of the polymer binder is usually 0% by mass, preferably 0.5% by mass, more preferably 50% by mass, in terms of the lower limit thereof, and is usually 99.9% by mass, preferably 99.5% by mass, more preferably 99% by mass, in terms of the upper limit thereof. The content of the pigment particle is usually 0% by mass in terms of the lower limit thereof, and is usually 70% by mass, preferably 69.5% by mass, more preferably 49% by mass, in terms of the upper limit thereof. More specifically, it is preferred that the recording layer should contain 0.1 to 100% by mass of the antistatic agent, 0 to 99.9% by mass of the polymer binder, and 0 to 70% by mass of the pigment particle. It is more preferred that the recording layer should contain 0.5 to 70% by mass of the antistatic agent, 30 to 99.5% by mass of the polymer binder, and 0 to 69.5% by mass of the pigment particle. It is further preferred that the recording layer should contain 1 to 50% by mass of the antistatic agent, 50 to 99% by mass of the polymer binder, and 0 to 49% by mass of the pigment particle.

(Antistatic Polymer)

The antistatic agent is added in order to impart antistatic performance to the recording layer. Examples thereof include, but are not particularly limited to: low-molecular-weight organic compound-type antistatic agents typified by monoglyceride stearate, alkyldiethanolamine, sorbitan monolaurate, alkylbenzenesulfonate, and alkyl diphenyl ether sulfonate; conductive inorganic fillers typified by ITO (indium-doped tin oxide), ATO (antimony-doped tin oxide), and graphite whisker; so-called electronically conductive polymers which exert conductivity by a pi electron in the molecular chain, such as polythiophene, polypyrrole, and polyaniline; nonionic polymer-type antistatic agents such as polyethylene glycol and polyoxyethylenediamine; quaternary ammonium salt-type copolymers such as polyvinylbenzyltrimethylammonium chloride and polydimethylaminoethyl methacrylate quaternization products; and polymers having an antistatic function, typified by alkali metal salt-containing polymers such as alkali metal ion adducts of alkylene oxide group- and/or hydroxy group-containing polymers. Any one of these antistatic agents may be used alone, or two or more thereof may be used in combination.

These antistatic agents have their respective characteristics. For example, the antistatic performance of the low-molecular-weight organic compound-type antistatic agents is largely susceptible to ambient moisture. On the other hand, the polymers having an antistatic function are preferred as the antistatic agent for use in the present embodiment because of having only small influence on ink adhesiveness and transferability and having little stain.

Among them, alkali metal salt-containing polymers such as alkali metal ion adducts of alkylene oxide group- and/or hydroxy group-containing polymers, and quaternary ammonium salt-type copolymers such as polyvinylbenzyltrimethylammonium chloride and polydimethylaminoethyl methacrylate quaternization products are more preferred as the antistatic agent for use in the present embodiment because antistatic performance is favorable and ambient moisture has only small influence on the antistatic performance.

(Quaternary Ammonium Salt-Type Copolymer)

One example of the polymer having an antistatic function that may be used as the antistatic agent includes a multication-type water-soluble polymer consisting of a quaternary ammonium salt-type copolymer. The copolymer contains a quaternary ammonium salt-type monomer structural unit (a) represented by the general formula (Formula 1) given below, a hydrophobic monomer structural unit (b) represented by the general formula (Formula 6) given below, and a structural unit (c) consisting of a monomer copolymerizable with these structural units, and is a quaternary ammonium salt-type copolymer prepared by copolymerizing these structural units. As for the respective mass ratios of the structural units (a), (b) and (c), the mass ratio of the structural unit (a) is usually 30% by mass, preferably 35% by mass, more preferably 40% by mass, in terms of the lower limit thereof, and is usually 70% by mass, preferably 65% by mass, more preferably 40% by mass, in terms of the upper limit thereof. The mass ratio of the structural unit (b) is usually 30% by mass, preferably 35% by mass, more preferably 40% by mass, in terms of the lower limit thereof, and is usually 70% by mass, preferably 65% by mass, more preferably 60% by mass, in terms of the upper limit thereof. The mass ratio of the structural unit (c) is usually 0% by mass in terms of the lower limit thereof, and is usually 40% by mass, preferably 20% by mass, more preferably 10% by mass, in terms of the upper limit thereof. More specifically, the (a):(b):(c) structural unit mass ratio is usually 30 to 70% by mass:30 to 70% by mass:0 to 40% by mass, preferably 35 to 65% by mass:35 to 65% by mass:0 to 20% by mass, more preferably 40 to 60% by mass:40 to 60% by mass:0 to 10% by mass. Next, the structural units (a), (b), and (c) will be described.

(a) Quaternary Ammonium Salt-Type Monomer Unit

The quaternary ammonium salt-type monomer constituting the structural unit (a) is ester or amide of acrylic acid or methacrylic acid represented by the general formula (Formula 1) given below. The unit is a component that contributes to the antistatic function of the copolymer by two or more cations within the structure. The content of this component in the copolymer is 30% by mass or more, whereby a sufficient antistatic effect can be conferred. Also, the content is 70% by mass or less, whereby water solubility is prevented from becoming excessive, and stickiness can be prevented under high-humidity conditions.

[Formula 1]

(Formula 1)

Structural unit (a)

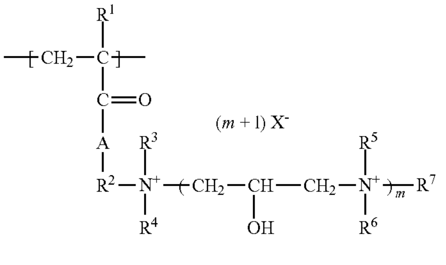

In the formula, A represents an oxo group (—O—) or a secondary amine group (—NH—), $R^1$ represents a hydrogen atom or a methyl group, $R^2$ represents an alkylene group having 2 to 4 carbon atoms or a 2-hydroxypropylene group represented by the general formula (Formula 2) given below, $R^3$, $R^1$, $R^5$ and $R^6$ each represent an alkyl group having 1 to 3 carbon atoms, $R^7$ represents an alkyl group having 1 to 10 carbon atoms or an aralkyl group having 7 to 10 carbon atoms, X represents a chlorine atom, a bromine atom, or an iodine atom, and m represents an integer of 1 to 3. $R^3$, $R^4$, $R^5$ and $R^6$ may be the same or may be different.

[Formula 2]

(Formula 2)

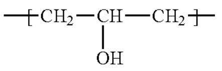

The quaternary ammonium salt-type monomer constituting the structural unit (a) represented by the general formula (Formula 1) can be obtained by modifying an amine-containing monomer, such as dimethylaminoethyl (meth) acrylate, diethylaminoethyl (meth)acrylate, or dimethylaminopropyl (meth)acrylamide, represented by the general formula (Formula 3) given below with a modifying agent, such as 3-chloro-2-hydroxypropyltrimethylammonium chloride, represented by the general formula (Formula 5) given below before or after polymerization.

[Formula 3]

(Formula 3)

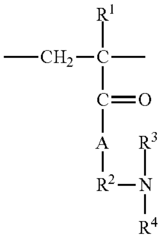

In the formula, A represents an oxo group (—O—) or a secondary amine group (—NH—), $R^1$ represents a hydrogen atom or a methyl group, $R^2$ represents an alkylene group having 2 to 4 carbon atoms or a 2-hydroxypropylene group represented by the general formula (Formula 4) given below, and $R^3$ and $R^4$ each represent an alkyl group having 1 to 3 carbon atoms. $R^3$ and $R^4$ may be the same or may be different.

[Formula 4]

(Formula 4)

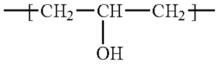

[Formula 5]

(Formula 5)

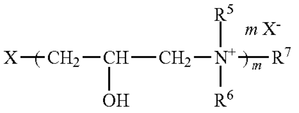

In the formula (Formula 5), $R^5$ and $R^6$ each represent an alkyl group having 1 to 3 carbon atoms, $R^7$ represents an alkyl group having 1 to 10 carbon atoms or an aralkyl group having 7 to 10 carbon atoms, X represents a chlorine atom, a bromine atom, or an iodine atom, and m represents an integer of 1 to 3. $R^5$ and $R^6$ may be the same or may be different.

(b) Hydrophobic Monomer Unit

The hydrophobic monomer constituting the structural unit (b) is ester of acrylic acid or methacrylic acid represented by the general formula (Formula 6) given below. The unit is a component that imparts lipophilicity to the copolymer and contributes to water resistance and printing ink transferability. For attaining both printability and antistatic properties, copolymerization with a hydrophobic monomer is necessary. The content of this component in the polymer is 30% by mass or more, whereby the effect described above is exerted. Also, the content is 70% by mass or less, whereby an antistatic effect improves.

[Formula 6]

(Formula 6)

Structural unit (b)

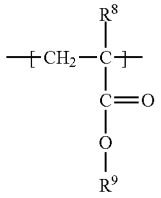

In the formula, $R^8$ represents a hydrogen atom or a methyl group, and $R^9$ represents an alkyl group having 1 to 30 carbon atoms, an aralkyl group having 7 to 22 carbon atoms, or a cycloalkyl group having 5 to 22 carbon atoms.

Examples of the monomer constituting the structural unit represented by the general formula (Formula 6) can include alkyl (meth)acrylates such as methyl (meth)acrylate, ethyl (meth)acrylate, butyl (meth)acrylate, isobutyl (meth)acrylate, tertiary butyl (meth)acrylate, cyclohexyl (meth)acrylate, 2-ethylhexyl (meth)acrylate, lauryl (meth)acrylate, tridecyl (meth)acrylate, and stearyl (meth)acrylate.

(c) Copolymerizable Additional Monomer Unit

Examples of the additional monomer unit copolymerizable with the monomer (a) component and the monomer (b) component, which is used in copolymerization, if necessary, can include hydrophobic monomers such as styrene, vinyltoluene, and vinyl acetate, and hydrophilic monomers such as vinylpyrrolidone and (meth)acrylamide, represented by the general formulas (Formula 7) to (Formula 11) given below. These monomers can be preferably incorporated as the structural unit (c) into the quaternary ammonium salt-type copolymer. The unit facilitates copolymerization for the copolymer and adjusts solubility in a solvent at the time of coating liquid preparation.

[Formula 7]

(Formula 7)

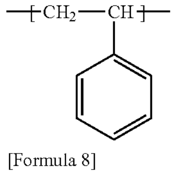

[Formula 8]

-continued (Formula 8)

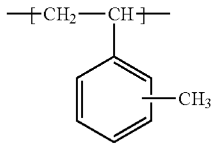

[Formula 9]

(Formula 9)

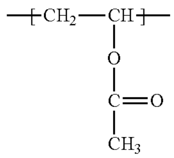

[Formula 10]

(Formula 10)

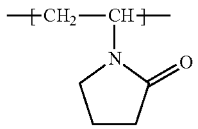

[Formula 11]

(Formula 11)

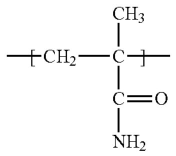

(Copolymerization)

The quaternary ammonium salt-type copolymer can be produced by copolymerizing the quaternary ammonium salt-type monomer structural unit (a) represented by the general formula (Formula 1), the hydrophobic monomer structural unit (b) represented by the general formula (Formula 6), and the monomer structural unit (c) copolymerizable with these structural units, such as the general formulas (Formula 7) to (Formula 11).

The method for producing this quaternary ammonium salt-type copolymer is not particularly limited, and known polymerization approaches can be appropriately used alone or in combination. For example, a known polymerization method, such as bulk polymerization, solution polymerization, or emulsion polymerization, using a radical initiator can be adopted.

Among them, the polymerization method is preferably a solution polymerization method. The polymerization is carried out by dissolving each monomer in a solvent, adding a radical polymerization initiator to this solution, and heating and stirring the mixture under a stream of nitrogen. The solvent is preferably water or an alcohol such as methyl alcohol, ethyl alcohol, isopropyl alcohol, or cellosolve, or these solvents may be mixed and used. A peroxide such as benzoyl peroxide or lauroyl peroxide, or an azo compound such as azobisisobutyronitrile or azobisvaleronitrile is preferably used as the polymerization initiator. At the time of polymerization, the monomer solid concentration is usually 10 to 60% by mass, and the concentration of the polymerization initiator is usually 0.1 to 10% by mass with respect to the monomer. The molecular weight of the quaternary ammonium salt-type copolymer can be set to an arbitrary level according to polymerization conditions such as polymerization temperature, polymerization time, the type and amount of the polymerization initiator, the amount of the solvent used, and a chain transfer agent.

The molecular weight of the quaternary ammonium salt-type copolymer is generally within the range of 1000 to 1000000, preferably within the range of 1000 to 500000, in terms of weight-average molecular weight measured by gel permeation chromatography (GPC).

(Alkali Metal Salt-Containing Polymer)

Another example of the polymer having an antistatic function includes an alkali metal salt-containing polymer. The alkali metal salt-containing polymer contains a polyalkylene oxide compound monomer structural unit (d) represented by the general formula (Formula 12) given below, a hydrophobic monomer structural unit (b) represented by the general formula (Formula 6), and a structural unit (c) consisting of a monomer copolymerizable with these structural units, and is an alkali metal salt-containing polymer prepared by copolymerizing these structural units. As for the respective mass ratios of the structural units (d), (b) and (c), the mass ratio of the structural unit (d) is usually 1% by mass, preferably 20% by mass, more preferably 30% by mass, in terms of the lower limit thereof, and is usually 99% by mass, preferably 70% by mass, more preferably 60% by mass, in terms of the upper limit thereof. The mass ratio of the structural unit (b) is usually 0% by mass, preferably 30% by mass, more preferably 40% by mass, in terms of the lower limit thereof, and is usually 99% by mass, preferably 80% by mass, more preferably 70% by mass, in terms of the upper limit thereof. The mass ratio of the structural unit (c) is usually 0% by mass in terms of the lower limit thereof, and is usually 40% by mass, preferably 20% by mass, more preferably 10% by mass, in terms of the upper limit thereof. More specifically, the (d):(b):(c) structural unit mass ratio is usually 1 to 99% by mass:0 to 99% by mass:0 to 40% by mass, preferably 20 to 70% by mass:30 to 80% by mass:0 to 20% by mass, more preferably 30 to 60% by mass:40 to 70% by mass:0 to 10% by mass. Next, the structural unit (d) will be described. The hydrophobic monomer structural unit (b) and the copolymerizable monomer unit (c) can employ those described in the section of the quaternary ammonium salt-type copolymer mentioned above.

(d) Polyalkylene Oxide Compound Monomer Unit

The polyalkylene oxide compound monomer constituting the structural unit (d) is ester of acrylic acid or methacrylic acid represented by the general formula (Formula 12) given below. The unit is a component that contributes to the antistatic function of the recording layer by an anion and an alkali metal ion within the structure. The content of this component in the recording layer is 1% by mass or more, whereby a sufficient antistatic effect can be conferred. Also, the content is 99% by mass or less, whereby water solubility is prevented from becoming excessive, and stickiness can be prevented under high-humidity conditions.

[Formula 12]

(Formula 12)

Structural unit (d)

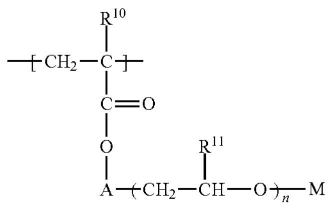

In the formula, $R^{10}$ represents a hydrogen atom or a methyl group, $R^{11}$ represents a hydrogen atom, a chlorine atom, or a methyl group, A represents one linking group selected from the following <group 1>, a linking group in which one or more linking groups selected from the following <group 1> and one or more linking groups selected from the following <group 2> are alternately bonded, or a single bond, M represents an alkali metal ion, and n represents an integer of 1 to 100:

<group 1> an alkylene group having 1 to 6 carbon atoms and optionally having a substituent, and an arylene group having 6 to 20 carbon atoms and optionally having a substituent, and <group 2>—CONH—, —NHCO—, —OCONH—, —NHCOO—, —NH—, —COO—, —OCO—, and —O—.

Examples of the alkylene group having 1 to 6 carbon atoms in <group 1> include a methylene group, an ethylene group, a propylene group, a butylene group, a pentylene group, and a hexylene group. These alkylene groups may be linear or may be branched and are preferably linear. Examples of the substituent include a hydroxyl group and an aryl group. Examples of the arylene group having 6 to 20 carbon atoms include a phenylene group, a naphthylene group, and an anthrylene group. Examples of the substituent include a hydroxyl group and an alkyl group. Examples of the arylene group substituted with an alkyl group include a tolylene group and a xylylene group.

The linking group selected from <group 2> can be preferably a urethane group or an ester group.

Examples of the linking group in which one or more linking groups selected from <group 1> and one or more linking groups selected from <group 2> are alternately bonded include a linking group represented by "(a linking group selected from group 1)-(a linking group selected from group 2)" and a linking group represented by "(a linking group selected from group 1)-(a linking group selected from group 2)-(a linking group selected from group 1)-(a linking group selected from group 2)". In the latter case, the two types of (linking groups selected from group 1) may be the same as or different from each other, and the two types of (linking groups selected from group 2) may be the same as or different from each other.

In the general formula (Formula 12), when n is 2 or larger, n $R^{11}$ may be the same or different and are preferably the same. n represents an integer of usually 1, preferably 2, more preferably 3, in terms of the lower limit thereof, and usually 100, preferably 50, more preferably 50, in terms of the upper limit thereof. More specifically, n represents an integer of 1 to 100 and is preferably 2 to 50, more preferably 3 to 50. In the case where $R^{11}$ is, for example, a hydrogen atom, n may be selected from within the range of usually 10, preferably 15, more preferably 20, in terms of the lower limit thereof, and usually 35, preferably 30, more preferably 25, in terms of the upper limit thereof. More specifically, n may be selected from within the range of 10 to 35, further 15 to 30, and further 20 to 25. In the case where $R^{11}$ is a methyl group, n may be selected from within the range of usually 1, preferably 3, more preferably 5, in terms of the lower limit thereof, and usually 20, preferably 16, more preferably 14, in terms of the upper limit thereof. More specifically, n may be selected from within the range of 1 to 20, further 3 to 16, and further 5 to 14.

In the general formula (Formula 12), M is an alkali metal. Examples thereof can include Li, Na, and K. It is preferred to use Li which has a small ion radius, from the viewpoint of conductivity.

Examples of the polyalkylene oxide compound monomer include, but are not particularly limited to, (poly)alkylene oxide (meth)acrylates such as (poly)ethylene glycol (meth) acrylate, (poly)propylene glycol (meth)acrylate, (poly)chloroethylene glycol (meth)acrylate, (poly)tetramethylene glycol (meth)acrylate, methoxy (poly)ethylene glycol (meth) acrylate, and methoxy (poly)propylene glycol (meth) acrylate.

Other examples thereof include alkylene oxide monomers further having a linking group other than a single bond at a site corresponding to A in the general formula (Formula 12) in the specific examples described above. For example, a compound described in Japanese Patent Laid-Open No. 09-113704 can be used as a compound having a urethane bond at A.

The method for introducing the alkali metal corresponding to M is not particularly limited. Usually, ion conductivity brought about by an alkali metal ion can be conferred by ionizing a hydroxy group terminus through the reaction of an alkali metal salt with an alkylene oxide monomer. Examples of the alkali metal salt that may be preferably used include inorganic salts such as perchlorate of lithium, sodium, or potassium, and chlorides, bromides, iodides, and thiocyanides thereof. The polyalkylene oxide compound monomer described above can be converted to alkoxide by the addition of these inorganic salts to obtain the ion conductivity brought about by an alkali metal ion. Japanese Patent Laid-Open No. 09-113704 proposes an alkoxide compound having a urethane bond at A of formula 1.

As mentioned above, lithium, sodium, or potassium can be used as the alkali metal ion. Among them, lithium which has a small ion radius is most suitable. It is desirable to add the polymer having an antistatic function to the recording layer such that the alkali metal ion concentration is preferably 0.01% by mass in terms of the lower limit thereof, and is preferably 1.00% by mass, more preferably 0.70% by mass, further preferably 0.50% by mass, in terms of the upper limit thereof. More specifically, it is desirable to add the polymer having an antistatic function such that the alkali metal ion concentration is preferably 0.01 to 1.00% by mass, more preferably 0.01 to 0.70% by mass, further preferably 0.01 to 0.50% by mass. The alkali metal ion concentration is 0.01% by mass or more, whereby a sufficient antistatic effect can be obtained. Also, the alkali metal ion concentration is 1.00% by mass or less, whereby an antistatic effect is obtained while reduction in adhesiveness to printing ink in association with increase in metal ion concentration can be suppressed.

(Copolymerization)

The alkali metal salt-containing polymer can be produced by copolymerizing the polyalkylene oxide compound monomer structural unit (d) represented by the general formula (Formula 12), the hydrophobic monomer structural unit (b) represented by the general formula (Formula 6), and the monomer structural unit (c) copolymerizable with these structural units, such as the general formulas (Formula 7) to (Formula 11).

The method for producing this alkali metal salt-containing polymer is not particularly limited, and known polymerization approaches can be appropriately used alone or in combination. A known polymerization method, such as bulk polymerization, solution polymerization, or emulsion polymerization, using a radical initiator can be adopted, as in the quaternary ammonium salt-type copolymer mentioned above.

Among them, the polymerization method is more preferably a solution polymerization method. Specifically, the polymerization is carried out under a stream of nitrogen by dissolving monomers, such as the polyalkylene oxide compound monomer structural unit (d), the hydrophobic monomer structural unit (b), and the copolymerizable monomer structural unit (c), which are used as raw materials, in an inert organic solvent, for example, n-hexane, n-butanol, 2-propanol, toluene, xylene, methyl ethyl ketone, acetone, methyl isobutyl ketone, cyclohexanone, ethyl acetate, isopropyl acetate, butyl acetate, tetrahydrofuran, ethylcellosolve, butylcellosolve, or propylene glycol monoethyl ether, adding a radical polymerization initiator to this solution, and then stirring the mixture with heating to usually 65 to 150° C. The polymerization time is usually set to 1 to 24 hours. At the time of polymerization, the monomer solid concentration is usually 10 to 60% by mass, and the concentration of the polymerization initiator is usually 0.1 to 10% by mass with respect to the monomer. The molecular weight of the alkali metal salt-containing polymer can be set to an arbitrary level according to polymerization conditions such as polymerization temperature, polymerization time, the type and amount of the polymerization initiator, the amount of the solvent used, and a chain transfer agent.

It is preferred that the polymerization initiator for use in copolymerization should be fat-soluble. Preferred examples of the polymerization initiator include organic peroxides and azonitrile. Examples of the organic peroxide include alkyl peroxide (dialkyl peroxide), aryl peroxide (diaryl peroxide), acyl peroxide (diacyl peroxide), aroyl peroxide (diaroyl peroxide), ketone peroxide, peroxycarbonate (peroxydicarbonate), peroxycarborate, peroxycarboxylate, hydroperoxide, peroxyketal, and peroxy ester. Examples of the alkyl peroxide include diisopropyl peroxide, di-tertiary butyl peroxide, and tertiary butyl hydroperoxide. Examples of the aryl peroxide include dicumyl peroxide and cumyl hydroperoxide. Examples of the acyl peroxide include dilauroyl peroxide. Examples of the aroyl peroxide include dibenzoyl peroxide. Examples of the ketone peroxide include methyl ethyl ketone peroxide and cyclohexanone peroxide. Examples of the azonitrile include azobisisobutylnitrile and azobisisopropionitrile.

It is preferred that the molecular weight of the alkali metal salt-containing polymer should be within the range of 10000 to 1000000 in terms of weight-average molecular weight measured by gel permeation chromatography (GPC). When the molecular weight is 10000 or larger, there is a tendency that sufficient water resistance is easily obtained because this polymer is less likely to leak out of a formed coating layer. When the molecular weight is 1000000 or smaller, there is a tendency that coating defects are less likely to arise because of easy mixing with a binder component, so that a homogeneous antistatic effect is easily obtained.

(Polymer Binder)

The recording layer may comprise a polymer binder, if necessary. This polymer binder has adhesiveness to the resin film layer to be provided with the recording layer, or to other films, and is appropriately used for the purpose of improving adhesiveness to printing ink.

Specific examples of the polymer binder include, but are not particularly limited to: (meth)acrylic acid ester polymers such as acrylic acid ester copolymers, methacrylic acid ester copolymers, acrylic acid amide-acrylic acid ester copolymers, acrylic acid amide-acrylic acid ester-methacrylic acid ester copolymers, derivatives of polyacrylamide, and oxazoline group-containing acrylic acid ester polymers; polyethyleneimine polymers such as polyethyleneimine, polyethyleneimine modified with alkyl having 1 to 12 carbon atoms, poly(ethyleneimine-urea), ethyleneimine adducts of poly(ethyleneimine-urea), polyamine polyamide, ethyleneimine adducts of polyamine polyamide, and epichlorohydrin adducts of polyamine polyamide; and polyvinylpyrrolidone and polyethylene glycol as well as vinyl acetate resins, urethane resins, polyether resins, polyester resins, urea resins, terpene resins, petroleum resins, ethylene-vinyl acetate copolymers, vinyl chloride resins, vinyl chloride-vinyl acetate copolymer resins, vinylidene chloride resins, vinyl chloride-vinylidene chloride copolymer resins, chlorinated ethylene resins, chlorinated propylene resins, butyral resins, silicone resins, nitrocellulose resins, styrene-acrylic copolymer resins, styrene-butadiene copolymer resins, and acrylonitrile-butadiene copolymers.

Any one of these polymer binders may be used alone, or two or more types thereof may be mixed and used. These polymer binders can be used in a state diluted with or dispersed in an organic solvent or water. Among them, urethane resins such as polyether urethane, polyester polyurethane, and acrylic urethane, acrylic acid ester copolymers, and polyethyleneimine polymers are preferred because of being well compatible with the ionic polymer-type polymer having an antistatic function mentioned above, being stable when prepared into a coating material by mutual dissolution, and facilitating coating.

(Pigment Particle)

The recording layer may comprise a pigment particle, if necessary. The pigment particle can be appropriately selected and used in consideration of the addition of performance such as improvement in printing ink fixability by its oil absorbability, improvement in surface texture or gloss as an extender pigment, improvement in whiteness as a white pigment, improvement in antiblocking performance by surface roughening, or improvement in light resistance or weather resistance as an ultraviolet reflective material.

An organic or inorganic fine powder is used as the pigment particle, and silicon oxide, calcium carbonate, baked clay, titanium oxide, zinc oxide, barium sulfate, diatomaceous earth, an acrylic particle, a styrene particle, a polyethylene particle, a polypropylene particle, or the like can be used as a specific example. The particle size of the pigment particle is preferably m or smaller, more preferably 15 μm or smaller, further preferably 3 μm or smaller. Also, the particle size of the pigment particle is preferably 0.01 μm or larger, more preferably 0.1 μm or larger. The particle size of the pigment molecule is equal to or less than the upper limit value described above, whereby the drop of the pigment particle from the formed recording layer, and a chalking phenomenon associated therewith can be suppressed. Also, the particle size of the pigment molecule is equal to or more than the lower limit value described above, whereby there is a tendency that blocking is prevented when electrostatic adsorbable laminated sheets are stacked and stored by undulating recording layer surfaces. The content of the pigment particle in the recording layer can be appropriately set according to the desired performance and is not particularly limited. The content is preferably 0% by mass in terms of the lower limit thereof, and is preferably 70% by mass, more preferably 60% by mass, further preferably 45% by mass, in terms of the upper limit thereof. More specifically, the content of the pigment particle in the recording layer is preferably 0 to 70% by mass, more preferably 0 to 60% by mass, further preferably 0 to 45% by mass. The content of the pigment particle is equal to or less than the range described above, whereby owing to a sufficient amount of the binder resin, the cohesive force of the recording layer is improved, and adhesive force to the resin film layer is improved. In addition, printing ink can be prevented from coming off.

(Formation of Recording Layer)

The recording layer may be established as a coating layer by preparing a coating solution containing the components described above, and coating the resin film layer or the like with the coating solution, which is then dried and solidified. A heretofore known approach or apparatus can be used in the coating.

The recording layer may be disposed on the resin film layer by lamination. In this case, another film provided in advance with the recording layer is prepared, and this film can be laminated with the resin film layer. The lamination can be performed by a usual approach such as dry lamination or melt lamination.

It is preferred that the placement of the recording layer on the resin film layer should be carried out before electrostatically charge mentioned later. The antistatic performance possessed by the recording layer is capable of deterring electrostatic adsorbability at the recording layer surface side of the label part even after electrostatically charge.

(Surface Resistivity)

By the recording layer, antistatic performance is imparted to one surface of the label part. The surface resistivity of the recording layer surface is preferably $1\times10^{-1}\Omega$, more preferably $1\times10^{6}\Omega$, further preferably $1\times10^{8}\Omega$, in terms of the lower limit thereof, and is preferably $9\times10^{12}\Omega$, more preferably $9\times10^{11}\Omega$, further preferably $9\times10^{10}\Omega$, in terms of the upper limit thereof. More specifically, the surface resistivity of the recording layer surface is preferably $1\times10^{-1}$ to $9\times10^{12}\Omega$, more preferably $1\times10^{6}$ to $9\times10^{11}\Omega$, further preferably $1\times10^{8}$ to $9\times10^{10}\Omega$. The surface resistivity of the recording layer is equal to or less than the upper limit value in the range described above, whereby: sufficient antistatic performance is imparted to near the recording layer; the electrostatic adsorbability possessed by the label part, the support part, or the electrostatic adsorbable laminated sheet can be sufficiently deterred; troubles such as adhesion to a roll or blocking between sheets can be suppressed upon laminating the label part and the support part; and troubles such as adhesion to a roll or blocking between sheets can be suppressed in a printing step of the electrostatic adsorbable laminated sheet. The surface resistivity has no problem in terms of performance even if falling below the lower limit in the range described above. The surface resistivity equal to or more than the lower limit value in the range described above is preferred in view of production cost, and is also preferred because the electrostatic adsorbability of the label part and the support part can be retained.

(Thickness)

The film thickness of the recording layer is preferably 0.01 μm, more preferably 0.05 μm, further preferably 0.1 μm, particularly preferably 0.3 μm, in terms of the lower limit thereof, and is preferably 50 μm, more preferably 30 μm, further preferably 10 μm, particularly preferably 8 μm, in terms of the upper limit thereof. More specifically, the film thickness of the recording layer is preferably 0.01 to 50 μm, more preferably 0.05 to 30 μm, further preferably 0.1 to 10 μm, particularly preferably 0.3 to 8 μm. The thickness of the recording layer is equal to or more than the lower limit value in the range described above, whereby the homogeneity of the recording layer can be maintained, and adhesiveness to printing ink can be maintained. In addition, antistatic performance can be stably exerted. Also, the thickness of the recording layer is equal to or less than the upper limit value in the range described above, whereby the self weight of the label part is reduced, and drop from an adherend can be prevented by supporting the self weight through electrostatic adsorbability and self-adhesiveness.

<Support Part>

The support part is a layer or a laminate that supports the label layer in a state laminated with the label layer. The label part can be used as a display material consisting of the label part by peeling the support part in use, as in release paper of a pressure-sensitive adhesive label. In this respect, the support part may be used as a display material through its own electrostatic adsorbability. It is preferred that the support part should have flexibility. The flexibility of the support part can be represented by bending stiffness mentioned later. The support part usually has the resin film layer mentioned above. It is preferred that the support part should further have the recording layer mentioned above.

The support part blocks the runoff, to the outside, of charge stored in the inside of the label part and the support part before the label part or the support part is used for the display of printed matter, etc., and facilitates handling the electrostatic adsorbable laminated sheet without exerting the internal electrostatic adsorbability of the label part and the support part to the outside. Specifically, the support part is a layer that is established in order to facilitate printing on the electrostatic adsorbable laminated sheet while protecting the electrostatic adsorbability and self-adhesiveness of the label part and the support part. The support part can also be used as a display material by peeling the label part from the electrostatic adsorbable laminated sheet, as in the label part.

The support part is laminated through electrostatic adsorption by subjecting the label part to electrostatically charge mentioned later, and contacting the label part with charge internally accumulated with the support part via the grip layer, whereby the electrostatic adsorbable laminated sheet can be prepared. Alternatively, the support part may be subjected to electrostatically charge to prepare the support part with charge internally accumulated, which is then contacted with the label part via the grip layer and laminated therewith through electrostatic adsorption, whereby the electrostatic adsorbable laminated sheet can be prepared.

It is preferred that the support part should have antistatic performance on its one surface, whereby the electrostatic adsorbable laminated sheet has antistatic performance on its both surfaces. As a result, the electrostatic adsorbable laminated sheet which is a laminate is less likely to cause troubles such as adhesion to the neighborhood or blocking between electrostatic adsorbable laminated sheets at the time of the handling, such as transport, storage, or printing, of the electrostatic adsorbable laminated sheet, and has favorable handleability, without exerting electrostatic adsorbability to the outside.

For the support part, a known material such as paper, synthetic paper, a resin film, a woven fabric, or a nonwoven fabric is appropriately selected in consideration of electrostatic adsorption to the label part and the conferring of antistatic performance.

The support part may be configured as a single layer, or may be configured as a two or more multiple layers. It is preferred that the support part should have a multilayer structure because the support part is configured such that one surface thereof is electrostatically adsorbable to the label part by contact via the grip layer, and the other surface has antistatic performance.

In the case of forming the multilayer structure of the support part, papers differing in composition, resin films differing in composition, or two or more different materials such as paper, synthetic paper, and a resin film may be laminated with each other. It is preferred that the surface in contact with the grip layer should be constituted by a resin layer excellent in insulating properties, and it is more preferred to have a resin film layer containing a thermoplastic resin, from the viewpoint of the short travel of charge from the label part. As the resin film layer, the same as the resin film layer mentioned above can be used, and it is preferred to comprise the thermoplastic resin, including polyolefin resins, functional group-containing polyolefin resins, polyamide resins, and thermoplastic polyester resins, listed about the resin film layer mentioned above. Among them, polyolefin resins are more preferred from the viewpoint of using a thermoplastic resin excellent in workability. Among the polyolefin resins, a propylene resin is further preferred in view of insulating properties, workability, chemical resistance, cost, etc.

The support part may be provided with letters or images by printing. Such printing can be carried out by a heretofore known approach such as offset printing, gravure printing, flexographic printing, letterpress printing, screen printing, inkjet printing, thermal recording printing, thermal transfer printing, or electrophotographic printing. It is preferred that a surface opposite to the surface at a side in contact with the label part should be subjected to printing.

It is preferred that the support layer should be integrally formed with the grip layer or the recording layer. Therefore, it is preferred that at least the support layer should satisfy the bending stiffness, the relative permittivity, the surface resistivity, and the thickness of the support part described below, it is more preferred that a laminate having the support layer and the grip layer should satisfy these factors, and it is further preferred that a laminate having the support layer, the grip layer, and the recording layer should satisfy these factors.

(Bending Stiffness)

It is preferred that the support part should have rigidity to some extent, as in the label part. The bending stiffness of the support part is preferably 0.05 mN, more preferably 0.1 mN, further preferably 0.3 mN, in terms of the lower limit thereof, and is preferably 10 mN, more preferably 7 mN, further preferably 4 mN, in terms of the upper limit thereof. More specifically, the bending stiffness of the support part is preferably 0.05 to 10 mN, more preferably 0.1 to 7 mN, further preferably 0.3 to 4 mN. When the bending stiffness is 0.05 mN or more, the support part is moderately rigid in itself, is easily handled, permits the fine operation of attachment to an adherend, and is less likely to be wrinkled when attached. On the other hand, when the bending stiffness is 10 mN or less, the support part is less likely to come off from an adherend and can be neatly attached even if small curl occurs before attachment.

(Relative Permittivity)

The support part plays a role in containment so as to prevent the charge of the label layer and the grip layer in the label part from escaping to the outside. This charge containment ability can be indicated by the relative permittivity of the support part (the ratio of permittivity s of the support part to permittivity so of vacuum ($\varepsilon/\varepsilon_0$)). The relative permittivity of the support part is preferably 1.1, more preferably 1.2, further preferably 1.5, in terms of the lower limit thereof, and is preferably 5.0, more preferably 4.0, further preferably 3.0, in terms of the upper limit thereof. More specifically, the relative permittivity of the support part is preferably 1.1 to 5.0, more preferably 1.2 to 4.0, further preferably 1.5 to 3.0. The relative permittivity of the support part is equal to or less than the upper limit value in the range described above, whereby there is a tendency that the grip layer and the label layer can retain charge for a long period, and the electrostatic adsorbability of the label part is easily maintained. The relative permittivity of the support part has no problem in terms of performance even if falling below the lower limit in the range described above. However, such a material is difficult to obtain in terms of current technology, because its relative permittivity is lower than the relative permittivity of air (vacuum). Such relative permittivity can be achieved within the desired range by the support part constituted by the resin mentioned above, processing to form voids in the inside, etc.

For the measurement of the relative permittivity, a measurement method suitable for a measurement frequency range is selected. It is preferred that: in the case where the measurement frequency is 10 Hz or lower, an ultralow-frequency bridge should be used; in the case of 10 Hz to 3 MHz, a transformer bridge should be used; and in the case of exceeding 1 MHz, a parallel T-bridge, a high-frequency Schering bridge, a Q meter, a resonance method, a standing wave method, or a cavity resonance method should be used. Furthermore, the relative permittivity can also be measured using an LCR meter or the like with which voltage/current vectors are measured on a circuit component for an alternating current signal of the measurement frequency, and electrostatic capacity is calculated from the values.

A measurement apparatus that sandwiches, at a constant pressure, a sample between a plate-like application electrode and a plate-like guard electrode arranged in parallel, can apply a voltage on the order of 5 V, and permits arbitrary selection of the measurement frequency is preferred as a measurement apparatus for measuring the relative permittivity of the resin film layer contained in the support part. According to such a measuring machine, the frequency dependency of the sample can be grasped by changing the frequency, and can be used as an index for a suitable use range. It is preferred that the sample should have a uniform thickness and a smooth surface as far as possible. If the surface condition is poor, a void (air layer) is formed between the sample and the electrodes to cause a large error to a measurement value. In this case, for complete electric contact between the sample and the electrodes, it is preferred to perform coating with a silver conductive coating material such as silver paste, or vacuum deposition. Specific examples of the measurement apparatus include "4192A LF IMPEDANCE ANALYZER" from Agilent Technologies, Inc., "LCR Meter 4274A" from Yokogawa Electric Corp., and "HIOKI 3522LCR High Tester" from Hioki E.E. Corp.

(Surface Resistivity)

For the support part, the surface resistivity of a surface that is constituted by a resin excellent in insulating properties and is located at a side in contact with the label part is preferably $1\times10^{13}\Omega$, more preferably $5\times10^{13}\Omega$, further preferably $1\times10^{14}\Omega$, in terms of the lower limit thereof, and is preferably $9\times10^{17}\Omega$, more preferably $9\times10^{16}\Omega$, further preferably $9\times10^{15}\Omega$, in terms of the upper limit thereof, from the viewpoint of short travel of charge. More specifically, the surface resistivity of the surface, at a side in contact with the label layer, of the support part is preferably $1\times10^{13}$ to $9\times10^{17}\Omega$, more preferably $5\times10^{13}$ to $9\times10^{16}\Omega$, further preferably $1\times10^{14}$ to $9\times10^{15}\Omega$. The surface resistivity is equal to or more than the lower limit value in the range described above, whereby there is a tendency that the charge of the label part is less likely to escape to the outside along the support layer upon contact between the support part and the label part, and the label part can retain charge for a long period and thereby easily maintains its electrostatic adsorbability. The surface resistivity has no problem in terms of performance even if exceeding the upper limit value in the range described above. The surface resistivity equal to or less than the upper limit value in the range described above is preferred in view of production cost.

On the other hand, it is desirable for the support part to have antistatic performance on a surface located at an outer layer of the electrostatic adsorbable laminated sheet, i.e., a surface opposite to the surface at a side in contact with the grip layer. This imparts antistatic performance to the outermost surface of the electrostatic adsorbable laminated sheet combining the support part with the label part. Examples of the imparting of antistatic performance to the support part include a method of establishing the same as the recording layer used in the label part, a method of establishing a conductive layer by coating with a conductive coating material, a method of establishing a metal thin film by direct vapor deposition, transfer vapor deposition, lamination of a vapor-deposited film, etc., and a method of kneading an antistatic agent into the resin constituting the support part.

In the mode of establishing a resin film layer into which an antistatic agent has been kneaded, an antistatic effect may not be exerted without corona discharge surface treatment or frame surface treatment on the surface of this film. Particularly, in a drawn film, an antistatic effect may differ largely between a surface-treated surface and an untreated surface. Through the use of this phenomenon, a drawn form of a thermoplastic resin into which an antistatic agent has been kneaded is used as the support part, and one surface of this support part is subjected to surface treatment such as corona discharge, whereby a support part having antistatic performance on one surface, albeit in a single-layer structure, may be formed.

According to the method described above, the surface resistivity of the surface, opposite to the surface at a side in contact with the label part, of the support part, i.e., the outermost surface of the electrostatic adsorbable laminated sheet, is preferably $1\times10^{-1}\Omega$, more preferably $1\times10^{6}\Omega$, further preferably $1\times10^{8}\Omega$, in terms of the lower limit thereof, and is preferably $9\times10^{12}\Omega$, more preferably $9\times10^{11}\Omega$, further preferably $9\times10^{10}\Omega$, in terms of the upper limit thereof. More specifically, the surface resistivity of the surface, opposite to the surface at a side in contact with the label part, of the support part is preferably $1\times10^{-1}$ to $9\times10^{12}\Omega$, more preferably $1\times10^{6}$ to $9\times10^{11}\Omega$, further preferably $1\times10^{8}$ to $9\times10^{10}\Omega$. The surface resistivity is equal to or less than the upper limit value in the range described above, whereby: sufficient antistatic performance is conferred; the adhesion of the electrostatic adsorbable laminated sheet to the neighborhood or blocking between electrostatic adsorbable laminated sheets is suppressed; and handleability improves. The surface resistivity has no problem in terms of performance even if falling below the lower limit in the range described above. The surface resistivity equal to or more than the lower limit value in the range described above is preferred in view of production cost.

(Thickness)

The thickness of the support part can be appropriately set according to the desired performance and is not particularly limited. The thickness is preferably 20 μm, more preferably 25 μm, further preferably 30 μm, particularly preferably 35 μm, in terms of the lower limit thereof, and is preferably 500 μm, more preferably 400 μm, further preferably 200 μm, particularly preferably 150 μm, in terms of the upper limit thereof. More specifically, the thickness of the support part is preferably 20 to 500 μm, more preferably 25 to 400 μm, further preferably 30 to 200 μm, particularly preferably 35 to 150 μm. The thickness of the support part is equal to or more than the lower limit value in the range described above, whereby: charge is prevented from running off via the thickness of the support part when the support part and the label part adhere to each other; the charge is contained within the electrostatic adsorbable laminated sheet; and the electrostatic adsorbability of the label part can be maintained. Also, the thickness of the support part is equal to or less than the upper limit value in the range described above, whereby the thickness of the electrostatic adsorbable laminated sheet is reduced, and workability in a printing step or a cutting step can be improved.

<Protective Layer>

The protective layer is a layer that resides on the outer surface of the electrostatic adsorbable laminated sheet and thereby protects layers located in the inside. The protective layer resides on the outer surface of the electrostatic adsorbable laminated sheet and thereby functions as a protective layer for the label part or the support part. Also, the protective layer resides on the outer surface of the electrostatic adsorbable laminated sheet and thereby functions as a protective layer for the pressure-sensitive adhesive layer. Among others, the protective layer disposed in contact with the pressure-sensitive adhesive layer protects the adhering force of the pressure-sensitive adhesive layer in a state contacted with the pressure-sensitive adhesive layer. In addition, the protective layer functions as a peelable sheet that is removed by peeling from the pressure-sensitive adhesive layer, whereby the pressure-sensitive adhesive layer exerts its adhering force, so that the resultant can be attached to an adherend via the pressure-sensitive adhesive layer. It is preferred that the protective layer should be disposed as an outermost layer at the label part side of the electrostatic adsorbable laminated sheet, from the viewpoint of sufficiently exerting the effect of the protective layer.

It is preferred that the protective layer should be a layer that protects layers located in the inside of the electrostatic adsorbable laminated sheet, and should also be a layer having a surface capable of erasing writing contents of letters or symbols written with a writing utensil such as a whiteboard marker. It is preferred that the protective layer should have a resin film layer containing a thermoplastic resin, and it is more preferred to have a fluororesin layer comprising a fluororesin film containing a fluororesin, from the viewpoint of conferring the function described above. The fluororesin layer can be established by laminating a fluororesin film formed in advance with the label layer via an adhesion layer formed using a pressure-sensitive adhesive or an adhesive. Alternatively, the fluororesin layer can be established by coating one surface of a thermoplastic resin film serving as a substrate layer with a fluororesin coating material to form a coat layer, and laminating the label layer to the other surface of this thermoplastic resin film via an adhesion layer formed using a pressure-sensitive adhesive or an adhesive. Alternatively, the fluororesin layer can be established by directly coating the label layer with a fluororesin coating material to form a coat layer on the label layer. The surface of the label layer has a fluororesin film or a fluorine coat, whereby the electrostatic adsorbable laminated sheet obtains writing erasability.

Alternatively, it is preferred that the protective layer should have a peelable sheet layer mentioned later in the case of being disposed in contact with the pressure-sensitive adhesive layer.

Examples of the thermoplastic resin film that can be used in the protective layer include: fluororesins such as polytetrafluoroethylene, ethylene-tetrafluoroethylene copolymers, tetrafluoroethylene-hexafluoropropylene copolymers, tetrafluoroethylene-perfluoroalkyl vinyl ether copolymers, and polyvinylidene fluoride; polyolefin resins such as high-density polyethylene, medium-density polyethylene, low-density polyethylene, propylene resins, and polymethyl-1-pentene; functional group-containing polyolefin resins such as ethylene/vinyl acetate copolymers, ethylene/acrylic acid copolymers, maleic acid-modified polyethylene, and maleic acid-modified polypropylene; polyamide resins such as nylon-6 and nylon-6,6; thermoplastic polyester resins such as polyethylene terephthalate and its copolymers, polybutylene terephthalate, polybutylene succinate, and aliphatic polyesters such as polylactic acid; and polycarbonate, atactic polystyrene, and syndiotactic polystyrene. Among these thermoplastic resins, it is preferred to use a fluororesin, a polyolefin resin, a functional group-containing polyolefin resin, or a thermoplastic polyester resin excellent in transparency, staining resistance, and friction resistance.

In the case of establishing no coat layer on the thermoplastic resin film, it is preferred to form the fluororesin layer by using a fluororesin film as the thermoplastic resin film. A commercially available product may be used as the fluororesin film. Specific examples thereof can include NEOFLON ETFE, NEOFLON PFA, NEOFLON FEP, and NEOFLON PCTFE (trade names, manufactured by Daikin Industries, Ltd.), AFLEX and FLUON ETFE (trade names, manufactured by AGC Inc.), and Tefzel (trade name, manufactured by E. I. du Pont de Nemours and Company).

The basis weight of the fluororesin film that can be used in the protective layer is preferably 0.1 $g/m^2$, more preferably 0.2 $g/m^2$, further preferably 0.3 $g/m^2$, in terms of the lower limit thereof, and is preferably 500 $g/m^2$, more preferably 400 $g/m^2$, further preferably 300 $g/m^2$, in terms of the upper limit thereof. More specifically, the basis weight of the fluororesin film is preferably 0.1 to 500 $g/m^2$, more preferably 0.2 to 400 $g/m^2$, further preferably 0.3 to 300 $g/m^2$. If the basis weight of the fluororesin film is less than the lower limit described above, the homogeneity of writing erasability may be poor due to the influence of thickness variations. On the other hand, if the basis weight of the fluororesin film exceeds the upper limit described above, the self weight of the electrostatic adsorbable laminated sheet gets large, so that the electrostatic adsorbable laminated sheet easily drops from an adherend.

For the fluororesin film, a surface in contact with the label layer or with a pressure-sensitive adhesive or an adhesive can be subjected to surface treatment by a known approach, thereby improving the adhesiveness of the adhering surface. Specific examples of the surface treatment can include approaches such as corona discharge treatment, frame plasma treatment, and atmospheric pressure plasma treatment. Higher adhesiveness is obtained by purging a treatment environment or a plasma source with the desired gas. Also, the adhesiveness may be improved by washing the surface with an acid such as hydrochloric acid, nitric acid, or sulfuric acid.

The adhesion layer is a layer constituted by an adhering agent such as a pressure-sensitive adhesive or an adhesive. In this context, the pressure-sensitive adhesive maintains adhesiveness to some extent even after attachment, whereas the adhesive loses adhesiveness by curing after attachment. The pressure-sensitive adhesive or the adhesive constituting the adhesion layer is not particularly limited, and an arbitrary pressure-sensitive adhesive or adhesive can be appropriately selected and used from among conventional pressure-sensitive adhesives or adhesives routinely used for labels.

Examples of the pressure-sensitive adhesive that can be used in the protective layer include rubber-type, acrylic, silicone-type, urethane-type, and vinyl ether-type pressure-sensitive adhesives. The acrylic pressure-sensitive adhesive includes emulsion type, solvent type, hot-melt type, and the like, any of which can be used. Among them, an emulsion-type acrylic pressure-sensitive adhesive is preferred in view of safety, quality, and cost. In the case of using the pressure-sensitive adhesive, a tackifier may be added. Examples of the tackifier include rosin resins, terpene resins, aliphatic petroleum resins, aromatic petroleum resins, hydrogenated petroleum resins, styrene resins, and alkylphenol resins.

Examples of the adhesive that can be used in the protective layer include natural rubber-type, synthetic rubber-type, acrylic, vinyl acetate-type, cyano acrylate-type, silicone-type, urethane-type, and polyether-type various adhesives. These can employ various types such as solvent type, solvent-free type, one-component type, two-component type, and ultraviolet curing type. For example, various hot-melt adhesives such as styrene block copolymers and ethylene-vinyl acetate copolymers can also be used as the adhesive.

These pressure-sensitive adhesives or adhesives, for example, in a solution state such as solvent type, dispersion type, or emulsion type can be applied, dried, and solidified to form the adhesion layer. For such coating, an instrument can be used, such as a roll coater, a blade coater, a bar coater, an air knife coater, a gravure coater, a reverse coater, a die coater, a lip coater, a spray coater, or a comma coater. Smoothing is further performed, if necessary, and the adhesion layer can be formed through a drying step.

The coat layer is desirably a fluorine coat layer containing a fluororesin, from the viewpoint of writing erasability. In this context, examples of the fluororesin include fluoroolefin, polymers of fluorine-containing ethylenic unsaturated monomers such as fluoroalkyl group-containing ethylenic unsaturated monomers, and copolymers of fluorine-containing ethylenic unsaturated monomers and monomers copolymerizable therewith.

Specific examples of the fluoroolefin can include chlorotrifluoroethylene (CTFE), tetrafluoroethylene (TFE), hexafluoropropylene (HFP), vinylidene fluoride (VdF), and vinyl fluoride (VF).

Specific examples of the fluoroalkyl group-containing ethylenic unsaturated monomer can include $CF_3(CF_2)_5CH_2CH_2OCOC(CH_3)=CH_2CF_3(CF_2)_5CH_2CH_2OCOCH=CH_2CF_3(CF_2)_7S\ O_2N(CH_3)CH_2CH_2OCOCH-CH_2CF_3(CF_2)_7SO_2N(CH_3)CH_2CH_2OCOC(CH_3)=CH_2C\ F_3(CF_2)_7SO_2N(CH_2CH_2OCOCH=CH_2)_2CF_3(CF_2)_5CH_2CH_2OCOCH=CH_2CF_3(CF_2)_9(CH_2)_9OCOCH=CH_2(CF_3)_2CF(CF_2)_7CH_2CH_2OCOCH=CH_2CF_3(CF_2)_9OCOCH=CH_2CF_3(CF_2)_7CON(CH_3)CH_2CH_2OCOC(CH_3)=CH_2CF_3(CF_2)_5CON(C_3H_7)CH_2CH_2OCOCH=CH_2CF_3(CF_2)_5CH=CH_2CF_3(CF_2)_7CH-CH_2CF(CF_3)(CCLF_2)(CF_2)_7CO\ NHOCOCH=CH_2$.

The monomer copolymerizable with a fluorine-containing ethylenic unsaturated monomer includes olefins, carboxylic acid vinyl esters, aralkyl vinyl ethers, alkyl vinyl ethers, cycloalkyl vinyl ethers, (meth)acrylic acid esters, and the like. Specific examples thereof can include ethylene, propylene, butylene, butadiene, isoprene, chloroprene, vinyl chloride, vinylidene chloride, styrene, α-methylstyrene, vinyl acetate, vinyl propionate, vinyl butyrate, vinyl pivalate, vinyl caproate, vinyl laurate, vinyl stearate, vinyl benzoate, vinyl butylbenzoate, vinyl cyclohexanecarboxylate, acrylic acid, methacrylic acid, methyl (meth)acrylate, ethyl (meth)acrylate, butyl (meth)acrylate, hexyl (meth)acrylate, octyl (meth)acrylate, 2-ethylhexyl (meth)acrylate, stearyl (meth)acrylate, benzyl (meth)acrylate, cyclohexyl (meth)acrylate, isobornyl (meth)acrylate, dicyclopentanyl (meth)acrylate, (meth)acrylamide, N-metalol (meth)acrylamide, methyl vinyl ether, ethyl vinyl ether, propyl vinyl ether, butyl vinyl ether, cyclopentyl vinyl ether, cyclohexyl vinyl ether, benzyl vinyl ether, and phenyl vinyl ether. These monomers can each be used alone or can be used in combination of two or more thereof.

A commercially available product may be used as the fluororesin for use in the fluorine coat layer. Specific examples thereof can include LUMIFLON LF200, LF800, LF9716, FE4400, LF700F, and LF710F (trade names, manufactured by AGC Inc.), AsahiGuard AG-E060, AG-E100, and AG-E400 (trade names, manufactured by AGC Inc.), ZEFFLE GK570, GK580, GK510, SE310, and SE800 (trade names, manufactured by Daikin Industries, Ltd.), FLUONATE K702, K704, and K600 (trade names, manufactured by DIC Corp.), and CEFRAL COAT TBA201 (trade name, manufactured by Central Glass Co., Ltd.).

The fluorine coat layer may be supplemented with a cross-linking agent, if necessary. The cross-linking agent is appropriately selected according to the characteristics of the fluororesin used. In the case where the fluororesin has, for example, a hydroxy group, it is preferred to use an isocyanate-type curing agent, a melamine resin, a silicate compound, an isocyanate group-containing silane compound, or the like as the cross-linking agent. In the case where the fluororesin contains a carboxyl group, an amino-type curing agent or an epoxy-type curing agent is preferred. In the case where the fluororesin contains an amino group, it is preferred to use a carbonyl group-containing curing agent, an epoxy-type curing agent, or an acid anhydride-type curing agent as the cross-linking agent.

As for such a curing agent, a commercially available product, for example, CORONATE HX (trade name, manufactured by Nippon Polyurethane Industry Co., Ltd.), Bayhydur XP7063 (trade name, manufactured by Bayer AG), or VESTAGON B1530 (trade name, manufactured by Evonik Degussa Japan Co., Ltd.) can also be used as the isocyanate-type curing agent.

The fluorine coat layer may contain a binder component for enhancing adhesiveness, and an inorganic and/or organic filler for enhancing slipperiness or writability, in addition to the fluororesin. Specific examples of such a binder component can include acrylic acid ester polymers such as acrylic acid ester copolymers, methacrylic acid ester copolymerization, acrylic acid amide-acrylic acid ester copolymers, acrylic acid amide-acrylic acid ester-methacrylic acid ester copolymers, derivatives of polyacrylamide, and oxazoline group-containing acrylic acid ester polymers, polyvinylpyrrolidone, and polyethylene glycol as well as olefin resins, chlorinated olefin resins, maleic acid-modified olefin resins, vinyl acetate resins, urethane resins, polyether resins, polyester resins, urea resins, terpene resins, petroleum resins, ethylene-vinyl acetate copolymers, vinyl chloride resins, vinyl chloride-vinyl acetate copolymer resins, vinylidene chloride resins, vinyl chloride-vinylidene chloride copolymer resins, chlorinated ethylene resins, chlorinated propylene resins, butyral resins, silicone resins, nitrocellulose resins, styrene-acrylic copolymer resins, styrene-butadiene copolymer resins, and acrylic nitrile-butadiene copolymers.

Examples of the inorganic filler can include calcium carbonate, titanium oxide, barium sulfate, zinc oxide, silica, zeolite, talc, clay, mica, smectite, and glass beads.

Examples of the organic filler can include acrylic particles, melamine particles, polyolefin particles, urethane particles, and polytetrafluoroethylene particles.

It is preferred that the fluorine coat layer should contain preferably 30 to 100%, more preferably 50 to 100%, of the fluororesin. If the content of the fluororesin is less than 30%, sufficient writing erasability may not be obtained.

The basis weight of the fluorine coat layer is preferably 0.1 g/m$^2$, more preferably 0.2 g/m$^2$, further preferably 0.3 g/m$^2$, in terms of the lower limit thereof, and is preferably 30 g/m$^2$, more preferably 20 g/m$^2$, further preferably 10 g/m$^2$, in terms of the upper limit thereof. More specifically, the basis weight of the fluorine coat layer is preferably 0.1 to 30 g/m$^2$, more preferably 0.2 to 20 g/m$^2$, further preferably 0.3 to 10 g/m$^2$. If the basis weight of the fluorine coat layer is less than the lower limit described above, the homogeneity of writing erasability may be poor due to the influence of thickness variations. On the other hand, if the basis weight of the fluorine coat layer exceeds the upper limit described above, the intended performance may not be exerted due to uneven drying or curing of the fluorine coat layer or cracks in the fluorine coat layer.

The fluorine coat layer may be established by directly coating the label layer, or may be applied in advance to one surface of the thermoplastic resin film constituting the protective layer and laminated with the label layer via a pressure-sensitive adhesive or an adhesive such that the fluorine coat layer side is located on the outer surface. As such a coating system, the coating with the pressure-sensitive adhesive or the adhesive is performed using a die coater, a bar coater, a comma coater, a lip coater, a roll coater, a rod coater, a curtain coater, a gravure coater, a spray coater, a blade coater, a reverse coater, an air knife coater, a slide hopper, or the like. Then, smoothing is performed, if necessary, and the fluorine coat layer is formed through a drying step.

(Thickness)

The thickness of the protective layer can be appropriately set according to the desired performance and is not particularly limited. In the case of laminating the thermoplastic resin film or the fluororesin film with the label layer, the thickness is preferably 10 μm, more preferably 20 μm, further preferably 30 μm, in terms of the lower limit thereof, and is preferably 500 μm, more preferably 400 μm, further preferably 300 μm, in terms of the upper limit thereof. More specifically, the thickness is preferably 10 to 500 μm, more preferably 30 to 400 μm, further preferably 40 to 300 μm. In the case of forming the coat layer on the label layer, the thickness of the protective layer is preferably 0.1 μm, more preferably 0.5 μm, further preferably 1 μm, in terms of the lower limit thereof, and is preferably 50 μm, more preferably 30 μm, further preferably 20 μm, in terms of the upper limit thereof. More specifically, the film thickness of the recording layer is preferably 0.1 to 50 μm, more preferably 0.5 to 30 μm, further preferably 1 to 20 μm. If the thickness of the protective layer is less than the lower limit described above, the homogeneity of writing erasability may be poor due to the influence of thickness variations. On the other hand, if the basis weight of the fliororesin film exceeds the upper limit described above, the self weight of the electrostatic adsorbable laminated sheet gets large, so that the electrostatic adsorbable laminated sheet easily drops from an adherend.

<Peelable Sheet Layer>

General release paper can be used as the peelable sheet layer. For example, untreated wood-free paper or kraft paper, wood-free paper or kraft paper that has undergone calendering treatment, wood-free paper or kraft paper that has been coated with a resin, wood-free paper or kraft paper that has been laminated with a plastic film, or coat paper, glassine paper, or a plastic film that has undergone silicone treatment or fluorine treatment can be used.

More specifically, natural pulp paper (e.g., wood-free paper or kraft paper) that has been laminated on one surface or both surfaces with a film of a plastic such as a polyolefin resin (e.g., polyethylene or polypropylene), a polyester resin (e.g., polyethylene terephthalate), or a polyamide resin (e.g., nylon), such paper that has further undergone silicone treatment, a film of a plastic such as a polyolefin resin (e.g., polyethylene or polypropylene) or a polyester resin (e.g., polyethylene terephthalate) that has undergone silicone treatment, or the like can be used.

<Pressure-Sensitive Adhesive Layer>

The pressure-sensitive adhesive layer is a layer formed by establishing a layer of a pressure-sensitive adhesive on a surface, in no contact with the support part, of the label part. The pressure-sensitive adhesive layer can be bonded on one surface to the label part and on the other surface to the protective layer, a printing sheet layer (not shown) which is non-adhesive printed matter, or the like, through its tackiness. The type and thickness (coating amount) of the pressure-sensitive adhesive may be variously selected according to the environment where the display material is used, adhesion strength, etc.

An acrylic pressure-sensitive adhesive, a rubber-type pressure-sensitive adhesive, a urethane-type pressure-sensitive adhesive, a silicone-type pressure-sensitive adhesive, a resin having self-adhesiveness, or the like can be used as the pressure-sensitive adhesive for use in the pressure-sensitive adhesive layer, though the pressure-sensitive adhesive is not particularly limited thereto. Specific examples of the acrylic pressure-sensitive adhesive can include ones having a glass transition point of −20° C. or lower, such as 2-ethylhexyl acrylate/n-butyl acrylate copolymers and 2-ethylhexyl acrylate/ethyl acrylate/methyl methacrylate copolymers. Specific examples of the rubber-type pressure-sensitive adhesive can include polyisobutylene rubber, butyl rubber, and mixtures thereof, and can include these rubber-type pressure-sensitive adhesives supplemented with a tackifier, such as an abietic acid rosin ester, a terpene/phenol copolymer, or a terpene/indene copolymer. Specific examples of the urethane-type pressure-sensitive adhesive can include mixtures of polyester polyol, polyether polyol, polycarbonate polyol, or polylactone polyol with an isocyanate compound. Specific examples of the silicone-type pressure-sensitive adhesive can include condensation curing type comprising a mixture of organopolysiloxane having terminal hydroxy groups with a crosslinking agent, and addition curing type comprising a mixture of organopolysiloxane having terminal vinyl groups with a crosslinking agent. Specific examples of the resin having self-adhesiveness can include low-density polyethylene, ethylene/vinyl acetate copolymers, ethylene/(meth)acrylic acid copolymers, ethylene/(meth)acrylic acid ester copolymers, and soft polyvinyl chloride. Among them, it is preferred to use an acrylic pressure-sensitive adhesive from the viewpoint of transparency and cost.

These pressure-sensitive adhesives are usually made of a high-molecular-weight resin component, and are used in the form of an organic solvent solution, in a form dispersed in water, such as a dispersion or an emulsion, or in a solvent-free form. In the case of using the pressure-sensitive adhesive in a solution state such as solvent type, dispersion type, or emulsion type in the formation of the pressure-sensitive adhesive layer, it is easy to form the pressure-sensitive adhesive layer by directly coating the label part or coating a protective layer mentioned later, followed by drying and solidification. For such coating, an approach can be adopted, such as a roll coater, a blade coater, a bar coater, an air knife coater, a gravure coater, a reverse coater, a die coater, a lip coater, a spray coater, or a comma coater. Smoothing is further performed, if necessary, and the pressure-sensitive adhesive layer is formed through a drying step.

In the case of using solvent-free type in the formation of the pressure-sensitive adhesive layer, it is easy to form the pressure-sensitive adhesive layer by directly coating the label part or coating the protective layer with a heat-melted pressure-sensitive adhesive by use of a gravure coater, a die coater, or the like, or by extruding a melt-kneaded pressure-sensitive adhesive into a film shape by use of an extruder, followed by cooling and solidification.

The formation of the pressure-sensitive adhesive layer on the label part is generally performed by a method which involves coating the protective layer with a pressure-sensitive adhesive to form a pressure-sensitive adhesive layer, which is then laminated with the label part. In some cases, the pressure-sensitive adhesive layer can be formed by directly coating the label part with a pressure-sensitive adhesive. Also, the formation of the pressure-sensitive adhesive layer on the label part may be performed before electrostatically charge of the label part or may be performed after the electrostatically charge.

The basis weight (coating amount) of the pressure-sensitive adhesive layer is not particularly limited. The basis weight based on solid content is usually 3 $g/m^2$, preferably 10 $g/m^2$, in terms of the lower limit thereof, and is usually 60 $g/m^2$, preferably 40 $g/m^2$, in terms of the upper limit thereof. More specifically, the basis weight of the pressure-sensitive adhesive layer based on solid content is usually in the range of 3 to 60 $g/m^2$, preferably in the range of 10 to 40 $g/m^2$.

<Electrostatically Charge>

The electrostatic adsorbable laminated sheet comprises a label part/support part laminate obtained by subjecting at least one of the surface, at a side in contact with the support part, of the label part, and the surface, at a side in contact with the label part, of the support part to electrostatically charge and subsequently electrostatically adsorbing the support part and the label part to each other by contact. The electrostatically charge is carried out in order to inject charge to the inside of the label part or the support part and thereby impart electrostatic adsorbability thereto.

The electrostatically charge is not particularly limited and can be performed according to various known methods. Examples thereof include a method which involves forming the label part or the support part, and then applying corona discharge or pulsed high voltage to the surface of the label part or the support part, a method which involves holding both surfaces of the label part or the support part between dielectrics, and applying direct-current high voltage to both the surfaces (electro-electret method), and a method which involves irradiating the label part or the support part with ionizing radiation such as y ray or electron beam to convert the label part or the support part into an electret (radio-electret method).

It is preferred that the electrostatically charge of the label part or the support part should be performed by the electro-electret method of applying corona discharge or high voltage. Preferred examples of the electro-electret method include a method which involves fixing the label part between an application electrode and a grounding electrode connected to a direct-current high-voltage power source (batch method), and a method which involves passing the part between the electrodes to apply voltage thereto (continuous method). In the case of using these approaches, it is desirable to use a large number of acicular electrodes arranged at regular intervals or a metal wire as the main electrode (application electrode) and to use a flat metal plate or a metal roll as the counter electrode (grounding electrode).

In the present embodiment, it is preferred that the electrostatically charge should be direct-current corona discharge treatment. The direct-current corona discharge treatment that can be used in the present embodiment employs an apparatus in which an acicular or wire-like main electrode (application electrode) and a plate-like or roll-like counter electrode (grounding electrode) are connected to a direct-current high-voltage power source. In the direct-current corona discharge treatment, the label part or the support part is placed on the counter electrode, and direct-current high voltage is applied to between the main electrode and the counter electrode to inject charge to the label part or the support part through the generated corona discharge.

The interval between the main electrode and the counter electrode is preferably 1 to 50 mm, more preferably 2 to 30 mm, further preferably 5 to 20 mm. The interval between the main electrode and the counter electrode falls within the range described above, whereby corona discharge is stably generated. In addition, uniform electrostatically charge can be attained by performing uniform electrostatically charge in the width direction with the interelectrode distance kept uniform.

The voltage to be applied to between both the electrodes is determined according to the electric characteristics of the label part and the support part, the shapes or materials of the main electrode and the counter electrode, and the interval between the main electrode and the counter electrode. Specifically, the voltage is preferably 1 to 100 kV, more preferably 3 to 70 kV, further preferably 5 to 50 kV, particularly preferably 10 to 30 kV. The polarity of the main electrode may be plus or minus, and minus polarity of the main electrode is preferred because a relatively stable corona discharge state is attained.

The materials of the main electrode and the counter electrode are appropriately selected from conductive substances, and electrodes made of a metal such as iron, stainless, copper, brass, or tungsten, or made of carbon are preferred.

The amount of the charge introduced to the label part or the support part by the electrostatically charge mentioned above depends on the amount of current flowing between the main electrode and the counter electrode at the time of the treatment. The amount of current is increased with higher voltage between both the electrodes. Therefore, it is preferred to set applied voltage to a high value so as not to cause the insulation breakdown of the label part or the support part.

It is preferred that the electrostatically charge of the label part should be performed by the approach of applying corona discharge or high voltage, preferably, to the surface on the resin film layer side where the recording layer is not disposed. The recording layer possesses antistatic performance, and the electrostatically charge on such a surface is not effective because the possibility is high that the given charge is dissipated to the neighborhood via the recording layer. In the case where the surface of the recording layer is in contact with the grounding side (metal plate or metal roll), such a problem does not particularly arise because the electrostatically charge is carried out on the surface at the resin film layer side.

The electrostatic adsorbable laminated sheet, the label part, or the support part may be subjected to charge removal treatment after the electrostatically charge. By performing the charge removal treatment, excess charge is removed, so that troubles can be avoided in a cutting step, a printing step, and a processing step for labels and the like. Such charge removal treatment can employ a known approach such as a voltage application-type charge removal machine (ionizer) or a self-discharge-type charge removal machine. These general charge removal machines can remove surface charge but cannot remove charge internally accumulated in the label part or the support part. Thus, the charge removal treatment does not largely influence the electrostatic adsorbability of the label part or the support part.

<Electrostatic Adsorbable Laminated Sheet>

The electrostatic adsorbable laminated sheet is obtained by contacting the label part that has undergone electrostatically charge with the support part via the grip layer. In this case, the charge internally accumulated in the label part induces the dielectricity, i.e., electrostatic polarization, of the support part in contact therewith, so that both the parts adhere to each other through electrostatic adsorbability. Alternatively, the electrostatic adsorbable laminated sheet is obtained by contacting the support part that has undergone electrostatically charge with the label part via the grip layer for electrostatic adsorption. In this case, the charge internally accumulated in the support part induces the dielectricity of the label part in contact therewith, so that both the parts adhere to each other through electrostatic adsorbability. Production by either of the approaches can produce an electrostatic adsorbable laminated sheet having equivalent performance. Furthermore, the label part and the support part also adhere closely to each other through the self-adhesiveness of the grip layer. The lamination therebetween can be performed, for example, by taking up any one of the label part and the support part in a long roll, performing electrostatically charge by passing the roll between electrodes while unwinding the roll, separately unwinding the other part taken up in a long roll, and pressure-bonding both the parts with a press roll.

(Working Effects)

A conventional electrostatic adsorbable sheet having no grip layer retains the adhesion between the label part and the support part only by electrostatic adsorbability. However, the electrostatic adsorbability alone is not sufficient for processing on a processing machine with severe strokes, etc., and lifting or coming off may occur between the label part and the support part. On the other hand, in the electrostatic adsorbable laminated sheet of the present embodiment, the label part and the support part are electrostatically adsorbed to each other via the grip layer. As a result, in the electrostatic adsorbable laminated sheet, adhesiveness at the electrostatic adsorbable interface between the label part and the support part improves by the electrostatic adsorbability between the label part and the support part as well as the self-adhesiveness of the grip layer. Therefore, the electrostatic adsorbable laminated sheet prevents lifting or coming off ascribable to displacement or deflection between the label part and the support part even upon treatment such as fabrication or printing or even when rolled up for transport or preservation, and thus has improved handleability. Thus, for example, even in the case of printing on the electrostatic adsorbable laminated sheet using a printing machine such as an intermittent rotary label printing machine, it is possible to prevent the displacement of printed patterns, etc. and to enhance printing precision.

The label part constituting the electrostatic adsorbable laminated sheet can be peeled from the support part, attached to an adherend, and thereby used as a display material. In this respect, in the case where the label part has the label layer and the grip layer wherein the label layer is integrally formed with the grip layer, the label part is attached to an adherend through electrostatic adsorbability and self-adhesiveness. Therefore, adsorbability (retaining force) to an adherend improves, as compared with a conventional adhesive sheet to be attached through self-adhesiveness or electrostatic adsorbable sheet to be attached through electrostatic adsorbability. This is, presumably, partly because only the electrostatic adsorbability between a display material and an adherend rarely produces resisting force in the shear direction of a surface, whereas the display material has the grip layer, whereby antislip properties are imparted to between the display material and an adherend to attain very large shear resistance in the surface direction. More specifically, it has been revealed that in the case where the display material has the grip layer, the adsorbability between the display material and an adherend improves by the unit of an order as compared with the case where the display material has no grip layer.

The support part constituting the electrostatic adsorbable laminated sheet can be peeled from the label part, attached to an adherend, and thereby used as a display material. In this respect, in the case where the support part has the support layer and the grip layer wherein the support layer is integrally formed with the grip layer, the support part can be attached to an adherend through electrostatic adsorbability and self-adhesiveness, as in the label part.

In the case where a conventional electrostatic adsorbable sheet is electrostatically adsorbed to an adherend, then peeled, and electrostatically adsorbed again to an adherend, adsorbability to the adherend is reduced in association with the re-attachment because charge near an electrostatic adsorbable interface is dissipated. By contrast, there is a tendency that the label part constituting the electrostatic adsorbable laminated sheet maintains adsorbability to an adherend even after re-attachment through the self-adhesiveness of the grip layer.

Moreover, the label part and the support part also sufficiently sustain electrostatic adsorbability and adsorbability based on self-adhesiveness in use and can be used in display on an adherend over a long period. In addition, the label part and the support part can be easily separated from the adherend after use, without causing change in the surface condition of the adherend, and are less likely to cause paste residues.

In the case where a recording layer is disposed as an outermost layer of the electrostatic adsorbable laminated sheet by establishing the recording layer on the label part or the support part, the surface resistivity of the outermost surface where the recording layer is disposed in the electrostatic adsorbable laminated sheet is in a range similar to that of the surface resistivity of the recording layer mentioned above. As a result, the electrostatic adsorbable laminated sheet having the outmost surface having the preferred surface resistivity mentioned above is provided on both surfaces with antistatic performance while retaining the high electrostatic adsorbability of the grip layer, in the form of the electrostatic adsorbable laminated sheet before peeling of the label part or the support part. Accordingly, the electrostatic adsorbable laminated sheet exhibits suppressed electrostatic adsorbability to the outside, is less likely to adhere to the neighborhood at the time of the handling, such as transport, storage, or printing, of the electrostatic adsorbable laminated sheet or to adhere to another electrostatic adsorbable laminated sheet, and has favorable handleability.

(Recorded Matter)

The recorded matter of the present embodiment can be obtained by printing on at least one of the outermost surface at the label part side and the outermost surface at the support part side of the electrostatic adsorbable laminated sheet, and thereby establishing printing information or design. The printing information or the design includes letters, symbols, graphics, sketches, patterns, and the like. Examples thereof can include, but are not particularly limited to, trade names, manufacturer names, distributor names, places of origin, expiration dates, best-before dates, lot numbers, description about use methods, instructions and directions for use, preservation methods, raw material names, internal capacities, barcodes, two-dimensional codes, commodity identification design, logo marks, corporate marks, service marks, recycle identification marks, application tickets, serial numbers, characters, and patterns such as ruled lines, dots, and grids. These pieces of printing information or design can be appropriately selected and used in combination.

Examples of the purpose of the recorded matter can include POP cards (posters, seals, labels, decals, displays, etc.), retail premises guides (pamphlets, company guides, lists of goods, menus, etc.), mats (lunch mats, table mats, stationery, etc.), manuals (various manuals for duty assignment, work, operation, etc., process sheets, time schedules, etc.), charts (marine charts, weather maps, graphic charts, ruled charts, etc.), catalogues, maps (marine maps, route maps, outdoor maps, etc.), shop price lists, mountain climbing guides, visiting cards, lost child ID cards, cooking recipes, signboards (shop guides, direction/destination guides, etc.), schedule tables, road signs (for funeral/housing exhibition place, etc.), room identification cards, school record tables, signboards (for keep out, forest road construction, etc.), compartment piles, doorplates, calendars (with images), simple whiteboards, mouse pads, packaging materials (packaging papers, boxes, bags, etc.), and coasters, any of which can be used.

(Printing)

The electrostatic adsorbable laminated sheet are printable on at least one of the outermost surface at the label part side and the outermost surface at the support part side, as mentioned above. For such printing, a heretofore known approach may be used, such as offset printing, gravure printing, flexographic printing, letterpress printing, screen printing, an inkjet recording system, a thermal recording system, a thermal transfer recording system, or an electrophotographic recording system. Offset printing or an inkjet recording system is preferred because of easily changeable design or size. Oil-based ink, water-based ink or UV ink can be used as printing ink, and UV ink which is fast in drying rate is preferred.

(Adherend)

Examples of the adherend to which the display material consisting of the label part or the support part is adsorbed through the recorded matter mentioned above can include notice boards, advertising displays, signboards, whiteboards, walls, ceilings, pillars, doors, partition boards, floors, lockers, desks, bookshelves, windows (made of glass or a resin), refrigerators (metal surfaces, glass surfaces, plastic surfaces), various instruments (machine tools, printing machines, molding machines, etc.), and inside wall surfaces of cars (automobiles, buses, trains), ships and air planes, any of which can be used. Particularly, in the case where the adherend has high surface smoothness, the area to adhere closely to the recorded matter gets large, and the resulting electrostatic adsorbability also increases. Therefore, such an adherend can be preferably applied.

Hereinafter, particularly preferred examples of the electrostatic adsorbable laminated sheet according to the present embodiment will be described with reference to the drawings.

2. First Embodiment

The electrostatic adsorbable laminated sheet (i) according to the first embodiment will be described. The electrostatic adsorbable laminated sheet (i) of the present embodiment has a label part (1) and a support part (2). The electrostatic adsorbable laminated sheet (i) further has a grip layer as at least one layer of the label part (1) and the support part (2). Further, the label part (1) and the support part (2) are electrostatically adsorbed to each other via this grip layer. Hereinafter, the electrostatic adsorbable laminated sheet (i) will be described in more detail with reference to the drawings.

As shown in FIG. 1, electrostatic adsorbable laminated sheet (i) 1 of the present embodiment has label part (1) 11 and support part (2) 21. The label part (1) 11 has at least 3 layers, recording layer (A) 13, label layer (B) 14, and grip layer (C) 15, in this order. The support part (2) 21 has at least support layer (D) 25. In the electrostatic adsorbable laminated sheet (i) 1, the recording layer (A) 13, the label layer (B) 14, and the grip layer (C) 15 are integrally formed to constitute the label part (1) 11.

In this electrostatic adsorbable laminated sheet (i) 1, the label part (1) 11 and the support part (2) 21 are placed opposite to each other such that the grip layer (C) 15 and the support layer (D) 25 face each other. Further, the electrostatic adsorbable laminated sheet (i) 1 has a laminated structure where the grip layer (C) 15 and the support layer (D) 25 are electrostatically adsorbed to each other to have electrostatic adsorbable interface (N) 31. In use, the support part (2) 21 is peeled as a peelable sheet to expose the grip layer (C) 15. Its exposed surface is contacted with an adherend, whereby the label part (1) 11 is attached to the adherend. Hereinafter, each layer will be described in detail.

<Grip Layer>

The grip layer (C) adheres closely to the support part (2) through electrostatic adsorbability brought about by electrostatic charge retained at the electrostatic adsorbable interface (N), and self-adhesiveness (tackiness), and is adsorbed to an adherend through the electrostatic adsorbability and the self-adhesiveness in use.

<Label Layer>

The label layer (B) is a layer that intervenes between the recording layer (A) and the grip layer (C) and serves as a core moiety of the label part (1). When the label part (1) is subjected to electrostatically charge, the label layer (B) internally retains charge together with the grip layer (C). The resulting electrostatic adsorbability enables the label part (1) to be attached as a display material to an adherend. The recording layer (A) and the grip layer (C) are laminated to the surfaces, respectively, of the label layer (B). The label layer (B) may be subjected to corona discharge treatment in order to improve adhesiveness to these layers.

<Recording Layer>

It is preferred that the recording layer (A) should be disposed as an outermost layer at the label part (1) side, from the viewpoint of sufficiently exerting effects of conferring antistatic performance and improving recordability.

The recording layer (A) has antistatic performance, whereby the recording layer (A) surface has low electrostatic adsorbability even in the case where the electrostatic adsorbable laminated sheet (i) internally has charge. Furthermore, in a state before separation between the label part (1) and the support part (2), the electrostatic adsorbable laminated sheet (i) does not exert electrostatic adsorption performance. Thus, the electrostatic adsorbable laminated sheet (i) is less likely to cause troubles such as adhesion to a roll in a printing step or blocking between sheets.

<Label Part>

The label part (1) can be used as a display material by peeling the support part (2) from the electrostatic adsorbable laminated sheet (i). Features of the label part (1) are that: the label part (1) is attachable to various adherends for display; electrostatic adsorbability is high in display use; the electrostatic adsorbability is also sufficiently sustained; the label part (1) can be used for display over a long period; the electrostatic adsorbability is less susceptible to humidity; and the label part (1) can be easily peeled after use.

<Support Part>

The support part (2) is laminated to a surface, at the grip layer (C) side, of the label part (1) through the electrostatic adsorbability and self-adhesiveness of the label part (1), or through its own electrostatic adsorbability. The label part (1) can be used as a display material consisting of the label part (1) by peeling the support part (2) in use, as in release paper of a pressure-sensitive adhesive label. In this respect, the support part (2) may be used as a display material through its own electrostatic adsorbability.

The support part (2) blocks the runoff, to the outside, of charge stored in the inside of the label part (1) before the label part (1) is used for the display of printed matter, etc., and facilitates handling the electrostatic adsorbable laminated sheet (i) without exerting the internal electrostatic adsorbability of the label part (1) to the outside. Specifically, the support part (2) is a layer that is established in order to facilitate printing on the electrostatic adsorbable laminated sheet (i) while protecting the electrostatic adsorbability and self-adhesiveness of the label part (1).

The support part (2) is laminated through electrostatic adsorption by subjecting the label part (1) to electrostatically charge, and contacting the support part (2) with the grip layer (C) of the label part (1) with charge internally accumulated, whereby the electrostatic adsorbable laminated sheet (i) can be prepared. Alternatively, in the case where the support part (2) comprises a resin film similar to that of the label part (1) mentioned above, the support part (2) may be subjected to electrostatically charge to prepare the support part (2) with charge internally accumulated, which is then contacted with the grip layer (C) of the label part (1) and laminated therewith through electrostatic adsorption, whereby the electrostatic adsorbable laminated sheet (i) can be prepared.

<Electrostatic Adsorbable Laminated Sheet>

The electrostatic adsorbable laminated sheet (i) is obtained by contacting the label part (1) that has undergone electrostatically charge of the grip layer (C) with the support part (2). In this case, the charge internally accumulated in the label part (1) induces the dielectricity, i.e., electrostatic polarization, of the support part (2) in contact therewith, so that both the parts adhere to each other through electrostatic adsorbability. Alternatively, the electrostatic adsorbable laminated sheet (i) is obtained by contacting the support part (2) that has undergone electrostatically charge with the grip layer (C) of the label part (1) for electrostatic adsorption. In this case, the charge internally accumulated in the support part (2) induces the dielectricity of the grip layer (C) in contact therewith, so that both the parts adhere to each other through electrostatic adsorbability. Production by either of the approaches can produce an electrostatic adsorbable laminated sheet (i) having equivalent performance. Furthermore, the label part (1) and the support part (2) also adhere closely to each other through the self-adhesiveness of the grip layer (C). The lamination therebetween can be performed, for example, by taking up any one of the label part (1) and the support part (2) in a long roll, performing electrostatically charge by passing the roll between electrodes while unwinding the roll, separately unwinding the other part taken up in a long roll, and pressure-bonding both the parts with a press roll.

(Working Effects)

In the electrostatic adsorbable laminated sheet (i) of the present embodiment, the label part (1) having the grip layer (C) and the support part (2) are electrostatically adsorbed to each other. As a result, in the electrostatic adsorbable laminated sheet (i), adhesiveness at the electrostatic adsorbable interface (N) between the label part (1) and the support part (2) improves by the electrostatic adsorbability between the label part (1) and the support part (2) as well as the self-adhesiveness of the grip layer (C). Therefore, the electrostatic adsorbable laminated sheet (i) prevents lifting or coming off ascribable to displacement or deflection between the label part (1) and the support part (2) even upon treatment such as fabrication or printing or even when rolled up for transport or preservation, and thus has improved handleability. Thus, for example, even in the case of printing on the electrostatic adsorbable laminated sheet (i) using a printing machine such as an intermittent rotary label printing machine, it is possible to prevent the displacement of printed patterns, etc. and to enhance printing precision.

The label part (1) constituting the electrostatic adsorbable laminated sheet (i) can be peeled from the support part (2), attached to an adherend, and thereby used as a display material. In this respect, the label part (1) is attached to an adherend through electrostatic adsorbability and self-adhesiveness. Therefore, adsorbability (retaining force) to an adherend improves, as compared with a conventional adhesive sheet to be attached through self-adhesiveness or electrostatic adsorbable sheet to be attached through electrostatic adsorbability.

In the case where a conventional electrostatic adsorbable sheet is electrostatically adsorbed to an adherend, then peeled, and electrostatically adsorbed again to an adherend, adsorbability to the adherend is reduced in association with the re-attachment because charge near an electrostatic adsorbable interface is dissipated. By contrast, there is a tendency that the label part (1) constituting the electrostatic adsorbable laminated sheet (i) maintains adsorbability to an adherend even after re-attachment through the self-adhesiveness of the grip layer (C).

Moreover, the label part (1) also sufficiently sustains electrostatic adsorbability and adsorbability based on self-adhesiveness in use and can be used in display on an adherend over a long period. In addition, the label part (1) can be easily separated from the adherend after use, without causing change in the surface condition of the adherend, and is less likely to cause paste residues.

The electrostatic adsorbable laminated sheet (i) is provided on its upper surface with the recording layer (A) and provided on its lower surface with the support part (2). Therefore, the surface resistivity of the outermost surface at the recording layer (A) side in the electrostatic adsorbable laminated sheet (i) is in a range similar to that of the surface resistivity of the recording layer (A). Also, the surface resistivity of the outermost surface at the support part (2) side in the electrostatic adsorbable laminated sheet (i) is in a range similar to that of the surface resistivity of the surface of the support part (2). As a result, the electrostatic adsorbable laminated sheet (i) having the outmost surface having the preferred surface resistivity mentioned above is provided on both surfaces with antistatic performance while retaining the high electrostatic adsorbability of the grip layer (C), in the form of the electrostatic adsorbable laminated sheet (i) before peeling of the label part (1). Accordingly, the electrostatic adsorbable laminated sheet (i) exhibits suppressed electrostatic adsorbability to the outside, is less likely to adhere to the neighborhood at the time of the handling, such as transport, storage, or printing, of the electrostatic adsorbable laminated sheet (i) or to adhere to another electrostatic adsorbable laminated sheet (i), and has favorable handleability.

3. Modification of First Embodiment

Modification 1 of First Embodiment

Figure 2:
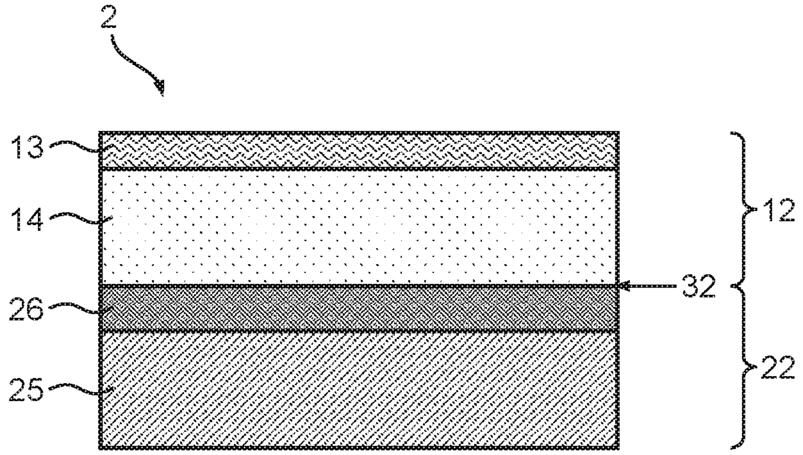
FIG. 2 is a cross-sectional view schematically showing one example of the layer configuration of an electrostatic adsorbable laminated sheet (ii) of modification 1 of the first example.

As shown in FIG. 2, electrostatic adsorbable laminated sheet (ii) 2 of modification 1 of the first embodiment has label part (1) 12 and support part (2) 22. The label part (1) 12 has at least 2 layers, recording layer (A) 13 and label layer (B) 14. The support part (2) 22 has at least 2 layers, grip layer (E) 26 and support layer (D) 25. In the electrostatic adsorbable laminated sheet (ii) 2, the recording layer (A) 13 and the label layer (B) 14 are integrally formed to constitute the label part (1) 12. Also, the grip layer (E) and the support layer (D) 25 are integrally formed to constitute the support part (2) 22.

In this electrostatic adsorbable laminated sheet (ii) 2, the label part (1) 12 and the support part (2) 22 are placed opposite to each other such that the label layer (B) 14 and the grip layer (E) 26 face each other. Further, the electrostatic adsorbable laminated sheet (ii) 2 has a laminated structure where the label layer (B) 14 and the grip layer (E) 26 are electrostatically adsorbed to each other to have electrostatic adsorbable interface (N) 32. In use, the support part (2) 22 is peeled as a peelable sheet to expose the label layer (B) 14. Its exposed surface is contacted with an adherend, whereby the label part (1) 12 is attached to the adherend. Also, the support part (2) 22 peeled from the label part (1) 12 is attachable to an adherend by contacting the grip layer (E) 26 having the exposed surface with the adherend.

In the electrostatic adsorbable laminated sheet (ii) 2, as in the electrostatic adsorbable laminated sheet (i) 1, adhesiveness at the electrostatic adsorbable interface (N) 32 between the label part (1) 12 and the support part (2) 22 improves by the self-adhesiveness of the grip layer (E) 26. Furthermore, the adsorbability of the support part (2) 22 to an adherend improves.

Modification 2 of First Embodiment

Figure 3:
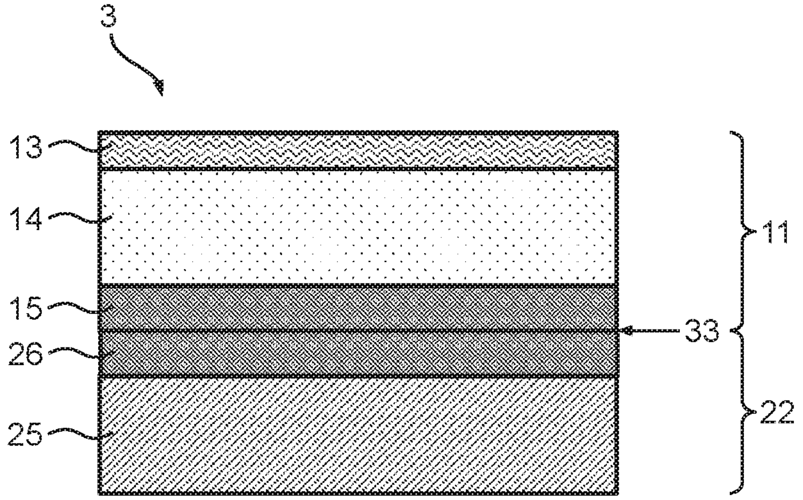
FIG. 3 is a cross-sectional view schematically showing one example of the layer configuration of an electrostatic adsorbable laminated sheet (iii) of modification 2 of the first example.

As shown in FIG. 3, electrostatic adsorbable laminated sheet (iii) 3 of modification 2 of the first embodiment has label part (1) 11 and support part (2) 22. The label part (1) 11 has at least 3 layers, recording layer (A) 13, label layer (B) 14, and grip layer (C) 15, in this order. The support part (2) 22 has at least 2 layers, grip layer (B) 26 and support layer (D) 25. In the electrostatic adsorbable laminated sheet (iii) 3, the recording layer (A) 13, the label layer (B) 14, and the grip layer (C) are integrally formed to constitute the label part (1) 11. Also, the grip layer (E) and the support layer (D) 25 are integrally formed to constitute the support part (2) 22.

In this electrostatic adsorbable laminated sheet (iii) 3, the label part (1) 11 and the support part (2) 22 are placed opposite to each other such that the grip layer (C) 15 and the grip layer (E) 26 face each other. Further, the electrostatic adsorbable laminated sheet (iii) 3 has a laminated structure where the grip layer (C) 15 and the grip layer (E) 26 are electrostatically adsorbed to each other to have electrostatic adsorbable interface (N) 33. Further, in use, the support part (2) 22 is peeled from the electrostatic adsorbable laminated sheet (iii) 3 to expose the grip layer (C) 15 and the grip layer (E) 26. Their exposed surfaces are contacted with an adherend, whereby the label part (1) 11 and/or the support part (2) 22 is attached to the adherend.

In the electrostatic adsorbable laminated sheet (iii) 3, as in the electrostatic adsorbable laminated sheet (i) 1, the adsorbability of each of the label part (1) 11 and the support part (2) 22 to an adherend improves by the self-adhesiveness of the grip layer (C) 15 and the grip layer (E) 26. Furthermore, in the electrostatic adsorbable laminated sheet (iii) 3, the label part (1) 11 and the support part (2) 22 adhere closely to each other via the grip layer (C) 15 and the grip layer (E) 26, whereby adhesiveness at the electrostatic adsorbable interface (N) 33 between the label part (1) 11 and the support part (2) 22 further improves.

Modification 3 of First Embodiment

Figure 4:
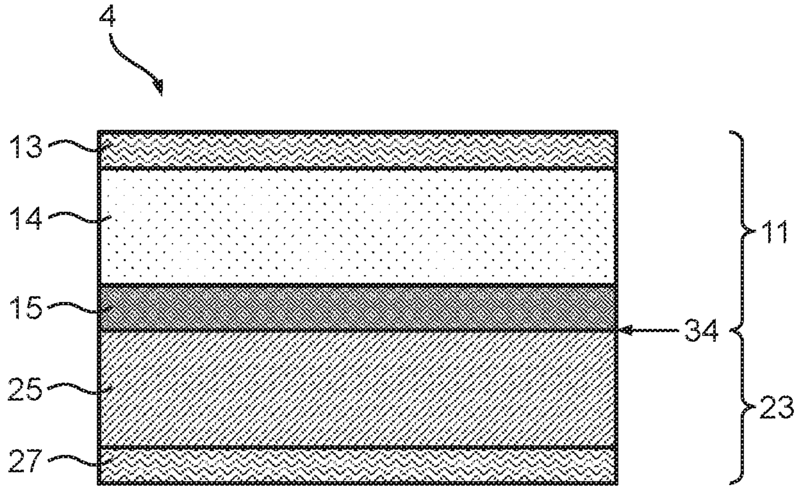
FIG. 4 is a cross-sectional view schematically showing one example of the layer configuration of an electrostatic adsorbable laminated sheet (iv) of modification 3 of the first example.

As shown in FIG. 4, electrostatic adsorbable laminated sheet (iv) 4 of modification 3 of the first embodiment is configured such that in the electrostatic adsorbable laminated sheet (i) 1 of the first embodiment, support part (2) 23 further has recording layer (F) 27 at a surface side opposite to the surface electrostatically adsorbed to label part (1) 11. In this way, the support part (2) 23 has at least 2 layers, support layer (D) 25 and the recording layer. (F) 27. It is preferred that the recording layer (F) 27, as in the recording layer (A) 13, should be disposed as an outermost layer at the support part (2) 23 side of the electrostatic adsorbable laminated sheet (i) 1. This electrostatic adsorbable laminated sheet (iv) 4, as in the electrostatic adsorbable laminated sheet (i) 1, has a laminated structure where the grip layer (C) 15 and the support layer (D) 25 are electrostatically adsorbed to each other to have electrostatic adsorbable interface (N) 34. In the electrostatic adsorbable laminated sheet (iv) 4, the recording layer (A) 13, the label layer (B) 14, and the grip layer (C) are integrally formed to constitute the label part (1) 11. Also, the support layer (D) 25 and the recording layer (F) 27 are integrally formed to constitute the support part (2) 23.

The electrostatic adsorbable laminated sheet (iv) 4 has the following effects, in addition to the effects obtained in the electrostatic adsorbable laminated sheet (i) 1. The electrostatic adsorbable laminated sheet (iv) 4 has, on its both surfaces, the recording layer (A) 13 and the recording layer (F) 27 at the outer side of the label layer (B) 14 and the support layer (D) 25. As a result, recordability on both surfaces improves, and fabrication such as printing is facilitated. Furthermore, antistatic performance is imparted to both surfaces, so that adhesion or blocking between such sheets can be further effectively prevented.

Modification 4 of First Embodiment

Figure 5:
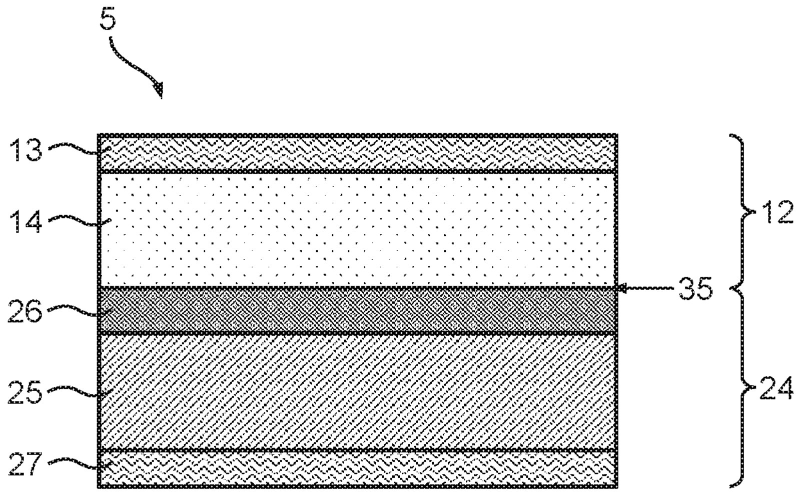
FIG. 5 is a cross-sectional view schematically showing one example of the layer configuration of an electrostatic adsorbable laminated sheet (v) of modification 4 of the first example.

As shown in FIG. 5, electrostatic adsorbable laminated sheet (v) 5 of modification 4 of the first embodiment is configured such that in the electrostatic adsorbable laminated sheet (ii) 2 of modification 1 of the first embodiment, support part (2) 24 further has recording layer (F) 27 at a surface side opposite to the surface electrostatically adsorbed to label part (1) 12. In this way, the support part (2) 24 has at least 3 layers, grip layer (E) 26, support layer (D) 25, and the recording layer (F) 27, in this order. It is preferred that the recording layer (F) 27, as in the recording layer (A) 13, should be disposed as an outermost layer at the support part (2) 24 side of the electrostatic adsorbable laminated sheet (v) 5. This electrostatic adsorbable laminated sheet (v) 5, as in the electrostatic adsorbable laminated sheet (ii) 2, has a laminated structure where the label layer (B) 14 and the grip layer (E) 26 are electrostatically adsorbed to each other to have electrostatic adsorbable interface (N) 35. In the electrostatic adsorbable laminated sheet (v) 5, the recording layer (A) 13 and the label layer (B) 14 are integrally formed to constitute the label part (1) 12. Also, the grip layer (E), the support layer (D) 25, and the recording layer (F) 27 are integrally formed to constitute the support part (2) 24.

In the electrostatic adsorbable laminated sheet (v) 5, as in the electrostatic adsorbable laminated sheet (iv) 4, recordability on both surfaces improves, and fabrication such as printing is facilitated. Furthermore, antistatic performance is imparted to both surfaces, so that adhesion or blocking between such sheets can be further effectively prevented.

Modification 5 of First Embodiment

Figure 6:
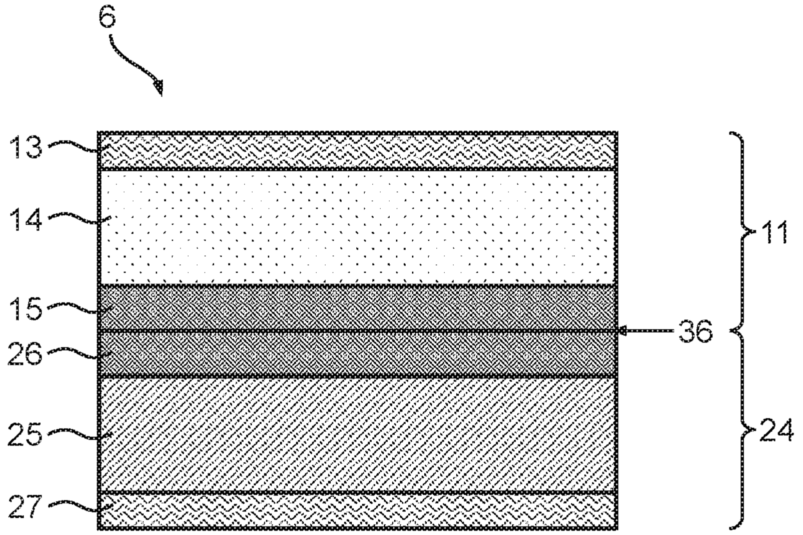
FIG. 6 is a cross-sectional view schematically showing one example of the layer configuration of an electrostatic adsorbable laminated sheet (vi) of modification 5 of the first example.

As shown in FIG. 6, electrostatic adsorbable laminated sheet (vi) 6 of modification 5 of the first embodiment is configured such that in the electrostatic adsorbable laminated sheet (iii) 3 of modification 2 of the first embodiment, support part (2) 24 further has recording layer (F) 27 at a surface side opposite to the surface electrostatically adsorbed to label part (1) 11. In this way, the support part (2) 24 has at least 3 layers, grip layer (E) 26, support layer (D) 25, and the recording layer (F) 27, in this order. It is preferred that the recording layer (F) 27, as in the recording layer (A) 13, should be disposed as an outermost layer at the support part (2) 24 side of the electrostatic adsorbable laminated sheet (vi) 6. This electrostatic adsorbable laminated sheet (vi) 6, as in the electrostatic adsorbable laminated sheet (iii) 3, has a laminated structure where the grip layer (C) 15 and the grip layer (E) 26 are electrostatically adsorbed to each other to have electrostatic adsorbable interface (N) 36. In the electrostatic adsorbable laminated sheet (vi) 6, the recording layer (A) 13, the label layer (B) 14, and the grip layer (C) are integrally formed to constitute the label part (1) 11. Also, the grip layer (E), the support layer (D) 25, and the recording layer (F) 27 are integrally formed to constitute the support part (2) 24.

In the electrostatic adsorbable laminated sheet (vi) 6, as in the electrostatic adsorbable laminated sheet (iv) 4, recordability on both surfaces improves, and fabrication such as printing is facilitated. Furthermore, antistatic performance is imparted to both surfaces, so that adhesion or blocking between such sheets can be further effectively prevented.

4. Second Embodiment

The electrostatic adsorbable laminated sheet (vii) according to the second embodiment will be described. Hereinafter, in the description of the second embodiment, the second embodiment is also simply referred to as the present embodiment. The electrostatic adsorbable laminated sheet (vii) according to the present embodiment has the same or similar configuration, except for some configurations, as in the electrostatic adsorbable laminated sheet (i) according to the first embodiment mentioned above, so that the same or similar description as in the electrostatic adsorbable laminated sheet (i) will be omitted, and the same reference numerals as in the first embodiment will be used in the description.

The electrostatic adsorbable laminated sheet (vii) of the present embodiment has a label part (3), a first support part (support part (2)) placed on one surface of the label part (3), and a second support part (support part (4)) placed on the other surface of the label part (3). The electrostatic adsorbable laminated sheet (vii) further has a first grip layer as at least one layer of the label part (3) and the support part (2). Further, the label part (3) and the support part (2) are electrostatically adsorbed to each other via this first grip layer. In addition, the electrostatic adsorbable laminated sheet (vii) has a second grip layer as at least one layer of the label part (3) and the support part (4). Further, the label part (3) and the support part (4) are electrostatically adsorbed to each other via this second grip layer. Hereinafter, the electrostatic adsorbable laminated sheet (vii) will be described in more detail with reference to the drawings.

Figure 7:
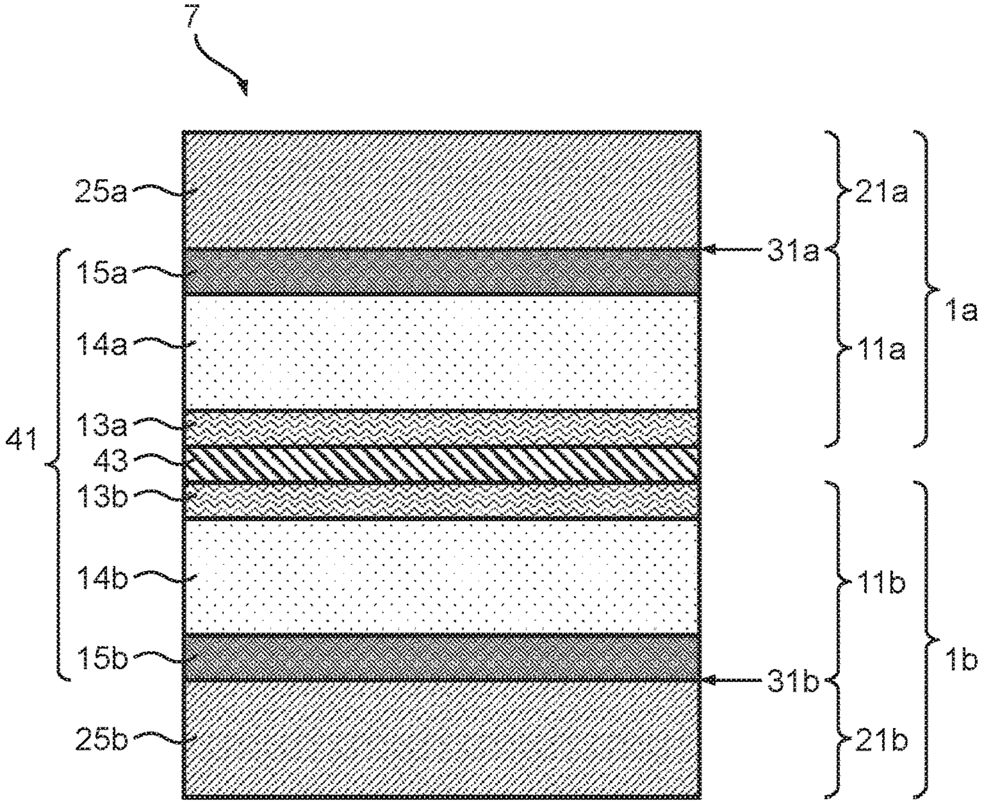
FIG. 7 is a cross-sectional view schematically showing one example of the layer configuration of an electrostatic adsorbable laminated sheet (vii) of the second example.

As shown in FIG. 7, electrostatic adsorbable laminated sheet (vii) 7 has label part (3) 41, support part (2) 21*a* placed on one surface of the label part (3) 41, and support part (4) 21*b* placed on the other surface of the label part (3) 41. The label part (3) 41 has at least 7 layers, grip layer (C) 15*a*, label layer (B) 14*a*, recording layer (A) 13*a*, adhesive layer (L) 43, recording layer (G) 13*b*, label layer (H) 14*b*, and grip layer (I) 15*b*, in this order. The support part (2) 21*a* has at least support layer (D) 25*a*. The support part (4) 21*b* has at least support layer (J) 25*b*. In the electrostatic adsorbable laminated sheet (vii) 7, the grip layer (C) 15*a*, the label layer (B) 14*a*, the recording layer (A) 13*a*, the adhesive layer (L) 43, the recording layer (G) 13*b*, the label layer (H) 14*b*, and the grip layer (I) 15*b* are integrally formed to constitute the label part (3) 41.

In this electrostatic adsorbable laminated sheet (vii) 7, the support part (2) 21*a* and the label part (3) 41 are placed opposite to each other such that the support layer (D) 25*a* and the grip layer (C) 15*a* face each other. Further, the electrostatic adsorbable laminated sheet (vii) 7 has a laminated structure where the support layer (D) 25*a* and the grip layer (C) 15*a* are electrostatically adsorbed to each other to have electrostatic adsorbable interface (N) 31*a*. Also, in the electrostatic adsorbable laminated sheet (vii) 7, the label part (3) 41 and the support part (4) 21*b* are placed opposite to each other such that the grip layer (I) 15*b* and the support layer (J) 25*b* face each other. Further, the electrostatic adsorbable laminated sheet (vii) 7 has a laminated structure where the grip layer (I) 15*b* and the support layer (J) 25*b* are electrostatically adsorbed to each other to have electrostatic adsorbable interface (O) 31*b*.

The electrostatic adsorbable laminated sheet (vii) 7 can also interpreted as a laminate having electrostatic adsorbable laminated sheet (i) 1*a*, the adhesive layer (L) 43, and electrostatic adsorbable laminated sheet (i) 1*b* in this order. The electrostatic adsorbable laminated sheet (i) 1*b* and each layer constituting the electrostatic adsorbable laminated sheet (i) 1*b* are configured in the same way as in the electrostatic adsorbable laminated sheet (i) 1*a*. The electrostatic adsorbable laminated sheet (i) 1*b* has label part (6) 11*b* and the support part (4) 21*b*. The label part (6) has at least 3 layers, the recording layer (G) 13*b*, the label layer (H) 14*b*, and the grip layer (I) 15*b*, in this order. The electrostatic adsorbable laminated sheet (vii) 7 has a laminated structure where the two electrostatic adsorbable laminated sheets, the electrostatic adsorbable laminated sheet (i) 1*a* and the electrostatic adsorbable laminated sheet (i) 1*b*, are laminated with each other via the adhesive layer (L) 43 such that their recording layer (A) 13*a* and recording layer (G) 13*b* sides face each other.

The adhesive layer (L) 43 can bond the recording layer (A) 13*a* of the electrostatic adsorbable laminated sheet (i) 1*a* to one surface and the recording layer (G) 15*b* of the electrostatic adsorbable laminated sheet (i) 1*b* to the other surface through its adhesive force.

The support part (2) 21*a* and the support part (4) 21*b* are disposed as peelable sheets for protection so as not to exert the self-adhesiveness and electrostatic adsorbability of the grip layer (C) 15*a* or the grip layer (I) 15*b* to the outside before a printing sheet layer mentioned later is established on the grip layer (C) 15*a* or the grip layer (I) 15*b*. Therefore, when a printing sheet layer is established on the grip layer (C) 15*a* or the grip layer (I) 15*b*, the support part (2) 21*a* or the support part (4) 21*b* is peeled and removed, as in release paper of a usual pressure-sensitive adhesive label. The support part (4) and the support layer (J) can employ the same as the support part (2) and the support layer (D) according to the first embodiment mentioned above.

After removal of any one of the support part (2) 21*a* and the support part (4) 21*b*, a printing sheet layer can be bonded to the label part (3) 41 via the grip layer (C) 15*a* or the grip layer (I) 15*b*. As a result, a laminate having the printing sheet layer, the label part (3) 41, and the support part (4) 21*b* in this order, or a laminate having the support part (2) 21*a*, the label part (3) 41, and the printing sheet layer in this order is obtained. In use, the support part (2) 21*a* or the support part (4) 21*b* is peeled as a peelable sheet from this laminate to expose a surface, at the grip layer (C) 15*a* or grip layer (I) 15*b* side, of the label part (3) 41. The exposed surface is electrostatically adsorbed to an adherend, whereby the label part (3) 41 is attached as a display material to the adherend. As mentioned above, the electrostatic adsorbable laminated sheet (vii) 7 can be used as a mount film for a printing sheet layer to be attached to the grip layer (C) 15*a* or the grip layer (I) 15*b*.

As described above, the electrostatic adsorbable laminated sheet (vii) 7 can also be interpreted as the electrostatic adsorbable laminated sheet (i) 1*a* and the electrostatic adsorbable laminated sheet (i) 1*b* laminated via the adhesive layer (L) 43. In this respect, in the case of using the electrostatic adsorbable laminated sheet (vii) 7 as the mount film mentioned above, the adhesiveness and adsorbability of the mount film are exerted even in the absence of the recording layer (A) 13*a* and the recording layer (G) 13*b*. Therefore, the electrostatic adsorbable laminated sheet (vii) 7 may be configured such that the recording layer (A) 13*a* and the recording layer (G) 13*b* are established, if necessary. Thus, in a modification of this electrostatic adsorbable laminated sheet, the label part (3) 41 may have at least 5 layers, grip layer (C) 15*a*, label layer (B) 14*a*, adhesive layer (L) 43, label layer (H) 14*b*, and grip layer (I) 15*b*, in this order.

The electrostatic adsorbable laminated sheet (vii) 7 can at least have grip layers on its both surfaces, from the viewpoint of using the electrostatic adsorbable laminated sheet (vii) 7 as the mount film mentioned above. Thus, in a modification of this electrostatic adsorbable laminated sheet, the label part (3) 41 may have at least 3 layers, grip layer (C) 15*a*, label layer (B) 14*a*, and grip layer (I) 15*b*, in this order.

The electrostatic adsorbable laminated sheet (vii) 7 can also be interpreted as two electrostatic adsorbable laminated sheets (i) 1*a* and 1*b* laminated with the adhesive layer (L) 43. Any one of the electrostatic adsorbable laminated sheets (i) 1*a* and 1*b* may be changed to the electrostatic adsorbable laminated sheet (iii) 3 mentioned above, or both of them may be changed to the electrostatic adsorbable laminated sheet (iii) 3.

The electrostatic adsorbable laminated sheet (vii) 7 may further have a recording layer (not shown) as an outermost layer of at least one of the support part (2) 21*a* and the support part (4) 21*b*.

Hereinafter, each layer will be described in detail.

<Adhesive Layer>

In the case of obtaining a laminate of two electrostatic adsorbable laminated sheets (i) and the adhesive layer (L), an adhesive is used for bonding the electrostatic adsorbable laminated sheets (i) to each other.

An adhesive such as a water-based adhesive, a solvent-based adhesive, or a hot-melt-type adhesive can be used as the adhesive. Any of these adhesives is applied onto the surface at the recording layer (A) or recording layer (G) side of at least one of the electrostatic adsorbable laminated sheets (i) by an approach such as coating, spraying, or melt extrusion lamination, while the surface at the recording layer (A) or recording layer (G) side of the other electrostatic adsorbable laminated sheet (i) is bonded thereto by a usual method such as wet lamination, dry lamination or melt extrusion lamination. Alternatively, the electrostatic adsorbable laminated sheets (i) may be bonded to each other via a thermally adhesive film. Among these approaches, a dry lamination method is preferred because of excellent adhesion strength between the electrostatic adsorbable laminated sheets (i), and excellent transparency.

In the case of performing dry lamination, examples of the adhesive can include liquid adhesives in the form of solution type or emulsion type which have flowability and enable coating by dissolving, dispersing, emulsifying, or diluting a resin component selected from the group consisting of an ether resin, an ester resin, a urethane resin, a urea resin, an acrylic resin, an amide resin, an epoxy resin, and the like in a phase using a heretofore known solvent.

Examples of the ether resin include polyether polyol obtained by polymerizing an oxirane compound such as ethylene oxide, propylene oxide, butylene oxide, or tetrahydrofuran using low-molecular-weight polyol such as ethylene glycol, propylene glycol, glycerin, trimethylolpropane, or bisphenol A as an initiator, and more specifically include polyethylene glycol, polypropylene glycol, and polytetramethylene glycol.

Examples of the ester resin include dehydration reaction products of polybasic acids and polyhydric alcohols. Examples of the polybasic acid include phthalic anhydride, isophthalic acid, terephthalic acid, glutaric acid, adipic acid, pimelic acid, suberic acid, azelaic acid, sebacic acid, and hexahydrophthalic anhydride. Isophthalic acid dimethyl ester or terephthalic acid dimethyl ester which is a derivative thereof can also be used as the polybasic acid. Examples of the polyhydric alcohol include ethylene glycol, diethylene glycol, triethylene glycol, trimethylolpropane, propylene glycol, dipropylene glycol, 1,6-hexanediol, neopentyl glycol, hydrogenated bisphenol A, 1,4-butanediol, 1,4-cyclohexanedimethanol, 2,2,4-trimethylpentane-1,3-diol, and polyethylene glycol. The ester resin is obtained by using one or two or more of the polybasic acids mentioned above, using one or two or more of the polyhydric alcohols mentioned above, and dehydrating and polymerizing them.

Examples of the urethane resin include condensation reaction products of an isocyanate compound with at least one of the polyhydric alcohol, the ether resin, and the ester resin mentioned above. Examples of the isocyanate compound include: aliphatic isocyanates such as hexamethylene diisocyanate, 2,4-diisocyanato-1-1-methylcyclohexane, diisocyanatocyclobutane, tetramethylene diisocyanate, hydrogenated xylylene diisocyanate, dicyclohexylmethane diisocyanate, dimethyldicyclohexylmethane diisocyanate, lysine diisocyanate, cyclohexane diisocyanate, dodecane diisocyanate, tetramethylxylene diisocyanate and isophorone diisocyanate; aromatic isocyanates such as tolylene-2,4-diisocyanate, tolylene-2,6-diisocyanate, diphenylmethane-4,4'-diisocyanate, 3-methyldiphenylmethane-4,4'-diisocyanate, m- or p-phenylene diisocyanate, o-, m- or p-xylylene diisocyanate, chlorophenylene-2,4-diisocyanate, naphthalene-1,5-diisocyanate, diphenyl-4,4'-diisocyanate, 3,3'-dimethyldiphenyl-1,3,5-triisopropylbenzene-2,4-diisocyanate, carbodiimide-modified diphenylmethane diisocyanate, and polymethylene polyphenyl polyisocyanate; and isocyanate monomers such as diphenyl ether diisocyanate. Further, a polyisocyanate compound modified with a polyhydric alcohol can also be used for increasing the molecular weight of the urethane resin while conferring various performance such as adhesive force and stability.

Examples of the urea resin include condensation reaction products of the isocyanate compound mentioned above with an amine compound. Examples of the amine compound include: aliphatic amines such as ethylenediamine, 1,2-propylenediamine, 1,3-propylenediamine, 1,4-butanediamine, hexamethylenediamine, diethylenetriamine, triethylenetetramine, and tetraethylenepentamine; alicyclic amines such as isophoronediamine, dicyclohexylmethanediamine, methylcyclohexanediamine, isopropylidene bis-4-cyclohexyldiamine, and 1,4-cyclohexanediamine; and heterocyclic amines such as piperazine, methylpiperazine, and aminoethylpiperazine.

Examples of the acrylic resin include products obtained by polymerizing an acrylic compound using an organic peroxide as a polymerization initiator. Examples of the acrylic compound include (meth)acrylic acid, methyl (meth) acrylate, ethyl (meth)acrylate, n-propyl (meth)acrylate, n-butyl (meth)acrylate, t-butyl (meth)acrylate, cyclohexyl (meth)acrylate, 2-ethylhexyl (meth)acrylate, lauryl (meth) acrylate, tridecyl (meth)acrylate, stearyl (meth)acrylate, 2-hydroxyethyl (meth)acrylate, 2-hydroxypropyl (meth) acrylate, (meth)acrylic nitrile, (meth)acrylamide, and glycidyl (meth)acrylate. The acrylic resin is obtained by polymerizing one or two or more of these acrylic compounds.

Examples of the amide resin include condensation reaction products of the polybasic acid mentioned above with the amine compound mentioned above.

Examples of the epoxy resin include a homocondensation reaction product of polyglycidyl ether obtained by reacting a polyhydric phenol with at least one of epihalohydrin and a low-molecular-weight epoxy compound, and a condensation reaction product obtained through the condensation reaction of a polyhydric phenol with the ether resin, the ester resin, the urethane resin, the urea resin, the acrylic resin, or the amide resin mentioned above.

Specific examples of the polyhydric phenol include bisphenols such as bisphenol A (2,2-bis(4-hydroxyphenyl)propane), bisphenol B (2,2-bis(4-hydroxyphenyl)butane), bisphenol E (2,2-bis(4-hydroxyphenyl)ethane), bisphenol S (2,2-bis(4-hydroxyphenyl)sulfone), 2,2-bis(4-hydroxyphenyl)-4-methylpentane, 1,1-bis(4-hydroxyphenyl)-2-methylpropane, bis(4-hydroxyphenyl)phenylmethane, 2,2-bis(4-hydroxy-3,5-dimethylphenyl)methane, 2,2-bis(4-hydroxy-3,5-dimethylphenyl)ethane, 2,2-bis(4-hydroxy-3,5-dimethylphenyl)propane, 2,2-bis(4-hydroxy-3,5-dimethylphenyl)butane, 2,2-bis(4-hydroxy-3-methylphenyl) butane, 2,2-bis(4-hydroxy-3-methylphenyl)-2-phenylethane, biphenol, bis(4-hydroxyphenyl) ether, and bis (4-hydroxyphenyl) ketone.

The coating with such an adhesive layer is performed using a die coater, a bar coater, a comma coater, a lip coater, a roll coater, a rod coater, a curtain coater, a gravure coater, a spray coater, a blade coater, a reverse coater, an air knife coater, a slide hopper, or the like. Then, smoothing is performed, if necessary, and the adhesive layer is formed through a drying step.

The electrostatic adsorbable laminated sheet (vii) can be obtained by coating at least one of the surfaces at the recording layer (A) and recording layer (G) sides of the electrostatic adsorbable laminated sheets (i) with the adhesive mentioned above by the coating method mentioned above, drying the adhesive to establish an adhesive layer (L), subsequently laminating the adhesive layer (L) to the surface at the recording layer (A) or recording layer (G) side of the other electrostatic adsorbable laminated sheet (i), and pressure-bonding the laminate with a press roll (nip roll).

The dry thickness of the adhesive layer (L) established by coating with the adhesive is preferably 0.1 μm, more preferably 0.2 μm, further preferably 0.5 μm, in terms of the lower limit thereof, and is preferably 100 μm, more preferably 50 μm, further preferably 25 μm, in terms of the upper limit thereof. More specifically, the thickness of the adhesive layer (L) is preferably 0.1 to 100 μm, more preferably 0.2 to 50 μm, further preferably 0.5 to 25 μm. When the thickness of the adhesive layer (L) is 0.1 μm or larger, uniform and sufficient adhesive force is obtained without generating a site partially having no adhesive due to uneven coating. On the other hand, when the thickness is 100 μm or smaller, reduction in light transmittance by the adhesive layer (L) is small, and the visibility of printed matter or the like viewed via the label part (3) is excellent.

In the case of obtaining the electrostatic adsorbable laminated sheet (vii) by a melt extrusion lamination approach using a hot-melt-type adhesive, the electrostatic adsorbable laminated sheet (vii) is obtained by extruding a hot-melt-type adhesive mentioned later into a melted film shape in a die to laminate the film to at least one of the surfaces at the recording layer (A) and recording layer (G) sides of the electrostatic adsorbable laminated sheets (i), subsequently laminating the melted film to the surface at the recording layer (A) or recording layer (G) side of the other electrostatic adsorbable laminated sheet (i), and pressure-bonding the laminate with a press roll.

In the case of performing melt extrusion lamination, examples of the hot-melt-type adhesive include: polyolefin resins such as low-density polyethylene and ethylene/vinyl acetate copolymers; metal salts of ethylene/(meth)acrylic acid copolymers (e.g., Surlyn®); halogenated polyolefin resins such as chlorinated polyethylene and chlorinated polypropylene; polyamide resins; polybutyral resins; and urethane resins.

<Printing Sheet Layer>

As mentioned above, in the electrostatic adsorbable laminated sheet (vii), a printing sheet layer may be disposed on a surface at the outer side of the grip layer (C) or (I). In this context, the printing sheet layer is non-adhesive printed matter.

A laminate comprising the printing sheet layer and the label part (3), which is obtained by peeling the support part (4) from the electrostatic adsorbable laminated sheet (vii) provided with the printing sheet layer on the surface of the grip layer (C), is attachable as a display material to an adherend. Likewise, a laminate comprising the printing sheet layer and the label part (3), which is obtained by peeling the support part (2) from the electrostatic adsorbable laminated sheet (vii) provided with the printing sheet layer on the surface of the grip (I), is attachable as a display material to an adherend.

Generally available printed matter can be usually used variously as the printing sheet layer. Examples thereof can include printed matter obtained by printing on one surface or both surfaces of natural pulp paper (e.g., wood-free paper or kraft paper), synthetic paper, or a film of a plastic such as a polyolefin resin (e.g., polyethylene or polypropylene), a polyester resin (e.g., polyethylene terephthalate), or a polyamide resin (e.g., nylon) by a heretofore known approach such as offset printing, gravure printing, flexographic printing, letterpress printing, screen printing, inkjet printing, thermal recording printing, thermal transfer printing, or electrophotographic printing.

(Working Effects)

In the electrostatic adsorbable laminated sheet (vii) 7 of the present embodiment, as in the electrostatic adsorbable laminated sheet (i) 1, adhesiveness at the electrostatic adsorbable interface (N) 31*a* and the electrostatic adsorbable interface (O) 31*b* between the label part (3) 41 and the support part (2) 21*a* or the support part (4) 21*b* improves by the self-adhesiveness of the grip layer (C) 15*a* and the grip layer (I) 15*b*. Furthermore, the electrostatic adsorbable laminated sheet (vii) 7 can be used as a mount film by establishing a printing sheet layer on any one of the grip layer (C) 15*a* and the grip layer (I) 15*b* having the exposed surface. In this respect, the label part (3) 41 is attached to a printing sheet layer and an adherend through the electrostatic adsorbability and self-adhesiveness. Therefore, in the case of intervening between the printing sheet layer and the adherend, adsorbability improves as compared with a conventional mount film to be attached by self-adhesiveness or electrostatic adsorbability.

5. Modification of Second Embodiment

Figure 8:
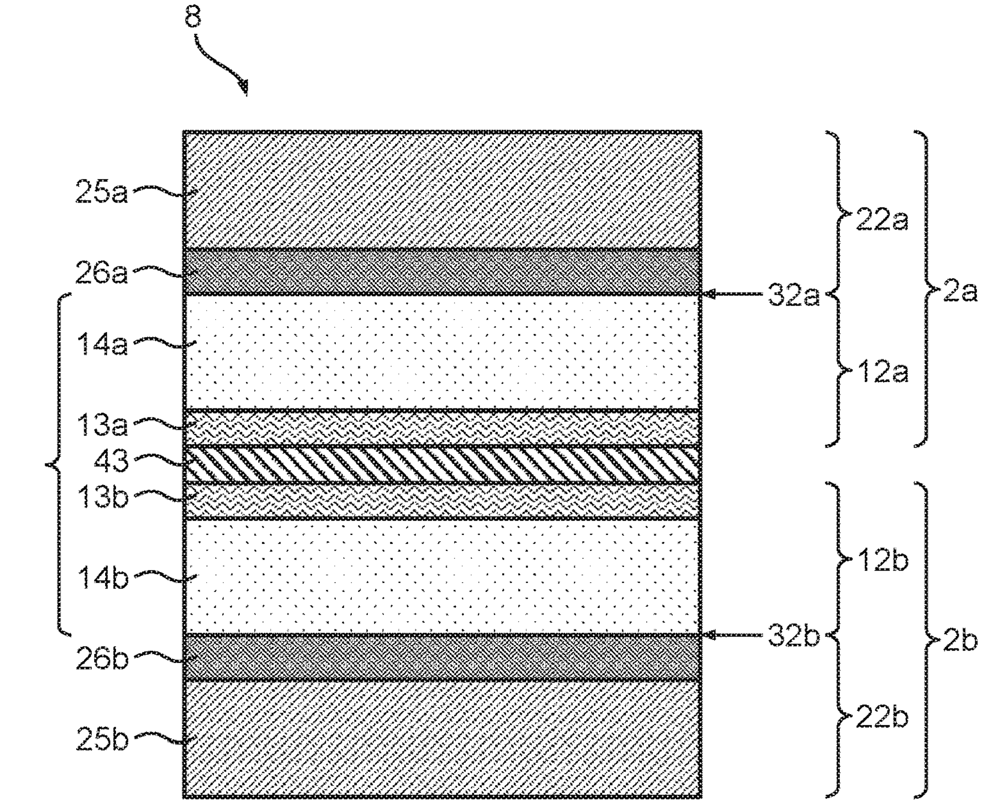
FIG. 8 is a cross-sectional view schematically showing one example of the layer configuration of an electrostatic adsorbable laminated sheet (viii) of a modification of the second example.

As shown in FIG. 8, in electrostatic adsorbable laminated sheet (viii) 8 of a modification of the second embodiment, label part (3) 42 has at least 5 layers, label layer (B) 14*a*, recording layer (A) 13*a*, adhesive layer (L) 43, recording layer (G) 13*b*, and label layer (H) 14*b*, in this order. Support part (2) 22*a* has at least 2 layers, support layer (D) 25*a* and grip layer (E) 26*a*. Support part (4) 22*b* has at least 2 layers, support layer (J) 25*b* and grip layer (K) 26*b*. In the electrostatic adsorbable laminated sheet (viii) 8, the label layer (B) 14*a*, the recording layer (A) 13*a*, the adhesive layer (L) 43, the recording layer (G) 13*b*, and the label layer (H) 14*b* are integrally formed to constitute the label part (3) 42. Also, the support layer (D) 25*a* and the grip layer (E) 26*a* are integrally formed to constitute the support part (2) 22*a*. Also, the support layer (J) 25*b* and the grip layer (K) 26*b* are integrally formed to constitute the support part (4) 22*b*.

In this electrostatic adsorbable laminated sheet (viii) 8, the support part (2) 22*a* and the label part (3) 42 are placed opposite to each other such that the grip layer (E) 26*a* and the label layer (B) 14*a* face each other. Further, the electrostatic adsorbable laminated sheet (viii) 8 has a laminated structure where the grip layer (E) 26*a* and the label layer (B) 14*a* are electrostatically adsorbed to each other to have electrostatic adsorbable interface (N) 32*a*. In the electrostatic adsorbable laminated sheet (viii) 8, the label part (3) 42 and the support part (4) 22*b* are placed opposite to each other such that the label layer (H) 14*b* and the grip layer (K) 26*b* face each other. Further, the electrostatic adsorbable laminated sheet (viii) 8 has a laminated structure where the label layer (H) 14*b* and the grip layer (K) 26*b* are electrostatically adsorbed to each other to have electrostatic adsorbable interface (O) 32*b*.

After removal of any one of the support part (2) 22*a* and the support part (4) 22*b*, a printing sheet layer can be bonded to the label part (3) 42 via the label layer (B) 14*a* or the label layer (H) 14*b*. As a result, a laminate having the printing sheet layer, the label part (3) 42, and the support part (4) 22*b* in this order, or a laminate having the support part (2) 22*a*, the label part (3) 42, and the printing sheet layer in this order is obtained. In use, the support part (2) 22*a* or the support part (4) 22*b* is peeled as a peelable sheet from this laminate to expose a surface, at the label layer (B) 14*a* or label layer (H) 14*b* side, of the label part (3) 42. The exposed surface is electrostatically adsorbed to an adherend, whereby the label part (3) 42 is attached as a display material to the adherend. As mentioned above, the electrostatic adsorbable laminated sheet (viii) 8 can be used as a mount film for a printing sheet layer to be attached to the label layer (B) 14*a* or the label layer (H) 14*b*.

In the electrostatic adsorbable laminated sheet (viii) 8, as in the electrostatic adsorbable laminated sheet (vii) 7, adhesiveness at the electrostatic adsorbable interface (N) 32*a* and the electrostatic adsorbable interface (0) 32*b* between the label part (3) 42 and the support part (2) 22*a* or the support part (4) 22*b* improves by the self-adhesiveness of the grip layer (E) 26*a* and the grip layer (K) 26*b*.

The electrostatic adsorbable laminated sheet (viii) 8, as in the electrostatic adsorbable laminated sheet (vii) 7, may be configured such that the recording layer (A) 13*a* and the recording layer (G) 13*b* are established, if necessary. Thus, in a modification of this electrostatic adsorbable laminated sheet, the label part (3) 42 may have 3 layers, label layer (B) 14*a*, adhesive layer (L) 43, and label layer (H) 14*b*, in this order.

The support part (2) 22*a* and the support part (4) 22*b* can be electrostatically adsorbable, from the viewpoint of using the electrostatic adsorbable laminated sheet (viii) 8 as the mount film mentioned above. Thus, in a modification of this electrostatic adsorbable laminated sheet, the label part (3) 42 may be configured as a single layer having label layer (B) 14*a*.

The electrostatic adsorbable laminated sheet (viii) 8 can also be interpreted as two electrostatic adsorbable laminated sheets (ii) 2*a* and 2*b* laminated with the adhesive layer (L) 43. Any one of the electrostatic adsorbable laminated sheets (ii) 2*a* and 2*b* may be changed to the electrostatic adsorbable laminated sheet (iii) 3 mentioned above, or both of them may be changed to the electrostatic adsorbable laminated sheet (iii) 3.

6. Third Embodiment

Electrostatic adsorbable laminated sheet (ix) 9 according to the third embodiment will be described. Hereinafter, in the description of the third embodiment, the third embodiment is also simply referred to as the present embodiment. The electrostatic adsorbable laminated sheet (ix) 9 according to the present embodiment has the same or similar configuration, except for some configurations, as in the electrostatic adsorbable laminated sheet (i) 1 according to the first embodiment or the electrostatic adsorbable laminated sheet (vii) 7 according to the second embodiment mentioned above, so that the same or similar description as in the electrostatic adsorbable laminated sheet (i) 1 or (vii) 7 will be omitted, and the same reference numerals as in the first embodiment or the second embodiment will be used in the description.

The electrostatic adsorbable laminated sheet (ix) 9 of the present embodiment has a label part (5), a support part (2) placed on one surface of the label part (5), and a pressure-sensitive adhesive layer (M) placed on the other surface of the label part (5). The electrostatic adsorbable laminated sheet (ix) 9 further has a grip layer in at least one of the label part (5) and the support part (2). Further, the label part (5) and the support part (2) are electrostatically adsorbed to each other via this grip layer. Hereinafter, the electrostatic adsorbable laminated sheet (ix) 9 will be described in more detail with reference to the drawings.

Figure 9:
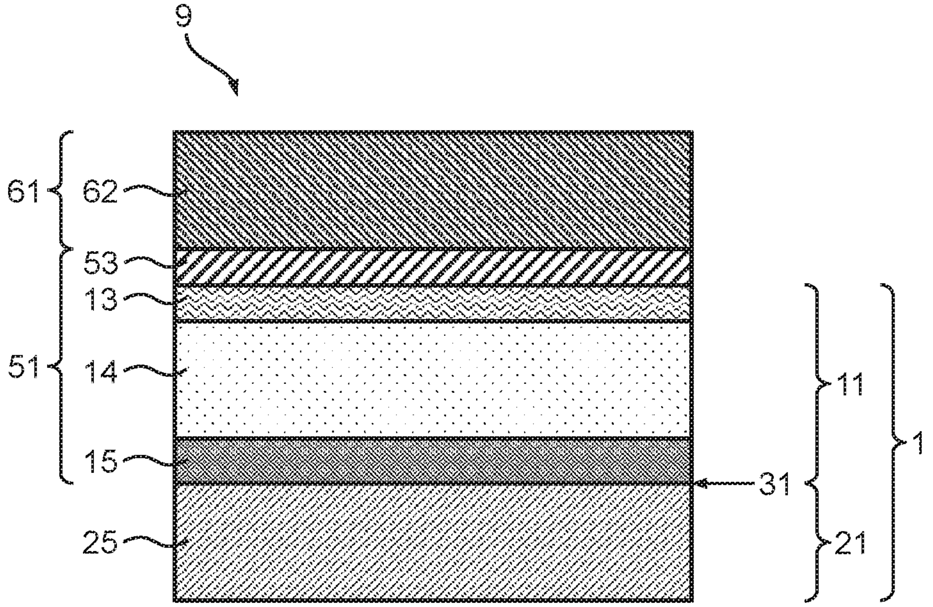
FIG. 9 is a cross-sectional view schematically showing one example of the layer configuration of an electrostatic adsorbable laminated sheet (iv) of the third example.

As shown in FIG. 9, the electrostatic adsorbable laminated sheet (ix) 9 has label part (5) 51, support part (2) 21 placed on one surface of the label part (5) 51, and protective layer (4) 61 placed on the other surface of the label part (5) 51. The label part (5) 51 has at least 4 layers, pressure-sensitive adhesive layer (M) 53, recording layer (A) 13, label layer (B) 14, and grip layer (C) 15, in this order. The support part (2) 21 has support layer (D) 25. The protective layer (4) 61 has peelable sheet layer (P) 62. The protective layer (4) 61 may have a support layer (J) (not shown) instead of the peelable sheet layer (P) 62. It is preferred to have the peelable sheet layer (P) 62, from the viewpoint of cost. In the electrostatic adsorbable laminated sheet (ix) 9, the pressure-sensitive adhesive layer (M) 53, the recording layer (A) 13, the label layer (B) 14, and the grip layer (C) 15 are integrally formed to constitute the label part (5) 51.

In this electrostatic adsorbable laminated sheet (ix) 9, the label part (5) 51 and the support part (2) 21 are placed opposite to each other such that the grip layer (C) 15 and the support layer (D) 25 face each other. Further, the electrostatic adsorbable laminated sheet (ix) 9 has a laminated structure where the grip layer (C) 15 and the support layer (D) 25 are electrostatically adsorbed to each other to have electrostatic adsorbable interface (N) 31. In the electrostatic adsorbable laminated sheet (ix) 9, the protective layer (4) 61 and the label part (5) 51 are placed opposite to each other such that the peelable sheet layer (P) 62 and the pressure-sensitive adhesive layer (M) 53 face each other. Further, the electrostatic adsorbable laminated sheet (ix) 9 has a laminated structure where the protective layer (4) 61 and the label part (5) 51 are laminated to each other through the tackiness of the pressure-sensitive adhesive layer (M).

The electrostatic adsorbable laminated sheet (ix) 9 can also interpreted as electrostatic adsorbable laminated sheet (i) 1 having label part (1) 11 and support part (2) 21 and further having pressure-sensitive adhesive layer (M) 53 on recording layer (A) 13. In this respect, the electrostatic adsorbable laminated sheet (ix) 9 further has the protective layer (4) 61 on the pressure-sensitive adhesive layer (M) 53. Specifically, the electrostatic adsorbable laminated sheet (ix) 9 has at least the protective layer (4) 61, the pressure-sensitive adhesive layer (M) 53, the label part (1) 11, and the support part (2) 21 in this order.

The pressure-sensitive adhesive layer (M) 53 can be bonded on one surface to the label part (5) 51 and on the other surface to the protective layer (4) 61, a printing sheet layer (not shown) which is non-adhesive printed matter, or the like, through its tackiness. The pressure-sensitive adhesive layer (M) 53 is formed by establishing a layer of a pressure-sensitive adhesive on a surface, in no contact with the support part (2), of the label part (5).

The protective layer (4) 61 is disposed as a peelable sheet for protection so as not to exert the self-adhesiveness of the pressure-sensitive adhesive layer (M) 53 to the outside before the printing sheet layer mentioned above is established on the pressure-sensitive adhesive layer (M) 53. Therefore, when the printing sheet layer is established on the pressure-sensitive adhesive layer (M) 53, the protective layer (4) 61 is peeled and removed, as in release paper of a usual pressure-sensitive adhesive label.

After removal of the protective layer (4) 61, the printing sheet layer can be bonded to the label part (5) 51 via the pressure-sensitive adhesive layer (M) 53. As a result, a laminate having the printing sheet layer, the label part (5) 51, and the support part (2) 21 in this order is obtained. In use, the support part (2) is peeled as a peelable sheet from this laminate to expose a surface, at the grip layer (C) 15 side, of the label part (5) 51. The exposed surface is electrostatically adsorbed to an adherend, whereby the label part (5) 51 is attached as a display material to the adherend. As mentioned above, the electrostatic adsorbable laminated sheet (ix) 9 can be used as a mount film for a printing sheet layer to be attached to the pressure-sensitive adhesive layer (M) 53.

As described above, the electrostatic adsorbable laminated sheet (ix) 9 can also be interpreted as electrostatic adsorbable laminated sheet (i) 1 further having pressure-sensitive adhesive layer (M) 53 on recording layer (A) 13. In this respect, in the case of using the electrostatic adsorbable laminated sheet (ix) 9 as the mount film mentioned above, the adhesiveness and adsorbability of the mount film are exerted even in the absence of the recording layer (A) 13. Therefore, the electrostatic adsorbable laminated sheet (ix) 9 may be configured such that the recording layer (A) 13 is established, if necessary. Thus, in a modification of this electrostatic adsorbable laminated sheet, the label part (5) 51 may have at least 3 layers, pressure-sensitive adhesive layer (M) 53, label layer (B) 14, and grip layer (C) 15, in this order.

The electrostatic adsorbable laminated sheet (ix) 9 can also be interpreted as electrostatic adsorbable laminated sheet (i) 1 provided with pressure-sensitive adhesive layer (M) 53. The electrostatic adsorbable laminated sheet (i) 1 may be changed to the electrostatic adsorbable laminated sheet (iii) 3 mentioned above.

The electrostatic adsorbable laminated sheet (ix) 9 may further have a recording layer (not shown) as an outermost layer of at least one of the support part (2) 21 and the protective layer (4) 61.

(Working Effects)

In the electrostatic adsorbable laminated sheet (ix) 9 of the present embodiment, as in the electrostatic adsorbable laminated sheet (i) 1, adhesiveness at the electrostatic adsorbable interface (N) 31 between the label part (5) 51 and the support part (2) 21 improves by the self-adhesiveness of the grip layer (C) 15. Furthermore, the electrostatic adsorbable laminated sheet (ix) 9 can be used as a mount film by establishing a printing sheet layer on the pressure-sensitive adhesive layer (M) 53. In this respect, the label part (5) 51 is attached to an adherend through the electrostatic adsorbability and self-adhesiveness. Therefore, in the case where the electrostatic adsorbable laminated sheet (ix) 9 intervenes between the printing sheet layer and the adherend, adsorbability improves as compared with a conventional mount film to be attached by self-adhesiveness or electrostatic adsorbability.

7. Modification of Third Embodiment

Figure 10:
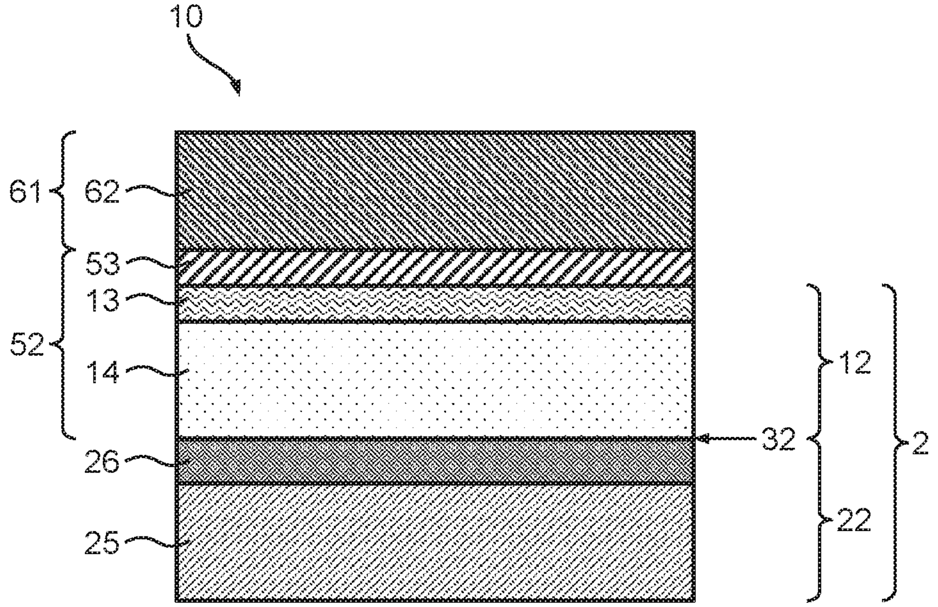
FIG. 10 is a cross-sectional view schematically showing one example of the layer configuration of an electrostatic adsorbable laminated sheet (x) of a modification of the third example.

As shown in FIG. 10, in electrostatic adsorbable laminated sheet (x) 10 of a modification of the third embodiment, label part (5) 52 has at least 3 layers, pressure-sensitive adhesive layer (M) 53, recording layer (A) 13, and label layer (B) 14, in this order. Support part (2) 22 has at least 2 layers, grip layer (E) 26 and support layer (D) 25. In the electrostatic adsorbable laminated sheet (x) 10, the pressure-sensitive adhesive layer (M) 53, the recording layer (A) 13, and the label layer (B) 14 are integrally formed to constitute the label part (5) 52. Also, the grip layer (E) 26 and the support layer (D) 25 are integrally formed to constitute the support part (2) 22.

In this electrostatic adsorbable laminated sheet (x) 10, the label part (5) 52 and the support part (2) 22 are placed opposite to each other such that the label layer (B) 14 and the grip layer (E) 26 face each other. Further, the electrostatic adsorbable laminated sheet (x) 10 has a laminated structure where the label part (5) 52 and the support part (2) 22 are electrostatically adsorbed to each other to have electrostatic adsorbable interface (N) 32. In the electrostatic adsorbable laminated sheet (x) 10, the protective layer (4) 61 and the label part (5) 52 are placed opposite to each other such that the peelable sheet layer (P) 62 and the pressure-sensitive adhesive layer (M) 53 face each other. Further, the electrostatic adsorbable laminated sheet (x) 10 has a laminated structure where the protective layer (4) 61 and the label part (5) 52 are laminated with each other through the tackiness of the pressure-sensitive adhesive layer (M).

After removal of the protective layer (4) 61, the label part (5) 52 can be bonded to a printing sheet layer via the pressure-sensitive adhesive layer (M) 53. As a result, a laminate having the printing sheet layer, the label part (5) 52, and the support part (2) 22 in this order is obtained. In use, the support part (2) is peeled as a peelable sheet from this laminate to expose a surface, at the label layer (B) 14 side, of the label part (5) 52. The exposed surface is electrostatically adsorbed to an adherend, whereby the label part (5) 52 is attached as a display material to the adherend. As mentioned above, the electrostatic adsorbable laminated sheet (x) 10 can be used as a mount film for a printing sheet layer to be attached to the pressure-sensitive adhesive layer (M) 53.

In the electrostatic adsorbable laminated sheet (x) 10, as in the electrostatic adsorbable laminated sheet (xi) 9, adhesiveness at the electrostatic adsorbable interface (N) 32 between the label part (5) 52 and the support part (2) 22 improves by the self-adhesiveness of the grip layer (E) 26.

The electrostatic adsorbable laminated sheet (x) 10, as in the electrostatic adsorbable laminated sheet (ix) 9, may be configured such that the recording layer (A) 13 is established, if necessary. Thus, in a modification of this electrostatic adsorbable laminated sheet, the label part (5) 52 may have 2 layers, pressure-sensitive adhesive layer (M) 53 and label layer (B) 14, in this order.

EXAMPLES

Hereinafter, the present invention will be described further specifically with reference to Preparation Examples, Production Examples, Examples, Comparative Examples, and Test Examples. Materials, amounts used, ratios, operations, etc. given below can be appropriately changed or modified without departing from the spirit of the present invention. Thus, the scope of the present invention is not limited by the specific examples given below. In the description below, % represents % by mass unless otherwise specified.

[Evaluation Approach]

Use suitability was confirmed by evaluating physical properties according to the following evaluation approaches and evaluation criteria as to resin compositions obtained in Preparation Examples given below, label parts and support parts obtained in Production Examples, electrostatic adsorbable laminated sheets obtained in Examples and Comparative Examples given below, and label parts obtained by peeling support parts from these electrostatic adsorbable laminated sheets. The evaluation results are shown in Tables 1, 3 to 8, and 10.

<Endothermic Peak Temperature>

In accordance with JIS K7121: 1987, by use of a differential scanning calorimeter (trade name: DSC6200, manufactured by Seiko Instruments Inc.), samples (approximately 5 mg each) of resin compositions a to j obtained in Preparation Examples given below were each melted by heating at a temperature of 230° C. for 5 minutes, then cooled to a temperature of 30° C. at a rate of 10° C./min, kept at the temperature of 30° C. for 3 minutes, and then heated to 230° C. at a rate of 10° C./min to obtain a differential scanning calorimetry curve. When the valley of the differential scanning calorimetry curve was present within the range of the measurement temperatures at the time of the heating, the sample was confirmed to have an endothermic peak. The endothermic peak top temperature was used as an endothermic peak temperature. The evaluation results are summarized in Table 1.

<Degree of Crystallinity>

The surface at the grip layer side of each label part or support part, or at the support layer side of each support part obtained in Production Examples given below was assayed for maximum values of absorbance in the ranges of 998±1 $cm^{-1}$, 974±1 $cm^{-1}$, 920±1 $cm^{-1}$, 731±1 $cm^{-1}$, and 720±1 $cm^{-1}$ defined as $A_{998}$, $A_{974}$, $A_{920}$, $A_{931}$, and $A_{720}$, respectively, by the attenuated total reflection method (diamond prism, angle of incidence: 45°) using a Fourier transform infrared spectrophotometer (trade name: FT-IR/2R-410, manufactured by JASCO Corp.).

Subsequently, the degree of isotactic crystallinity ($X_{PP}$ (%)) was determined according to the following (Expression 1):

$$X_{PP}(\%)=109\times(A_{998}-A_{920})/(A_{974}-A_{920})-31.4 \quad \text{(Expression 1).}$$

Also, the degree of polyethylene crystallinity ($X_{PE}$ (%)) was determined according to the following (Expression 2):

$$X_{PE}(\%)=100\times(A_{731}/A_{720}) \quad \text{(Expression 2).}$$

<Surface Arithmetic Mean Roughness Ra>

The arithmetic mean roughness Ra (μm) of the surface at the grip layer side of each label part or at the support layer side of each support part obtained in Production Examples given below was measured in accordance with JIS B0601: 2003 using a three-dimensional roughness measurement apparatus (trade name: SE-3AK, manufactured by Kosaka Laboratory Ltd.) and an analysis apparatus (trade name: SPA-11, manufactured by Kosaka Laboratory Ltd.).

<Surface Resistivity>

The surface resistivity (Ω) of the surface at the grip layer side of each label part or at the support layer side of each support part obtained in Production Examples given below was measured in accordance with JIS K6911: 2006 under conditions of 23° C. and a 50% relative humidity using electrodes based on a concentric ring method. Also, the surface resistivity of the surface at the recording layer (A) side of the label part was measured in accordance with JIS K6911: 2006 using electrodes based on a concentric ring method in the case where the surface resistivity was $1\times10^7\Omega$ or more, and measured by the 4-point probe method in accordance with JIS K7194: 1994 in the case where the surface resistivity was less than $1\times10^7\Omega$, whereby the resistance (R) thus determined was multiplied by correction factor F, and the resulting value was used as the surface resistivity.

<Coefficient of Static Friction and Coefficient of Dynamic Friction>

The coefficient of static friction and coefficient of dynamic friction, on a glass plate, of the surface at the grip layer side of each label part or at the support layer side of each support part obtained in Production Examples given below were measured in accordance with JIS K7125: 1999 using a tester for coefficients of friction (trade name: TR-2, manufactured by Toyo Seiki Seisaku-sho, Ltd.).

<Gurley Stiffness>

The Gurley stiffness (mN) of each label part or support part obtained in Production Examples given below was measured in both the MD direction and the TD direction in accordance with JIS L1096: 2010 at a temperature of 23° C. in a 50% relative humidity environment using a Gurley stiffness tester (trade name: GAS-100, manufactured by Daiei Kagaku Seiki MFG. Co., Ltd.).

<Displacement in Printing on Electrostatic Adsorbable Laminated Sheet>

Each electrostatic adsorbable laminated sheet obtained in Examples and Comparative Examples given below was subjected to multicolor printing using an intermittent rotary label printing machine. The displacement of each color pattern in the obtained printed matter was evaluated as described below. Specifically, with use of the electrostatic adsorbable laminated sheet as a label in mind, a print including letter information, ruled lines, and four-color full-color patterns was made on the recording layer (A) of the electrostatic adsorbable laminated sheet using an intermittent rotary label printing machine (name of the equipment: LPM-300iT, manufactured by Lintec Corp.) and UV curing-type ink (trade name: UV-161 Black, Indigo, Red, and Yellow, manufactured by T&K TOKA Corp.) at a printing rate of 100 m/min. The ink was dried and solidified by ultraviolet irradiation. Then, the electrostatic adsorbable laminated sheet was taken up. The printing displacement was evaluated according to the following criteria from the state of the electrostatic adsorbable laminated sheet during this printing, and the state of the printed matter after the printing.

○: Printing was stable, and displacement was not confirmed in the four-color patterns.

Δ: Displacement was not confirmed in the four-color patterns, though lifting between the label part and the support part was seen during printing.

x: Lifting between the label part and the support part was seen during printing, and large displacement in the patterns was confirmed among the colors.

<Antiblocking Properties of Electrostatic Adsorbable Laminated Sheet>

Each electrostatic adsorbable laminated sheet obtained in Examples and Comparative Examples given below was rolled up and stored at a temperature of 40° C. in a 50% relative humidity atmosphere for 1 day. On the next day, when a sheet was pulled out of this roll by hand at a temperature of 23° C. in a 50% relative humidity atmosphere, whether to be able to smoothly unwind the roll without causing adhesion (blocking) between sheets attributed to static electricity was evaluated as antiblocking properties according to the following criteria.

○: The sheet was smoothly pulled out without peeling sound.

Δ: The label part and the support part were not detached at the interface, though there was peeling sound.

x: There was big peeling sound, and the label part and the support part were detached at the interface.

<Thickness of Label Part>

The whole support part was peeled from each electrostatic adsorbable laminated sheet obtained in Examples and Comparative Examples given below, and the thickness of the resulting label part was measured in accordance with JIS K7130: 1999 using a constant-pressure thickness gauge (trade name: PG-01J, manufactured by Teclock Co., Ltd.).

<Internal Charge Quantity of Label Part>

Figure 11:
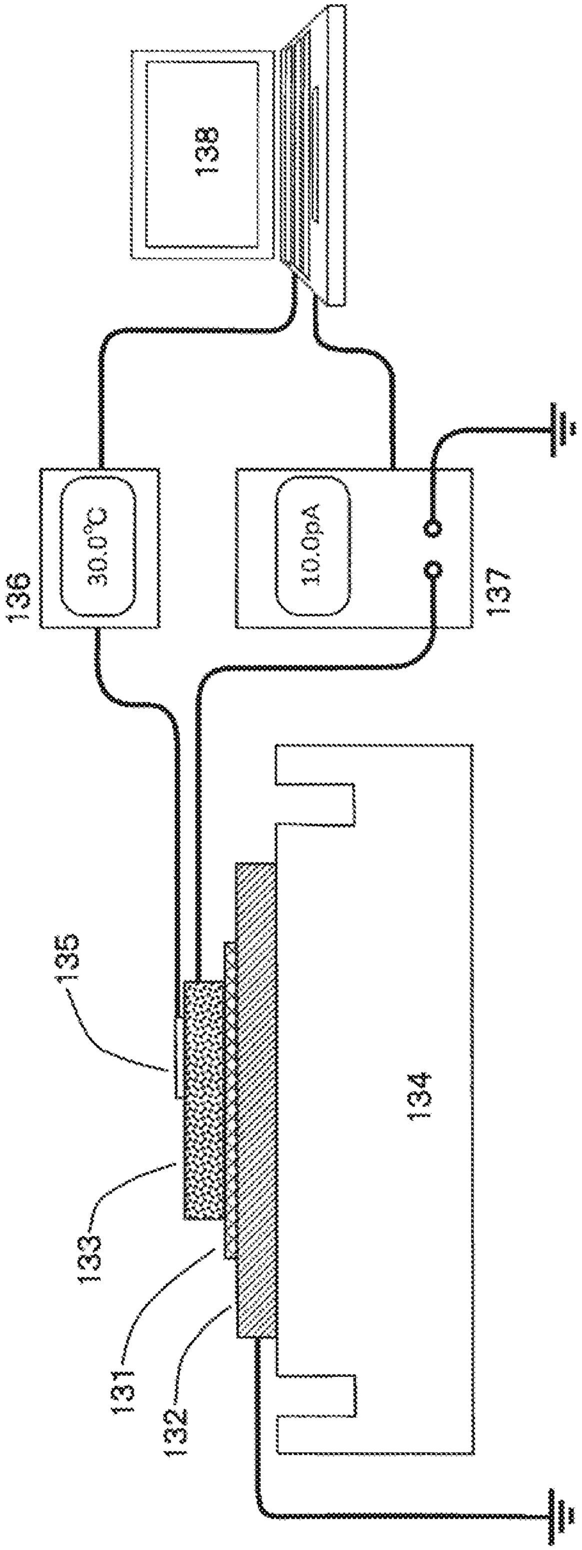
FIG. 11 is a schematic view of an internal charge quantity measurement apparatus used in Examples.

Each electrostatic adsorbable laminated sheet obtained in Examples and Comparative Examples given below was cut into a 15 mm×15 mm square, which was then wrapped in aluminum foil and stored at 23° C. in a 50% relative humidity environment for 24 hours. Then, the test piece was taken out of the aluminum foil. The support part was peeled from this electrostatic adsorbable laminated sheet in the same atmosphere as above to obtain a label part. This label part was placed on grounding electrode plate 132 mounted on programmable hot plate 134 of an internal charge quantity measurement apparatus shown in FIG. 11. SUS main electrode plate 133 of a 10 mm×10 mm square and 5 mm in thickness and thermocouple 135 which was monitored by thermometer 136 were placed on label part 131.

Subsequently, the label part 131 was heated from 23° C. to 200° C. at a rate of 5° C./min by the thermocouple 135. Current flowing between the main electrode plate 133 and the grounding electrode plate 132 was measured using ammeter 137, and the measurement values were recorded every 1 second in computer 138. The total of the absolute values of the measured current values was determined. The current values obtained by the measurement were converted to values per square meter, and the internal charge quantity (Qs ($C/m^2$)) of each label part was determined.

<Adsorbability of Label Part>

Figure 12:
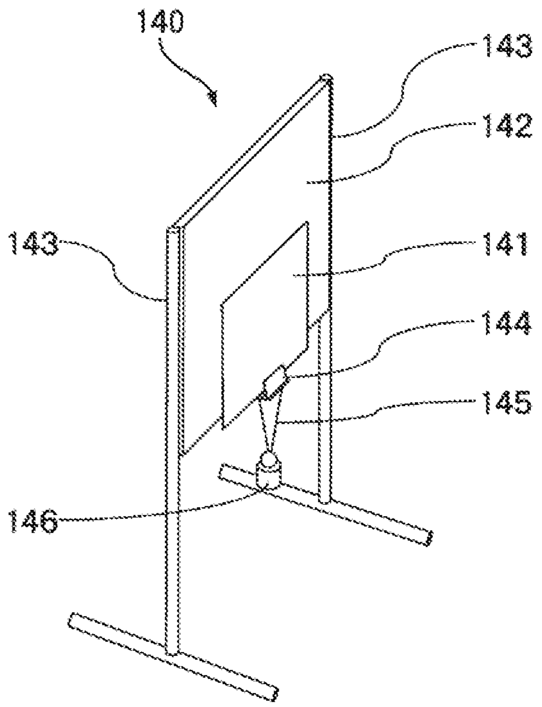
FIG. 12 is a perspective view schematically showing an adsorbability measurement apparatus used in Examples.

Each electrostatic adsorbable laminated sheet obtained in Examples and Comparative Examples given below was cut into a size of 100 mm×110 mm and stored at a temperature of 23° C. in a 50% relative humidity atmosphere for 1 day. Then, the support part was peeled from this electrostatic adsorbable laminated sheet in the same atmosphere as above. The adsorbability was evaluated using adsorbability measurement apparatus 140 schematically shown in FIG. 12. The adsorbability measurement apparatus 140 retains both ends of glass plate 142 (float glass plate having surface arithmetic mean roughness (Ra) of approximately 0.023 μm) in an upright state by columns 143. Label part 141 was attached onto this glass plate 142 such that: the surface at the grip layer side faced the glass plate surface; the adsorption area was approximately 100 mm×100 mm; and an approximately 10 mm wide portion at the lower end of the label part hang out of the lower portion of the glass plate. Subsequently, double clip 144 of 19 mm in width was attached to the center at the lower end of the label part 141, and 10 g of weight 146 with thread 145 was suspended from the double clip 144 and added one by one. The adsorbability of the label part was determined per square meter (approximately 100 times the value of the weight 146 at the time of drop of the label part 141) of the label part 141 from the value of the weight 146 at which the label part 141 slipped out of the glass plate 142.

<Adhesiveness of Label Part>

Each electrostatic adsorbable laminated sheet obtained in Examples and Comparative Examples given below was humidity-conditioned at a temperature of 23° C. in a 50% relative humidity atmosphere for 1 day. Then, the electrostatic adsorbable laminated sheet was cut into a size of 20 mm in width×80 mm in length to prepare a test piece. Subsequently, a 15 mm long portion was cut out of the upper portion of the label part of this test piece. Further, a 15 mm long portion was cut out of the lower portion of the support part of this test piece to prepare a test piece in which the contact portion between the label part and the support part on the test piece had a size of 20 mm in width×50 mm in length.

Subsequently, the inter-chuck distance of grippers in 5 kg dedicated chucks (manufactured by Toyo Baldwin Co., Ltd.) attached to a Tensilon universal tester (trade name: RTM-250, manufactured by Orientec Co., Ltd.) was adjusted to 55 mm. The support part of the test piece was fixed to the upper chuck, and the label part was fixed to the lower chuck. Subsequently, the label part and the support part of the electrostatic adsorbable laminated sheet were pulled in the shear direction at a tension rate of 5 mm/min. The maximum stress (gf) was measured and divided by the area of the contact portion between the label part and the support part to determine the adhesiveness (gf/cm$^2$) of the label part.

<Ink Adhesiveness of Label Part>

Each electrostatic adsorbable laminated sheet obtained in Examples and Comparative Examples given below was stored at a temperature of 23° C. in a 50% relative humidity atmosphere for 1 day. Then, printing ink (manufactured by T & K TOKA Corp., trade name: BESTCURE 161 Black) was uniformly printed at a thickness of 1.5 g/m$^2$ on the recording layer (A) surface of the electrostatic adsorbable laminated sheet using a printing tester (manufactured by Akari Seisakusho K.K., trade name: model RI-III printability tester). The printing ink was dried and solidified by UV irradiation at UV radiation intensity of 0.04 W/cm$^2$ under a metal halide lamp (manufactured by Eye Graphics Co., Ltd., output: 80 W/cm).

This printed electrostatic adsorbable sheet was stored again at a temperature of 23° C. in a 50% relative humidity atmosphere for 1 day. Then, cellophane tape (manufactured by Nichiban Co., Ltd., trade name: Sellotape® CT-18) was attached to the printed surface. Subsequently, in accordance with JAPAN TAPPI No. 18-2 (internal bond strength testing method), the peeling strength (the amount of energy attenuated) of the ink against the cellophane tape at the time of hammering was measured using Internal Bond Tester (manufactured by Kumagai Riki Kogyo Co., Ltd., trade name). An average value of the results of two measurements was used as adhesion strength. From the results, pass or fail was evaluated according to the following criteria.

○: Pass: The adhesion strength was 1.4 kg·cm or more.

x: Fail: The adhesion strength was less than 1.4 kg·cm.

<Staining Resistance of Label Part>

Each electrostatic adsorbable laminated sheet obtained in Examples and Comparative Examples given below was cut into a size of 100 mm×100 mm and stored at a temperature of 23° C. in a 50% relative humidity atmosphere for 1 day. Then, the label part was peeled from the electrostatic adsorbable laminated sheet, and this label part was attached onto a glass plate (float glass plate having surface arithmetic mean roughness (Ra) of approximately 0.023 m) such that the surface at the grip layer (C) side of the label part faced the glass plate surface. After storage at a temperature of 50° C. in a 90% relative humidity atmosphere for 1 day or 7 days, the label part was removed. After a lapse of each number of days, the state of the glass plate after the peeling was visually confirmed, and the degree of staining was evaluated according to the following criteria.

⊙: There were no visible remnant stains even after a lapse of 7 days.

○: There were no visible remnant stains after a lapse of 1 day, whereas there were visible remnant stains after a lapse of 7 days.

Δ: There were visible remnant stains after a lapse of 1 day, which were however removable by wiping with cloth.

x: There were visible remnant stains after a lapse of 1 day, which were not removable without the use of water or a solvent.

<Writing Erasability>

Letters and lines were written on the protective layer (4) surface of each electrostatic adsorbable laminated sheet obtained in Examples and Comparative Examples given below using a dedicated writing utensil (manufactured by PLUS Corp., trade name: PVMAR). After storage for 1 week, the letters were erased with a dedicated eraser (manufactured by PLUS Corp., trade name: Eraser ER-44369) and evaluated according to the following criteria.

○: Good (the letters were completely erasable)

x: Poor (the letters were not erasable)

[Resin Composition]

Tables 1 and 2 summarize raw materials for resin compositions for use in Production Examples of label parts and support parts constituting electrostatic adsorbable laminated sheets, and blending ratios thereof. In the present Examples, premixes of the raw materials for use described in Tables 1 and 2 at the ratios described in Tables 1 and 2 were each melt-kneaded using a biaxial kneading machine set to 210° C. Subsequently, the melt product was extruded into a strand shape in an extruder set to 230° C. The extrudate was cooled and then cut using a strand cutter to prepare pellets of resin compositions a to j, which were used in subsequent Production Examples of label parts and support parts.

TABLE 1

| Material | | | | | Blending ratio of resin composition (% by mass) | | | | | | | | | |
|---|---|---|---|---|---|---|---|---|---|---|---|---|---|---|
| No. | Summary | | Contents | Description | a | b | c | d | e | f | g | h | i | j |
| 1 | Propylene resin | Blend polymer propylene reactor | Propylene elastomer (trade name: ZELAS MC717R4, manufactured by Mitsubishi Chemical Corp., MFR (230° C., 2.16 kg load): 2.5 g/10 min, melting point: 161° C.) | Prepared by mixing and polymerizing a propylene resin having an endothermic peak at 120 to 180° C. and a resin having no endothermic peak within the range of 0 to 200° C. in a reaction vessel | 100 | 70 | | | | | | | | |
| 2 | | | Propylene elastomer (trade name: TAFMER PN-2060, manufactured by Mitsui Chemicals, Inc., MFR (230° C., 2.16 kg load): 6 g/10 min, melting point: 160° C.) | Prepared by mixing and polymerizing a propylene resin having an endothermic peak at 120 to 180° C. and a resin having no endothermic peak within the range of 0 to 200° C. in a reaction vessel | | | 100 | 70 | | | | | | |
| 3 | | | Propylene elastomer (trade name: TAFMER PN-3560, manufactured by Mitsui Chemicals, Inc., MFR (230° C., 2.16 kg load): 6 g/10 min, melting point: 160° C.) | Prepared by mixing and polymerizing a propylene resin having an endothermic peak at 120 to 180° C. and a resin having no endothermic peak within the range of 0 to 200° C. in a reaction vessel | | | | | 70 | | | | | |
| 4 | | Propylene random copolymer | Propylene/α-olefin random copolymer (trade name: NOVATEC PP FX4G, manufactured by Japan Polypropylene Corp., MFR (230° C., 2.16 kg load): 5 g/10 min, melting point: 127° C.) | Containing ethylene and butene as a propylene resin copolymer having an endothermic peak at 120 to 180° C. | | | | | | 40 | | | | |
| 5 | | | Propylene/ethylene random copolymer (trade name: NOVATEC PP FW4B, manufactured by Japan Polypropylene Corp., MFR (230° C., 2.16 kg load): 6.5 g/10 min, melting point: 140° C.) | Containing ethylene as a propylene resin copolymer having an endothermic peak at 120 to 180° C. | | | | | | | 100 | | | 10 |
| 6 | | Propylene homopolymer | Propylene homopolymer (trade name: NOVATEC PP FY6, manufactured by Japan Polypropylene Corp., MFR (230° C., 2.16 kg load): 2.5 g/10 min, melting point: 164° C.) | Propylene resin having an endothermic peak at 120 to 180° C. | | 30 | | | | | | | | |
| 7 | | | Propylene homopolymer (trade name: NOVATEC PP FY4, manufactured by Japan Polypropylene Corp., MFR (230° C., 2.16 kg load): 5 g/10 min, melting point: 165° C.) | Propylene resin having an endothermic peak at 120 to 180° C. | | | | 30 | 30 | | | 100 | 50 | 80 |
| 8 | Styrene resin | | Hydrogenated styrene/butadiene elastomer (trade name: DYNARON 1321P, manufactured by JSR Corp., MFR (230° C., 2.16 kg load): 3.5 g/10 min) | Styrene resin having no endothermic peak within the range of 0 to 200° C. | | | | | | 60 | | | | |
| 9 | Ethylene resin | | High-density polyethylene (manufactured by Japan Polyethylene Corp., trade name: NOVATEC HD HJ360, MFR (190° C., 2.16 kg load): 5 g/10 min, melting point: 132° C.) | Ethylene resin having an endothermic peak at 120 to 180° C., but containing no propylene component | | | | | | | | | 50 | |
| 10 | Filler | | Heavy calcium carbonate (manufactured by Bihoku Funka Kogyo Co., Ltd., trade name: SOFTON 1800, average particle size: 1.2 μm) | Inorganic filler | | | | | | | | | | 10 |
| | Physical properties of resin composition | | Endothermic peak temperature of resin composition | (Unit: ° C.) | 161 | 163 | 160 | 163 | 163 | 127 | 140 | 165 | 132 | 132 |

TABLE 2

| Material No. | Summary | Contents | Description | Blending ratio of resin composition (% by mass) m | n | o | p | q | r | s | t |
|---|---|---|---|---|---|---|---|---|---|---|---|
| 11 | Ethylene resin | Long-chain low-density polyethylene (manufactured by Prime Polymer Co., Ltd., trade name: EVOLUE SP1071C, MFR (190° C., 2.16 kg load): 5 g/10 min, melting point: 100° C.) | Resin containing no propylene component | 100 | | | | | | | 50 |
| 12 | | Long-chain low-density polyethylene (manufactured by Sumitomo Chemical Co., Ltd., trade name: EXCELLEN VL EUL731, MFR (190° C., 2.16 kg load): 10 g/10 min, melting point: 114° C.) | Resin containing no propylene component | | 100 | | | | 70 | 30 | |
| 13 | | Long-chain low-density polyethylene (manufactured by Sumitomo Chemical Co., Ltd., trade name: EXCELLEN VL EUL830, MFR (190° C., 2.16 kg load): 20 g/10 min, melting point: 112° C.) | Resin containing no propylene component | | | 70 | 100 | | | | |
| 14 | | Low-density polyethylene (manufactured by Japan Polyethylene Corp., trade name: NOVATEC LD LC602A, MFR (190° C., 2.16 kg load): 8 g/10 min, melting point: 107° C.) | Resin containing no propylene component | | | 30 | | 100 | | | 50 |
| 15 | | Long-chain low-density polyethylene (manufactured by Japan Polyethylene Corp., trade name: NOVATEC LL UF230, MFR (190° C., 2.16 kg load): 1 g/10 min, melting point: 121° C.) | Resin containing no propylene component | | | | | | 30 | 70 | |
| Physical properties of resin composition | | Endothermic peak temperature of resin composition | (Unit: ° C.) | 100 | 114 | 112 | 112 | 107 | 115 | 117 | 102 |

[Coating Solution for Recording Layer]

Table 3 summarizes raw materials for use in Preparation Examples of recording layers constituting electrostatic adsorbable laminated sheets, and blending ratios thereof. In the present Examples, the raw materials for use described in Table 3 were mixed in advance as described in Preparation Examples mentioned later to prepare coating solutions for recording layers, which were appropriately used in subsequent Production Examples of label parts and support parts.

TABLE 3

| Raw material used in recording layer | | | Blending ratio of coating solution for recording layer (% by mass) Preparation Example 1 | Preparation Example 2 | Preparation Example 3 |
|---|---|---|---|---|---|
| Polymer having antistatic function | P-1 | Polymer having antistatic function obtained in Preparation Example P-1 (alkali metal salt-containing polymer having lithium concentration of 0.6 wt % in solid content) | 10 | — | — |
| | P-2 | Polymer having antistatic function obtained in Preparation Example P-2 (quaternary ammonium salt-type copolymer) | — | 20 | — |
| Polymer binder | P-3 | Polymer binder obtained in Preparation Example P-3 | 42 | — | 52 |
| | P-4 | Polymer binder obtained in Preparation Example P-4 | — | 40 | — |
| | P-5 | Polyamide/epichlorohydrin resin solution (trade name: WS4024, manufactured by Seiko PMC Corp.) | — | 40 | — |
| Pigment particle | | Precipitated silica (manufactured by Mizusawa Industrial Chemicals, Ltd., trade name: MIZUKASIL P-527, average particle size: 1.6 μm, oil absorption: 1800 cc/100 g) | 30 | — | 30 |
| | | Surface-treated barium sulfate (manufactured by Sakai Chemical Industry Co., Ltd., trade name: BARIACE B-32, average particle size: 0.3 μm) | 15 | — | 15 |
| Curing agent | | Hexamethylene diisocyanate (trade name: CORONATE HL, manufactured by Nippon Polyurethane Industry Co., Ltd.) | 3 | — | 3 |
| Solid concentration of coating solution for recording layer (% by mass) | | | 20 | 20 | 20 |

Preparation Examples of Polymers Having Antistatic Function

Preparation Example P-1 of Polymer Having Antistatic Function 100 parts by mass of polyethylene glycol monomethacrylate (manufactured by NOF Corp., trade name: BLEMMER PE-350), 20 parts by mass of lithium perchlorate (manufactured by Wako Pure Chemical Industries, Ltd., reagent), 1 part by mass of hydroquinone (manufactured by Wako Pure Chemical Industries, Ltd., reagent), and 400 parts by mass of propylene glycol monoethyl ether (manufactured by Wako Pure Chemical Industries, Ltd., reagent) were introduced into a four-neck flask equipped with a stirring apparatus, a reflux condenser, a thermometer, and a dropping funnel, and the system was purged with nitrogen, followed by reaction at 60° C. for 40 hours. 5 parts by mass of stearyl methacrylate (manufactured by Wako Pure Chemical Industries, Ltd., reagent), 5 parts by mass of n-butyl methacrylate (manufactured by Wako Pure Chemical Industries, Ltd., reagent), and 1 part by mass of azobisisobutyronitrile (manufactured by Wako Pure Chemical Industries, Ltd., reagent) were added thereto, followed by polymerization reaction at 80° C. for 3 hours. Then, the solid content was adjusted to 20% by mass by the addition of propylene glycol monoethyl ether to obtain a solution of a polymer having an antistatic function consisting of an alkali metal salt-containing polymer having a weight-average molecular weight of approximately 300000 and a lithium concentration of 0.6% by mass in solid content.

Preparation Example P-2 of Polymer Having Antistatic Function 35 parts by mass of N,N-dimethylaminoethyl methacrylate (manufactured by Mitsubishi Gas Chemical Co., Inc.), 20 parts by mass of ethyl methacrylate (manufactured by Wako Pure Chemical Industries, Ltd., reagent), 20 parts by mass of cyclohexyl methacrylate (manufactured by Wako Pure Chemical Industries, Ltd., reagent), 25 parts by mass of stearyl methacrylate (manufactured by Wako Pure Chemical Industries, Ltd., reagent), 150 parts by mass of ethyl alcohol, and 1 part by mass of azobisisobutyronitrile (manufactured by Wako Pure Chemical Industries, Ltd., reagent) were introduced into a four-neck flask equipped with a stirring apparatus, a reflux condenser, a thermometer, and a dropping funnel, and the system was purged with nitrogen, followed by polymerization reaction at a temperature of 80° C. for 6 hours under a stream of nitrogen. Subsequently, 85 parts by mass of an aqueous solution containing 50% by mass of 3-chloro-2-hydroxypropyltrimethylammonium chloride (manufactured by Wako Pure Chemical Industries, Ltd., reagent) were added thereto and further reacted at a temperature of 80° C. for 15 hours. Then, while water was added dropwise thereto, ethyl alcohol was distilled off to obtain a solution of a polymer having an antistatic function consisting of a quaternary ammonium salt-type copolymer having a final solid content of 20% by mass.

Preparation Example P-3 of Polymer Binder 15 parts by mass of 2-hydroxyethyl methacrylate (manufactured by Wako Pure Chemical Industries, Ltd., reagent), 50 parts by mass of methyl methacrylate (manufactured by Wako Pure Chemical Industries, Ltd., reagent), 35 parts by mass of ethyl acrylate (manufactured by Wako Pure Chemical Industries, Ltd., reagent) and 100 parts by mass of toluene (manufactured by Wako Pure Chemical Industries, Ltd., reagent) were charged into a four-neck flask equipped with a stirrer, a reflux condenser, a thermometer, and a dropping funnel. After purging with nitrogen, 0.6 parts by mass of 2,2'-azobis(isobutyronitrile) (manufactured by Wako Pure Chemical Industries, Ltd., reagent) were introduced thereinto as an initiator, followed by polymerization at 80° C. for 4 hours. The obtained solution was a 50% toluene solution of a hydroxy group-containing methacrylic acid ester polymer having a hydroxyl value of 65. Subsequently, to 100 parts by mass of this solution, 30 parts by mass of a 20% methyl ethyl ketone solution of a vinyl chloride-vinyl acetate copolymer (manufactured by Shin Dai-Ichi Vinyl Corp., trade name: ZEST C150ML) were added, and the solid content was adjusted to 20% by mass by the addition of methyl ethyl ketone (manufactured by Wako Pure Chemical Industries, Ltd., reagent) to obtain a polymer binder solution.

Preparation Example P-4 of Polymer Binder 100 parts by mass of an aqueous solution containing 25% by mass of polyethyleneimine (manufactured by Nippon Shokubai Co., Ltd., trade name: EPOMIN P-1000), 10 parts by mass of 1-chlorobutane (manufactured by Wako Pure Chemical Industries, Ltd., reagent), and 10 parts by mass of propylene glycol monomethyl ether (manufactured by Wako Pure Chemical Industries, Ltd., reagent) were introduced into a four-neck flask equipped with a stirrer, a reflux condenser, a thermometer, and a nitrogen gas inlet, and modification reaction was performed at a temperature of 80° C. for 20 hours by stirring under a stream of nitrogen. Subsequently, the solid content of this solution was adjusted to 20% by mass by the addition of water to obtain a polymer binder solution.

Preparation Examples of Coating Solutions for Recording Layers

Preparation Example 1 of Coating Solution for Recording Layer

While methyl ethyl ketone was gently stirred in a Cowles mixer, each pigment particle described in Table 3 was weighed and added in small portions thereto. After adjustment of the solid concentration to 20% by mass, the number of revolutions of the Cowles mixer was increased, and the mixture was stirred for 30 minutes to prepare a pigment dispersion. Subsequently, the number of revolutions of the Cowles mixer was decreased, and the polymer binder solution P-3 and the polymer solution P-1 having an antistatic function, obtained in Preparation Examples described above, and a solution of a curing agent (diluted to 20% by mass (solid content) with ethyl acetate) described in Table 3 were added in this order to the pigment dispersion at the blending ratio described in Table 3, and directly mixed by stirring for 20 minutes. Then, particles of a coarse particle size were removed through a 100-mesh filter, and the resultant was diluted to the solid concentration described in Table 3 with methyl ethyl ketone to obtain a coating solution for a recording layer (Preparation Example 1).

Preparation Example 2 of Coating Solution for Recording Layer

The polymer binder solution P-4, the polymer solution P-2 having an antistatic function, and the polymer binder solution P-5 described in Table 3 were added in this order into a vessel equipped with a stirrer at the blending ratio described in Table 3, subsequently diluted to the solid concentration described in Table 3 with water, and directly mixed by stirring for 20 minutes to obtain a coating solution for a recording layer (Preparation Example 2).

Preparation Example 3 of Coating Solution for Recording Layer

While methyl ethyl ketone was gently stirred in a Cowles mixer, each pigment particle described in Table 3 was weighed and added in small portions thereto. After adjustment of the solid concentration to 20% by mass, the number of revolutions of the Cowles mixer was increased, and the mixture was stirred for 30 minutes to prepare a pigment dispersion. Subsequently, the number of revolutions of the Cowles mixer was decreased, and the polymer binder solution P-3 obtained in Preparation Examples described above, and a solution of a curing agent (diluted to 20% by mass (solid content) with ethyl acetate) described in Table 3 were added in this order to the pigment dispersion at the blending ratio described in Table 3, and directly mixed by stirring for 20 minutes. Then, particles of a coarse particle size were removed through a 100-mesh filter, and the resultant was diluted to the solid concentration described in Table 3 with methyl ethyl ketone to obtain a coating solution for a recording layer (Preparation Example 3).

Production Examples of Label Parts or Support Parts

Label parts or support parts of Production Examples 1 to 21 were obtained by approaches described below. The physical properties of these label parts or support parts are summarized in Tables 4 and 5. For Production Examples 18 to 20 in Table 5, physical properties at a side laminated with a layer consisting of the resin composition h are shown as the physical properties of the support layers.

TABLE 4

| | Layer configuration of label part or support part | | | | |
|---|---|---|---|---|---|
| | Entire layer | Grip layer | | | Label layer or |
| | configuration of label part or support part | Resin composition | The number of draw axis | Thickness (μm) | support layer Resin composition |
| Production Example 1 | a/j/j/1 | a | 1 uniaxial | 2 | j/j |
| Production Example 2 | a/j/j/2 | a | 1 uniaxial | 3 | j/j |
| Production Example 3 | a/j/j/2 | a | 1 uniaxial | 4 | j/j |
| Production Example 4 | a/j/j/2 | a | undrawn | 2 | j |
| Production Example 5 | a/j/j/3 | a | 1 uniaxial | 4 | j/j |
| Production Example 6 | a/j/j | a | 1 uniaxial | 4 | j/j |
| Production Example 7 | a/j/j/1 | a | 1 uniaxial | 10 | j/j |
| Production Example 8 | a/j/j/2 | a | 1 uniaxial | 14 | j/j |
| Production Example 9 | b/j/j/2 | b | 1 uniaxial | 4 | j/j |
| Production Example 10 | c/j/j/2 | c | 1 uniaxial | 4 | j/j |
| Production Example 11 | c/j/j/2 | c | 1 uniaxial | 10 | j/j |
| Production Example 12 | d/j/j/2 | d | 1 uniaxial | 2 | j/j |
| Production Example 13 | d/j/j/2 | d | 1 uniaxial | 4 | j/j |
| Production Example 14 | d/j/j/2 | d | 1 uniaxial | 10 | j/j |
| Production Example 15 | e/h/i/1 | e | 2 biaxial | 4 | h/i |
| Production Example 16 | f/h/i/1 | f | 2 biaxial | 4 | h/i |
| Production Example 17 | g/j/j/1 | g | 1 uniaxial | 4 | j/j |
| Production Example 18 | h | — | — | — | h |
| Production Example 19 | h/j/j/1 | — | — | — | h/j/j |
| Production Example 20 | h/j/j/2 | — | — | — | h/j/j |
| Production Example 21 | j/j/j/1 | — | — | — | j/j/j |
| Production Example 22 | m/j/j/2 | m | 1 uniaxial | 4 | j/j |
| Production Example 23 | n/j/j/2 | n | 1 uniaxial | 4 | j/j |
| Production Example 24 | o/j/j/2 | o | 1 uniaxial | 4 | j/j |
| Production Example 25 | p/j/j/2 | p | 1 uniaxial | 4 | j/j |
| Production Example 26 | q/j/j/2 | q | 1 uniaxial | 4 | j/j |
| Production Example 27 | r/j/j/2 | r | 1 uniaxial | 4 | j/j |
| Production Example 28 | s/j/j/2 | s | 1 uniaxial | 4 | j/j |
| Production Example 29 | t/j/j/2 | t | 1 uniaxial | 4 | j/j |
| Production Example 30 | h/h/h/2 | — | — | — | h/h/h |

| | Layer configuration of label part or support part | | | | |
|---|---|---|---|---|---|
| | Label layer or support layer | | Recording layer | | |
| | The number of draw axis | Thickness (μm) | Preparation Example | Thickness (μm) | Total thickness (μm) |
| Production Example 1 | 2 biaxial/1 uniaxial | 76/2 | 1 | 5 | 85 |
| Production Example 2 | 2 biaxial/1 uniaxial | 14/3 | 2 | 2 | 22 |
| Production Example 3 | 2 biaxial/1 uniaxial | 72/4 | 2 | 2 | 82 |
| Production Example 4 | undrawn | 78 | 2 | 2 | 82 |
| Production Example 5 | 2 biaxial/1 uniaxial | 72/4 | 3 | 5 | 85 |
| Production Example 6 | 2 biaxial/1 uniaxial | 72/4 | — | — | 80 |
| Production Example 7 | 2 biaxial/1 uniaxial | 60/10 | 1 | 5 | 85 |
| Production Example 8 | 2 biaxial/1 uniaxial | 52/14 | 2 | 2 | 82 |
| Production Example 9 | 2 biaxial/1 uniaxial | 72/4 | 2 | 2 | 82 |

TABLE 4-continued

| | | | | | |
|---|---|---|---|---|---|
| Production Example 10 | 2 biaxial/1 uniaxial | 72/4 | 2 | 2 | 82 |
| Production Example 11 | 2 biaxial/1 uniaxial | 60/10 | 2 | 2 | 82 |
| Production Example 12 | 2 biaxial/1 uniaxial | 76/2 | 2 | 2 | 82 |
| Production Example 13 | 2 biaxial/1 uniaxial | 72/4 | 2 | 2 | 82 |
| Production Example 14 | 2 biaxial/1 uniaxial | 60/10 | 2 | 0.3 | 80 |
| Production Example 15 | 2 biaxial/2 biaxial | 24/4 | 1 | 5 | 37 |
| Production Example 16 | 2 biaxial/2 biaxial | 26/4 | 1 | 5 | 39 |
| Production Example 17 | 2 biaxial/1 uniaxial | 72/4 | 1 | 5 | 85 |
| Production Example 18 | 2 biaxial | 34 | — | — | 34 |
| Production Example 19 | 1 uniaxial/2 biaxial/1 uniaxial | 5/70/5 | 1 | 5 | 85 |
| Production Example 20 | 1 uniaxial/2 biaxial/1 uniaxial | 4/72/4 | 2 | 2 | 82 |
| Production Example 21 | 1 uniaxial/2 biaxial/1 uniaxial | 4/56/4 | 1 | 5 | 69 |
| Production Example 22 | 2 biaxial/1 uniaxial | 72/4 | 2 | 2 | 82 |
| Production Example 23 | 2 biaxial/1 uniaxial | 72/4 | 2 | 2 | 82 |
| Production Example 24 | 2 biaxial/1 uniaxial | 72/4 | 2 | 2 | 82 |
| Production Example 25 | 2 biaxial/1 uniaxial | 72/4 | 2 | 2 | 82 |
| Production Example 26 | 2 biaxial/1 uniaxial | 72/4 | 2 | 2 | 82 |
| Production Example 27 | 2 biaxial/1 uniaxial | 72/4 | 2 | 2 | 82 |
| Production Example 28 | 2 biaxial/1 uniaxial | 72/4 | 2 | 2 | 82 |
| Production Example 29 | 2 biaxial/1 uniaxial | 72/4 | 2 | 2 | 82 |
| Production Example 30 | 1 uniaxial/2 biaxial/1 uniaxial | 4/72/4 | 2 | 2 | 82 |

TABLE 5

| | Physical properties of grip layer or support layer | | | | | | | |
|---|---|---|---|---|---|---|---|---|
| | Absorbance of infrared ATR method | | | | | Degree of isotactic crystallinity | Degree of polyethylene crystallinity | Surface arithmetic mean roughness |
| | $A_{720}$ | $A_{730}$ | $A_{920}$ | $A_{974}$ | $A_{996}$ | (%) | (%) | Ra (μm) |
| Production Example 1 | 0.002 | — | −0.009 | 0.009 | 0.005 | 57 | — | 0.8 |
| Production Example 2 | 0.003 | — | −0.001 | 0.027 | 0.020 | 50 | — | 0.6 |
| Production Example 3 | 0.001 | — | −0.009 | 0.009 | 0.004 | 51 | — | 0.5 |
| Production Example 4 | 0.002 | — | −0.009 | 0.009 | 0.004 | 51 | — | 0.8 |
| Production Example 5 | 0.003 | — | 0.010 | 0.027 | 0.023 | 53 | — | 0.5 |
| Production Example 6 | 0.003 | — | 0.010 | 0.027 | 0.023 | 53 | — | 0.5 |
| Production Example 7 | 0.003 | — | 0.025 | 0.040 | 0.037 | 60 | — | 0.6 |
| Production Example 8 | 0.003 | — | 0.026 | 0.039 | 0.037 | 60 | — | 0.4 |
| Production Example 9 | 0.003 | — | 0.010 | 0.028 | 0.025 | 61 | — | 0.5 |
| Production Example 10 | 0.018 | — | 0.003 | 0.026 | 0.014 | 21 | — | 0.5 |
| Production Example 11 | 0.011 | — | 0.003 | 0.026 | 0.014 | 21 | — | 0.5 |
| Production Example 12 | 0.003 | — | 0.017 | 0.025 | 0.023 | 49 | — | 0.8 |
| Production Example 13 | 0.004 | — | 0.005 | 0.035 | 0.028 | 52 | — | 0.5 |
| Production Example 14 | 0.004 | — | 0.005 | 0.035 | 0.029 | 55 | — | 0.6 |
| Production Example 15 | 0.005 | — | −0.006 | 0.015 | 0.006 | 32 | — | 0.2 |
| Production Example 16 | 0.007 | — | 0.011 | 0.021 | 0.019 | 53 | — | 0.2 |
| Production Example 17 | 0.004 | — | 0.007 | 0.033 | 0.030 | 64 | — | 0.7 |
| Production Example 18 | 0.003 | — | 0.005 | 0.027 | 0.026 | 72 | — | 0.1 |
| Production Example 19 | 0.003 | — | 0.006 | 0.027 | 0.025 | 68 | — | 0.5 |
| Production Example 20 | 0.003 | — | 0.006 | 0.027 | 0.025 | 70 | — | 0.6 |
| Production Example 21 | — | — | — | — | — | — | — | — |
| Production Example 22 | 0.098 | 0.066 | — | 0.005 | — | — | 67 | 0.5 |
| Production Example 23 | 0.109 | 0.063 | — | 0.005 | — | — | 58 | 0.5 |
| Production Example 24 | 0.105 | 0.050 | — | 0.005 | — | — | 48 | 0.5 |
| Production Example 25 | 0.138 | 0.055 | — | 0.004 | — | — | 40 | 0.5 |
| Production Example 26 | 0.121 | 0.080 | — | 0.003 | — | — | 67 | 0.5 |
| Production Example 27 | 0.100 | 0.062 | — | 0.003 | — | — | 62 | 0.5 |
| Production Example 28 | 0.137 | 0.098 | | 0.006 | — | — | 71 | 0.5 |
| Production Example 29 | 0.110 | 0.075 | — | 0.004 | — | — | 68 | 0.5 |
| Production Example 30 | 0.003 | — | 0.005 | 0.027 | 0.026 | 72 | — | 0.1 |

| | Physical properties of grip layer or support layer | | | | Physical properties of label part | |
|---|---|---|---|---|---|---|
| | Surface | Coefficient of friction on glass plate | | Recording layer | Bending stiffness (Gurley method) (mN) | |
| | resistivity (Ω) | Coefficient of static friction | Coefficient of dynamic friction | Surface resistivity (Ω) | MD direction | TD direction |
| Production Example 1 | 7 × $10^{15}$ | 0.61 | 0.55 | 3 × $10^{12}$ | 0.3 | 0.7 |
| Production Example 2 | 4 × $10^{15}$ | 0.78 | 0.61 | 7 × $10^{9}$ | 0.01 | 0.02 |
| Production Example 3 | 1 × $10^{16}$ | 0.81 | 0.76 | 5 × $10^{9}$ | 0.3 | 0.7 |
| Production Example 4 | 2 × $10^{16}$ | 0.84 | 0.77 | 3 × $10^{9}$ | 0.1 | 0.1 |
| Production Example 5 | 3 × $10^{15}$ | 0.81 | 0.76 | 5 × $10^{14}$ | 0.3 | 0.7 |

TABLE 5-continued

| | | | | | | |
|---|---|---|---|---|---|---|
| Production Example 6 | 1 × $10^{16}$ | 0.81 | 0.76 | 7 × $10^{15}$ | 0.3 | 0.7 |
| Production Example 7 | 4 × $10^{15}$ | 0.98 | 0.87 | 3 × $10^{12}$ | 0.3 | 0.7 |
| Production Example 8 | 3 × $10^{15}$ | 0.98 | 0.91 | 3 × $10^{9}$ | 0.3 | 0.7 |
| Production Example 9 | 7 × $10^{15}$ | 0.57 | 0.43 | 5 × $10^{9}$ | 0.3 | 0.7 |
| Production Example 10 | 4 × $10^{15}$ | 1.23 | 0.76 | 6 × $10^{9}$ | 0.3 | 0.7 |
| Production Example 11 | 3 × $10^{15}$ | 1.60 | 0.76 | 3 × $10^{9}$ | 0.3 | 0.7 |
| Production Example 12 | 2 × $10^{16}$ | 0.64 | 0.51 | 3 × $10^{9}$ | 0.3 | 0.7 |
| Production Example 13 | 6 × $10^{15}$ | 0.76 | 0.65 | 7 × $10^{9}$ | 0.3 | 0.7 |
| Production Example 14 | 5 × $10^{15}$ | 0.80 | 0.78 | 4 × $10^{9}$ | 0.3 | 0.7 |
| Production Example 15 | 8 × $10^{15}$ | 0.89 | 0.51 | 3 × $10^{12}$ | 0.02 | 0.04 |
| Production Example 16 | 4 × $10^{15}$ | 1.04 | 0.63 | 2 × $10^{12}$ | 0.02 | 0.04 |
| Production Example 17 | 4 × $10^{15}$ | 0.70 | 0.50 | 3 × $10^{9}$ | 0.3 | 0.7 |
| Production Example 18 | 2 × $10^{15}$ | 0.49 | 0.31 | 3 × $10^{9}$ | 0.02 | 0.04 |
| Production Example 19 | 3 × $10^{15}$ | 0.42 | 0.24 | 2 × $10^{12}$ | 0.3 | 0.7 |
| Production Example 20 | 5 × $10^{15}$ | 0.42 | 0.24 | 3 × $10^{9}$ | 0.3 | 0.7 |
| Production Example 21 | — | — | — | 3 × $10^{9}$ | 0.2 | 0.5 |
| Production Example 22 | 4 × $10^{15}$ | 0.81 | 0.69 | 5 × $10^{9}$ | 0.3 | 0.7 |
| Production Example 23 | 2 × $10^{15}$ | 1.30 | 0.75 | 8 × $10^{9}$ | 0.3 | 0.7 |
| Production Example 24 | 1 × $10^{16}$ | 1.11 | 0.63 | 5 × $10^{9}$ | 0.3 | 0.7 |
| Production Example 25 | 4 × $10^{15}$ | 1.57 | 0.76 | 5 × $10^{9}$ | 0.3 | 0.7 |
| Production Example 26 | 3 × $10^{15}$ | 0.69 | 0.53 | 7 × $10^{9}$ | 0.3 | 0.7 |
| Production Example 27 | 3 × $10^{15}$ | 0.98 | 0.67 | 4 × $10^{9}$ | 0.3 | 0.7 |
| Production Example 28 | 5 × $10^{15}$ | 0.60 | 0.51 | 3 × $10^{9}$ | 0.3 | 0.7 |
| Production Example 29 | 2 × $10^{16}$ | 0.71 | 0.55 | 3 × $10^{9}$ | 0.3 | 0.7 |
| Production Example 30 | 2 × $10^{15}$ | 0.49 | 0.31 | — | 0.3 | 0.7 |

Production Example 1 of Label Part or Support Part

The resin composition j was melt-kneaded with an extruder set to 230° C., then fed to an extrusion die set to 250° C., and extruded into a sheet shape. This extrudate was cooled to 60° C. in a cooling apparatus to obtain an undrawn sheet. This undrawn sheet was heated to 135° C. and drawn 5-fold in the machine direction (MD) through the use of difference in peripheral speed among rolls. Subsequently, the resin composition a and the resin composition j were separately melt-kneaded with two extruders set to 250° C., and then respectively fed to two extrusion dies set to 250° C. The resin composition a and the resin composition j were extruded into a sheet shape onto one surface and the other surface, respectively, of the 5-fold MD drawn sheet prepared above, and laminated therewith to obtain a laminated sheet having a 3-layer structure.

Subsequently, this laminated sheet was cooled to 60° C., heated again to approximately 155° C. using a tenter oven, and drawn 8.5-fold in the transverse direction (TD), followed by heat treatment by heating to 160° C. Subsequently, this laminated sheet was cooled to 60° C. and trimmed. Then, both surfaces of this laminated sheet were subjected to surface treatment by corona discharge to obtain an 80 μm thick laminated drawn sheet having a 3-layer structure [each layer resin composition (a/j/j), each layer thickness (2 μm/76 μm/2 μm), the number of a draw axis of each layer (uniaxial/biaxial/uniaxial)].

In this laminated drawn sheet, the layer consisting of the resin composition a corresponds to the grip layer, and the layers consisting of the resin composition j corresponds to the label layers.

Subsequently, the surface on the resin composition j side of the laminated drawn sheet was coated with the coating solution for a recording layer obtained in Preparation Example 1 of Recording Layer using a bar coater so as to attain a dry coating thickness of 5 m, dried for 30 seconds in an oven set to 70° C., and then further cured at 40° C. for 8 hours to obtain a label part of Production Example 1 having the recording layer, the label layer, and the grip layer.

Production Example 2 of Label Part or Support Part

An 20 μm thick laminated drawn sheet having a 3-layer structure [each layer resin composition (a/j/j), each layer thickness (3 μm/14 μm/3 μm), the number of a draw axis of each layer (uniaxial/biaxial/uniaxial)] was obtained in the same way as in Production Example 1 of Label Part except that the amount of the resin composition discharged in each extruder was changed in Production Example 1 of Label Part.

Subsequently, the surface on the resin composition j side of the laminated drawn sheet was coated with the coating solution for a recording layer obtained in Preparation Example 2 of Recording Layer using a bar coater so as to attain a dry coating thickness of 2 μm, dried for 30 seconds in an oven set to 70° C., and then further cured at 40° C. for 8 hours to obtain a label part of Production Example 2 having the recording layer, the label layer, and the grip layer.

Production Example 3 of Label Part or Support Part

An 80 μm thick laminated drawn sheet having a 3-layer structure [each layer resin composition (a/j/j), each layer thickness (4 μm/72 μm/4 μm), the number of a draw axis of each layer (uniaxial/biaxial/uniaxial)] was obtained in the same way as in Production Example 2 of Label Part except that the amount of the resin composition discharged in each extruder was changed in Production Example 2 of Label Part.

Subsequently, the surface on the resin composition j side of the laminated drawn sheet was coated with the coating solution for a recording layer obtained in Preparation Example 2 of Recording Layer using a bar coater so as to attain a dry coating thickness of 2 μm, dried for 30 seconds in an oven set to 70° C., and then further cured at 40° C. for 8 hours to obtain a label part of Production Example 3 having the recording layer, the label layer, and the grip layer. This label part was also used as a support part having the recording layer, the support layer, and the grip layer in Example 22 mentioned later.

Production Example 4 of Label Part or Support Part

The resin composition a and the resin composition j were separately melt-kneaded with two extruders set to 250° C., then fed to one coextrusion die set to 250° C., and laminated within the die. Then, this laminate was extruded into a sheet shape. This extrudate was cooled to 60° C. in a cooling apparatus to obtain an undrawn sheet.

Subsequently, both surfaces of this undrawn sheet were subjected to surface treatment by corona discharge to obtain an 80 μm thick laminated sheet having a 2-layer structure [each layer resin composition (a/j), each layer thickness (2 μm/78 μm), the number of a draw axis of each layer (undrawn/undrawn)].

In this laminated sheet, the layer consisting of the resin composition a corresponds to the grip layer, and the layer consisting of the resin composition j corresponds to the label layer.

Subsequently, the surface on the resin composition j side of the laminated sheet was coated with the coating solution for a recording layer obtained in Preparation Example 2 of Recording Layer using a bar coater so as to attain a dry coating thickness of 2 μm, dried for 30 seconds in an oven set to 70° C., and then further cured at 40° C. for 8 hours to obtain a label part of Production Example 4 having the recording layer, the label layer, and the grip layer.

Production Example 5 of Label Part or Support Part

A laminated drawn sheet having a 3-layer structure was obtained in the same way as in Production Example 3 of Label Part.

Subsequently, the surface on the resin composition j side of the laminated drawn sheet was coated with the coating solution for a recording layer obtained in Preparation Example 3 of Recording Layer using a bar coater so as to attain a dry coating thickness of 5 μm, dried for 30 seconds in an oven set to 70° C., and then further cured at 40° C. for 8 hours to obtain a label part of Production Example 5 having the recording layer, the label layer, and the grip layer.

Production Example 6 of Label Part or Support Part

A laminated drawn sheet having a 3-layer structure was obtained in the same way as in Production Example 3 of Label Part. This laminated drawn sheet was directly used as a label part of Production Example 6 having the label layer and the grip layer, without establishing a recording layer thereon.

Production Example 7 of Label Part or Support Part

An 80 μm thick laminated drawn sheet having a 3-layer structure [each layer resin composition (a/j/j), each layer thickness (10 μm/60 μm/10 μm), the number of a draw axis of each layer (uniaxial/biaxial/uniaxial)] was obtained in the same way as in Production Example 1 of Label Part except that the amount of the resin composition discharged in each extruder was changed in Production Example 1 of Label Part.

Subsequently, the surface on the resin composition j side of the laminated drawn sheet was coated with the coating solution for a recording layer obtained in Preparation Example 1 of Recording Layer using a bar coater so as to attain a dry coating thickness of 5 μm, dried for 30 seconds in an oven set to 70° C., and then further cured at 40° C. for 8 hours to obtain a label part of Production Example 7 having the recording layer, the label layer, and the grip layer. This label part was also used as a support part having the recording layer, the support layer, and the grip layer in Example 3 mentioned later.

Production Example 8 of Label Part or Support Part

An 80 μm thick laminated drawn sheet having a 3-layer structure [each layer resin composition (a/j/j), each layer thickness (14 μm/52 μm/14 μm), the number of a draw axis of each layer (uniaxial/biaxial/uniaxial)] was obtained in the same way as in Production Example 2 of Label Part except that the amount of the resin composition discharged in each extruder was changed in Production Example 2 of Label Part.

Subsequently, the surface on the resin composition j side of the laminated drawn sheet was coated with the coating solution for a recording layer obtained in Preparation Example 2 of Recording Layer using a bar coater so as to attain a dry coating thickness of 2 Mm, dried for 30 seconds in an oven set to 70° C., and then further cured at 40° C. for 8 hours to obtain a label part of Production Example 8 having the recording layer, the label layer, and the grip layer.

Production Example 9 of Label Part or Support Part

An 80 μm thick laminated drawn sheet having a 3-layer structure [each layer resin composition (b/j/j), each layer thickness (4 μm/72 μm/4 μm), the number of a draw axis of each layer (uniaxial/biaxial/uniaxial)] was obtained in the same way as in Production Example 3 of Label Part except that the resin composition a used as the grip layer (C) was changed to the resin composition b in Production Example 3 of Label Part.

Subsequently, the surface on the resin composition j side of the laminated drawn sheet was coated with the coating solution for a recording layer obtained in Preparation Example 2 of Recording Layer using a bar coater so as to attain a dry coating thickness of 2 μm, dried for 30 seconds in an oven set to 70° C., and then further cured at 40° C. for 8 hours to obtain a label part of Production Example 9 having the recording layer, the label layer, and the grip layer.

Production Example 10 of Label Part or Support Part

An 80 μm thick laminated drawn sheet having a 3-layer structure [each layer resin composition (c/j/j), each layer thickness (4 μm/72 μm/4 μm), the number of a draw axis of each layer (uniaxial/biaxial/uniaxial)] was obtained in the same way as in Production Example 3 of Label Part except that the resin composition a used as the grip layer (C) was changed to the resin composition c in Production Example 3 of Label Part.

Subsequently, the surface on the resin composition j side of the laminated drawn sheet was coated with the coating solution for a recording layer obtained in Preparation Example 2 of Recording Layer using a bar coater so as to attain a dry coating thickness of 2 μm, dried for 30 seconds in an oven set to 70° C., and then further cured at 40° C. for 8 hours to obtain a label part of Production Example 10 having the recording layer, the label layer, and the grip layer.

Production Example 11 of Label Part or Support Part

An 80 μm thick laminated drawn sheet having a 3-layer structure [each layer resin composition (c/j/j), each layer thickness (10 μm/60 μm/10 μm), the number of a draw axis of each layer (uniaxial/biaxial/uniaxial)] was obtained in the same way as in Production Example 10 of Label Part except that the amount of the resin composition discharged in each extruder was changed in Production Example 10 of Label Part.

Subsequently, the surface on the resin composition j side of the laminated drawn sheet was coated with the coating solution for a recording layer obtained in Preparation Example 2 of Recording Layer using a bar coater so as to attain a dry coating thickness of 2 μm, dried for 30 seconds in an oven set to 70° C., and then further cured at 40° C. for 8 hours to obtain a label part of Production Example 11 having the recording layer, the label layer, and the grip layer.

Production Example 12 of Label Part or Support Part

An 80 μm thick laminated drawn sheet having a 3-layer structure [each layer resin composition (d/j/j), each layer thickness (2 μm/76 μm/2 μm), the number of a draw axis of each layer (uniaxial/biaxial/uniaxial)] was obtained in the same way as in Production Example 1 of Label Part except that the resin composition a used as the grip layer (C) was changed to the resin composition d in Production Example 1 of Label Part.

Subsequently, the surface on the resin composition j side of the laminated drawn sheet was coated with the coating solution for a recording layer obtained in Preparation Example 2 of Recording Layer using a bar coater so as to attain a dry coating thickness of 2 μm, dried for 30 seconds in an oven set to 70° C., and then further cured at 40° C. for 8 hours to obtain a label part of Production Example 12 having the recording layer, the label layer, and the grip layer.

Production Example 13 of Label Part or Support Part

An 80 μm thick laminated drawn sheet having a 3-layer structure [each layer resin composition (d/j/j), each layer thickness (4 μm/72 μm/4 μm), the number of a draw axis of each layer (uniaxial/biaxial/uniaxial)] was obtained in the same way as in Production Example 12 of Label Part except that the amount of the resin composition discharged in each extruder was changed in Production Example 12 of Label Part.

Subsequently, the surface on the resin composition j side of the laminated drawn sheet was coated with the coating solution for a recording layer obtained in Preparation Example 2 of Recording Layer using a bar coater so as to attain a dry coating thickness of 2 μm, dried for 30 seconds in an oven set to 70° C., and then further cured at 40° C. for 8 hours to obtain a label part of Production Example 13 having the recording layer, the label layer, and the grip layer.

Production Example 14 of Label Part or Support Part

An 80 μm thick laminated drawn sheet having a 3-layer structure [each layer resin composition (d/j/j), each layer thickness (10 μm/60 μm/10 μm), the number of a draw axis of each layer (uniaxial/biaxial/uniaxial)] was obtained in the same way as in Production Example 12 of Label Part except that the amount of the resin composition discharged in each extruder was changed in Production Example 12 of Label Part.

Subsequently, the surface on the resin composition j side of the laminated drawn sheet was coated with the coating solution for a recording layer obtained in Preparation Example 2 of Recording Layer using a bar coater so as to attain a dry coating thickness of 0.3 μm, dried for 30 seconds in an oven set to 70° C., and then further cured at 40° C. for 8 hours to obtain a label part of Production Example 14 having the recording layer, the label layer, and the grip layer.

Production Example 15 of Label Part or Support Part

The resin composition e, the resin composition h, and the resin composition i were separately melt-kneaded with three extruders set to 250° C., then fed to one coextrusion die set to 250° C., and laminated within the die. Then, this laminate was extruded into a sheet shape. This extrudate was cooled to 60° C. in a cooling apparatus to obtain an undrawn sheet. This undrawn sheet was heated to 135° C. and drawn 5-fold in the machine direction (MD) through the use of difference in peripheral speed among rolls. Subsequently, this 5-fold MD drawn sheet was cooled to 60° C., heated again to approximately 155° C. using a tenter oven, and drawn 8.5-fold in the transverse direction (TD), followed by heat treatment by heating to 160° C. to obtain a biaxially drawn sheet.

Subsequently, this biaxially drawn sheet was cooled to 60° C. and trimmed. Then, both surfaces of this biaxially drawn sheet were subjected to surface treatment by corona discharge to obtain a 30 m thick laminated drawn sheet having a 3-layer structure [each layer resin composition (e/h/i), each layer thickness (3 μm/24 μm/3 μm), the number of a draw axis of each layer (biaxial/biaxial/biaxial)].

In this laminated drawn sheet, the layer consisting of the resin composition e corresponds to the grip layer, and the layers consisting of the resin composition h and the resin composition i correspond to the label layers.

Subsequently, the surface on the resin composition i side of the laminated drawn sheet was coated with the coating solution for a recording layer obtained in Preparation Example 1 of Recording Layer using a bar coater so as to attain a dry coating thickness of 5 μm, dried for 30 seconds in an oven set to 70° C., and then further cured at 40° C. for 8 hours to obtain a label part of Production Example 15 having the recording layer, the label layer, and the grip layer.

Production Example 16 of Label Part or Support Part

The resin composition f, the resin composition h, and the resin composition i were separately melt-kneaded with three extruders set to 250° C., then fed to one coextrusion die set to 250° C., and laminated within the die. Then, this laminate was extruded into a sheet shape. This extrudate was cooled to 60° C. in a cooling apparatus to obtain an undrawn sheet. This undrawn sheet was heated to 135° C. and drawn 5-fold in the machine direction (MD) through the use of difference in peripheral speed among rolls. Subsequently, this 5-fold MD drawn sheet was cooled to 60° C., heated again to approximately 155° C. using a tenter oven, and drawn 8.5-fold in the transverse direction (TD), followed by heat treatment by heating to 160° C. to obtain a biaxially drawn sheet.

Subsequently, this biaxially drawn sheet was cooled to 60° C. and trimmed. Then, both surfaces of this biaxially drawn sheet were subjected to surface treatment by corona discharge to obtain a 30 μm thick laminated drawn sheet having a 3-layer structure [each layer resin composition (f/h/i), each layer thickness (2 μm/26 μm/2 μm), the number of a draw axis of each layer (biaxial/biaxial/biaxial)].

In this laminated drawn sheet, the layer consisting of the resin composition f corresponds to the grip layer, and the layers consisting of the resin composition h and the resin composition i correspond to the label layers.

Subsequently, the surface on the resin composition i side of the laminated drawn sheet was coated with the coating solution for a recording layer obtained in Preparation Example 1 of Recording Layer using a bar coater so as to attain a dry coating thickness of 5 μm, dried for 30 seconds in an oven set to 70° C., and then further cured at 40° C. for 8 hours to obtain a label part of Production Example 16 having the recording layer, the label layer, and the grip layer.

Production Example 17 of Label Part or Support Part

An 80 μm thick laminated drawn sheet having a 3-layer structure [each layer resin composition (g/j/j), each layer thickness (4 μm/72 μm/4 μm), the number of a draw axis of each layer (uniaxial/biaxial/uniaxial)] was obtained in the same way as in Production Example 3 of Label Part except that the resin composition a used as the grip layer (C) was changed to the resin composition g in Production Example 3 of Label Part.

Subsequently, the surface on the resin composition j side of the laminated drawn sheet was coated with the coating solution for a recording layer obtained in Preparation Example 1 of Recording Layer using a bar coater so as to attain a dry coating thickness of 5 μm, dried for 30 seconds in an oven set to 70° C., and then further cured at 40° C. for 8 hours to obtain a label part of Production Example 17 having the recording layer, the label layer, and the grip layer.

Production Example 18 of Label Part or Support Part

The resin composition h was melt-kneaded with an extruder set to 250° C., then fed to an extrusion die set to 250° C., and extruded into a sheet shape. This extrudate was cooled to 60° C. in a cooling apparatus to obtain an undrawn sheet. This undrawn sheet was heated to 150° C. and drawn 5-fold in the machine direction (MD) through the use of difference in peripheral speed among rolls. Subsequently, this 5-fold MD drawn sheet was cooled to 60° C., heated again to approximately 155° C. using a tenter oven, and drawn 8.5-fold in the transverse direction (TD), followed by heat treatment by heating to 160° C. to obtain a biaxially drawn sheet.

Subsequently, this biaxially drawn sheet was cooled to 60° C. and trimmed. Then, both surfaces of this biaxially drawn sheet were subjected to surface treatment by corona discharge to obtain a 34 μm thick drawn sheet having a single-layer structure [resin composition h alone, the number of a draw axis of the layer (biaxial)].

This drawn sheet had no layer corresponding to the grip layer (C), and consisted of only the label layer consisting of the resin composition h. This drawn sheet was used as a label part of Production Example 18. This drawn sheet was also used as a support part having the support layer in Example 4 mentioned later.

Production Example 19 of Label Part or Support Part

The resin composition j was melt-kneaded with an extruder set to 230° C., then fed to an extrusion die set to 250° C., and extruded into a sheet shape. This extrudate was cooled to 60° C. in a cooling apparatus to obtain an undrawn sheet. This undrawn sheet was heated to 135° C. and drawn 5-fold in the machine direction (MD) through the use of difference in peripheral speed among rolls. Subsequently, the resin composition h and the resin composition j were separately melt-kneaded with two extruders set to 250° C., and then respectively fed to two extrusion dies set to 250° C. The resin composition h and the resin composition j were extruded into a sheet shape onto one surface and the other surface, respectively, of the 5-fold MD drawn sheet prepared above, and laminated therewith to obtain a laminated sheet having a 3-layer structure.

Subsequently, this laminated sheet was cooled to 60° C., heated again to approximately 155° C. using a tenter oven, and drawn 8.5-fold in the transverse direction (TD), followed by heat treatment by heating to 160° C. Subsequently, this laminated sheet was cooled to 60° C. and trimmed. Then, both surfaces of this laminated sheet were subjected to surface treatment by corona discharge to obtain an 80 μm thick laminated drawn sheet having a 3-layer structure (each layer resin composition (h/j/j), each layer thickness (5 μm/70 μm/5 μm), the number of a draw axis of each layer (uniaxial/biaxial/uniaxial)].

In this laminated drawn sheet, all the layers correspond to the support layers, and a layer corresponding to the grip layer is absent.

Subsequently, the surface at the resin composition j side of the laminated drawn sheet was coated with the coating solution for a recording layer obtained in Preparation Example 1 of Recording Layer using a bar coater so as to attain a dry coating thickness of 5 μm, dried for 30 seconds in an oven set to 70° C., and then further cured at 40° C. for 8 hours to obtain a support part of Production Example 19 having the recording layer and the support layer. This laminated drawn sheet was also used as label part having the recording layer and the label layer in Example 22 mentioned later.

Production Example 20 of Label Part or Support Part

An 80 μm thick laminated drawn sheet having a 3-layer structure [each layer resin composition (h/j/j), each layer thickness (4 μm/72 μm/4 μm), the number of a draw axis of each layer (uniaxial/biaxial/uniaxial)] was obtained in the same way as in Production Example 3 of Label Part except that the resin composition a used as the grip layer (C) was changed to the resin composition h in Production Example 3 of Label Part.

In this laminated drawn sheet, all the layers correspond to the label layers, and a layer corresponding to the grip layer is absent.

Subsequently, the surface on the resin composition j side of the laminated drawn sheet was coated with the coating solution for a recording layer obtained in Preparation Example 2 of Recording Layer using a bar coater so as to attain a dry coating thickness of 2 μm, dried for 30 seconds in an oven set to 70° C., and then further cured at 40° C. for 8 hours to obtain a label part of Production Example 20 having the recording layer and the label layer.

Production Example 21 of Label Part or Support Part

The resin composition j was melt-kneaded with an extruder set to 230° C., then fed to an extrusion die set to 250° C., and extruded into a sheet shape. This extrudate was cooled to 60° C. in a cooling apparatus to obtain an undrawn sheet. This undrawn sheet was heated to 135° C. and drawn 5-fold in the machine direction (MD) through the use of difference in peripheral speed among rolls. Subsequently, the resin composition j was melt-kneaded with two extruders set to 250° C., and then fed to two extrusion dies set to 250° C. The resin composition j was extruded into a sheet shape onto both surfaces of the 5-fold MD drawn sheet prepared above, and laminated therewith to obtain a laminated sheet having a 3-layer structure.

Subsequently, this laminated sheet was cooled to 60° C., heated again to approximately 155° C. using a tenter oven, and drawn 8.5-fold in the transverse direction (TD), followed by heat treatment by heating to 160° C. Subsequently, this laminated sheet was cooled to 60° C. and trimmed. Then, both surfaces of this laminated sheet were subjected to surface treatment by corona discharge to obtain a 64 μm thick laminated drawn sheet having a 3-layer structure [each layer resin composition (j/j/j), each layer thickness (4 μm/56 μm/4 μm), the number of a draw axis of each layer (uniaxial/biaxial/uniaxial)].

In this laminated drawn sheet, all the layers correspond to the label layers, and a layer corresponding to the grip layer is absent.

Subsequently, one surface of the drawn sheet was coated with the coating solution for a recording layer obtained in Preparation Example 1 of Recording Layer using a bar coater so as to attain a dry coating thickness of 5 μm, dried for 30 seconds in an oven set to 70° C., and then further cured at 40° C. for 8 hours to obtain a label part of Production Example 21 having the recording layer and the label layer.

Production Example 22 of Label Part or Support Part

An 80 μm thick laminated drawn sheet having a 3-layer structure [each layer resin composition (m/j/j), each layer thickness (4 μm/72 μm/4 μm), the number of a draw axis of each layer (uniaxial/biaxial/uniaxial)] was obtained in the same way as in Production Example 3 of Label Part except that the resin composition a used as the grip layer (C) was changed to the resin composition b in Production Example 3 of Label Part.

Subsequently, the surface on the resin composition j side of the laminated drawn sheet was coated with the coating solution for a recording layer obtained in Preparation Example 2 of Recording Layer using a bar coater so as to attain a dry coating thickness of 2 μm, dried for 30 seconds in an oven set to 70° C., and then further cured at 40° C. for 8 hours to obtain a label part of Production Example 22 having the recording layer, the label layer, and the grip layer.

Production Example 23 of Label Part or Support Part

An 80 μm thick laminated drawn sheet having a 3-layer structure [each layer resin composition (n/j/j), each layer thickness (4 μm/72 μm/4 μm), the number of a draw axis of each layer (uniaxial/biaxial/uniaxial)] was obtained in the same way as in Production Example 3 of Label Part except that the resin composition a used as the grip layer (C) was changed to the resin composition n in Production Example 3 of Label Part.

Subsequently, the surface on the resin composition j side of the laminated drawn sheet was coated with the coating solution for a recording layer obtained in Preparation Example 2 of Recording Layer using a bar coater so as to attain a dry coating thickness of 2 μm, dried for 30 seconds in an oven set to 70° C., and then further cured at 40° C. for 8 hours to obtain a label part of Production Example 23 having the recording layer, the label layer, and the grip layer.

Production Example 24 of Label Part or Support Part

An 80 μm thick laminated drawn sheet having a 3-layer structure [each layer resin composition (o/j/j), each layer thickness (4 μm/72 μm/4 μm), the number of a draw axis of each layer (uniaxial/biaxial/uniaxial)] was obtained in the same way as in Production Example 3 of Label Part except that the resin composition a used as the grip layer (C) in Production Example 3 was changed to the resin composition o in Production Example 2 of Label Part.

Subsequently, the surface on the resin composition j side of the laminated drawn sheet was coated with the coating solution for a recording layer obtained in Preparation Example 2 of Recording Layer using a bar coater so as to attain a dry coating thickness of 2 μm, dried for 30 seconds in an oven set to 70° C., and then further cured at 40° C. for 8 hours to obtain a label part of Production Example 24 having the recording layer, the label layer, and the grip layer.

Production Example 25 of Label Part or Support Part

An 80 μm thick laminated drawn sheet having a 3-layer structure [each layer resin composition (p/j/j), each layer thickness (4 μm/72 μm/4 μm), the number of a draw axis of each layer (uniaxial/biaxial/uniaxial)] was obtained in the same way as in Production Example 3 of Label Part except that the resin composition a used as the grip layer (C) was changed to the resin composition p in Production Example 3 of Label Part.

Subsequently, the surface on the resin composition j side of the laminated drawn sheet was coated with the coating solution for a recording layer obtained in Preparation Example 2 of Recording Layer using a bar coater so as to attain a dry coating thickness of 2 μm, dried for 30 seconds in an oven set to 70° C., and then further cured at 40° C. for 8 hours to obtain a label part of Production Example 25 having the recording layer, the label layer, and the grip layer.

Production Example 26 of Label Part or Support Part

An 80 μm thick laminated drawn sheet having a 3-layer structure [each layer resin composition (q/j/j), each layer thickness (4 μm/72 μm/4 μm), the number of a draw axis of each layer (uniaxial/biaxial/uniaxial)] was obtained in the same way as in Production Example 3 of Label Part except that the resin composition a used as the grip layer (C) in Production Example 3 was changed to the resin composition q in Production Example 2 of Label Part.

Subsequently, the surface on the resin composition j side of the laminated drawn sheet was coated with the coating solution for a recording layer obtained in Preparation Example 2 of Recording Layer using a bar coater so as to attain a dry coating thickness of 2 μm, dried for 30 seconds in an oven set to 70° C., and then further cured at 40° C. for 8 hours to obtain a label part of Production Example 26 having the recording layer, the label layer, and the grip layer.

Production Example 27 of Label Part or Support Part

An 80 μm thick laminated drawn sheet having a 3-layer structure [each layer resin composition (r/j/j), each layer thickness (4 μm/72 μm/4 μm), the number of a draw axis of each layer (uniaxial/biaxial/uniaxial)] was obtained in the same way as in Production Example 3 of Label Part except that the resin composition a used as the grip layer (C) in Production Example 3 was changed to the resin composition r in Production Example 2 of Label Part.

Subsequently, the surface on the resin composition j side of the laminated drawn sheet was coated with the coating solution for a recording layer obtained in Preparation Example 2 of Recording Layer using a bar coater so as to attain a dry coating thickness of 2 μm, dried for 30 seconds in an oven set to 70° C., and then further cured at 40° C. for 8 hours to obtain a label part of Production Example 27 having the recording layer, the label layer, and the grip layer.

Production Example 28 of Label Part or Support Part

An 80 μm thick laminated drawn sheet having a 3-layer structure [each layer resin composition (s/j/j), each layer thickness (4 μm/72 μm/4 μm), the number of a draw axis of each layer (uniaxial/biaxial/uniaxial)] was obtained in the same way as in Production Example 3 of Label Part except that the resin composition a used as the grip layer (C) was changed to the resin composition s in Production Example 3 of Label Part.

Subsequently, the surface on the resin composition j side of the laminated drawn sheet was coated with the coating solution for a recording layer obtained in Preparation Example 2 of Recording Layer using a bar coater so as to attain a dry coating thickness of 2 μm, dried for 30 seconds in an oven set to 70° C., and then further cured at 40° C. for 8 hours to obtain a label part of Production Example 28 having the recording layer, the label layer, and the grip layer.

Production Example 29 of Label Part or Support Part

An 80 μm thick laminated drawn sheet having a 3-layer structure [each layer resin composition (t/j/j), each layer thickness (4 μm/72 μm/4 μm), the number of a draw axis of each layer (uniaxial/biaxial/uniaxial)] was obtained in the same way as in Production Example 3 of Label Part except that the resin composition a used as the grip layer (C) was changed to the resin composition t in Production Example 3 of Label Part.

Subsequently, the surface on the resin composition j side of the laminated drawn sheet was coated with the coating solution for a recording layer obtained in Preparation Example 2 of Recording Layer using a bar coater so as to attain a dry coating thickness of 2 μm, dried for 30 seconds in an oven set to 70° C., and then further cured at 40° C. for 8 hours to obtain a label part of Production Example 29 having the recording layer, the label layer, and the grip layer.

Production Example 30 of Label Part or Support Part

The resin composition h was melt-kneaded with an extruder set to 230° C., then fed to an extrusion die set to 250° C., and extruded into a sheet shape. This extrudate was cooled to 60° C. in a cooling apparatus to obtain an undrawn sheet. This undrawn sheet was heated to 135° C. and drawn 5-fold in the machine direction (MD) through the use of difference in peripheral speed among rolls. Subsequently, the resin composition h was melt-kneaded with two extruders set to 250° C., and then fed to two extrusion dies set to 250° C. The resin composition h was extruded into a sheet shape onto both surfaces of the 5-fold MD drawn sheet prepared above, and laminated therewith to obtain a laminated sheet having a 3-layer structure.

Subsequently, this laminated sheet was cooled to 60° C., heated again to approximately 155° C. using a tenter oven, and drawn 8.5-fold in the transverse direction (TD), followed by heat treatment by heating to 160° C. Subsequently, this laminated sheet was cooled to 60° C. and trimmed. Then, both surfaces of this laminated sheet were subjected to surface treatment by corona discharge to obtain an 80 μm thick laminated drawn sheet having a 3-layer structure [each layer resin composition (h/h/h), each layer thickness (4 μm/72 μm/4 μm), the number of a draw axis of each layer (uniaxial/biaxial/uniaxial)].

In this laminated drawn sheet, all the layers correspond to the resin film layers, and a layer corresponding to the grip layer is absent.

Subsequently, one surface of the drawn sheet was coated with the coating solution for a recording layer obtained in Preparation Example 2 of Recording Layer using a bar coater so as to attain a dry coating thickness of 2 μm, dried for 30 seconds in an oven set to 70° C., and then further cured at 40° C. for 8 hours to obtain a support layer of Production Example 30 having the recording layer and the resin film layer.

Examples and Comparative Examples

Example 1

Figure 13:
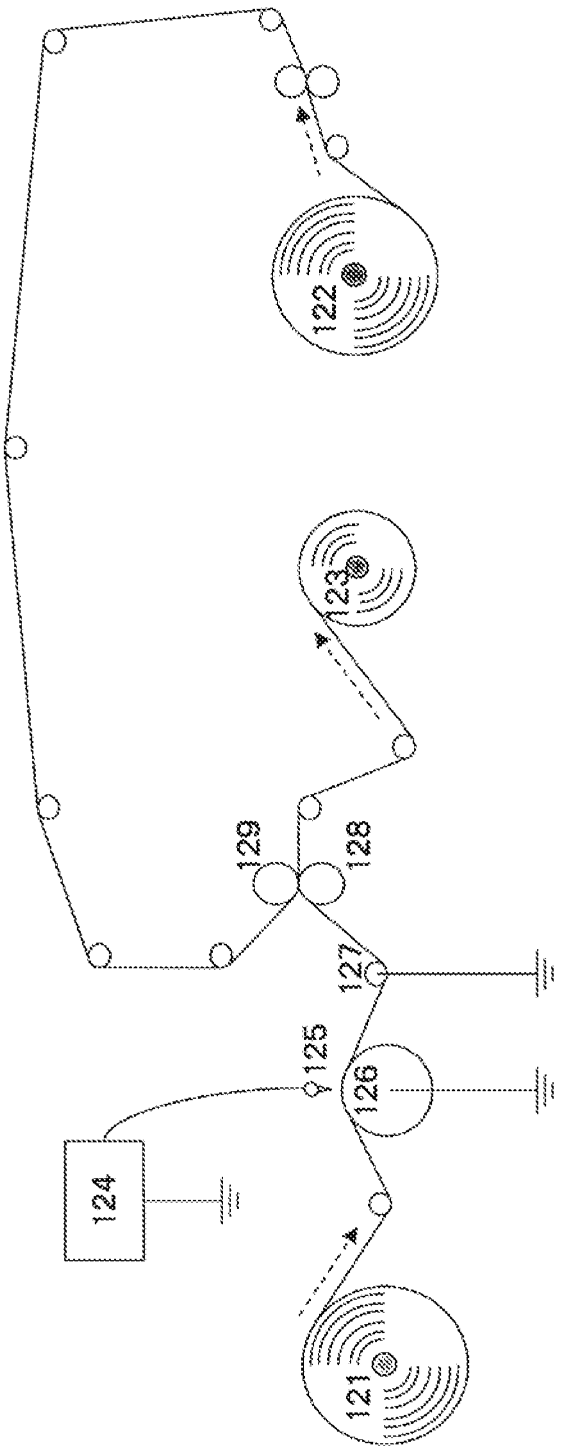
FIG. 13 is a schematic view of an electrostatic adsorbable laminated sheet production apparatus used in Examples.

An electrostatic adsorbable laminated sheet was produced using an electrostatic adsorbable laminated sheet production apparatus schematically shown in FIG. 13. First, the label part obtained in Production Example 1 was rolled out of roll 121, and the surface at the grip layer side (surface at the resin composition a side) of the label part was subjected to charge injection treatment by direct-current corona discharge from direct-current high-voltage power source 124. As for the conditions of the charge injection treatment, the distance between wire-like electrode 125 and counter electrode roll 126 in FIG. 13 was set to 1 cm, and the discharge voltage was set to −15 kV. The label part that underwent charge injection treatment was directed by grounded guide roll 127 and laminated with the support part obtained in Production Example 19, which was rolled out of roll 122. This lamination was carried out such that the surface at the grip layer side of the label part that underwent charge injection treatment, and the surface, at a side which was not the recording layer (surface at the resin composition h side), of the support part were in contact with each other. Further, both the parts were pressure-bonded with press rolls 128 and 129, and the resultant was taken up on roll 123 to obtain an electrostatic adsorbable laminated sheet of Example 1.

The obtained electrostatic adsorbable laminated sheet was subjected to evaluation (displacement in printing and anti-blocking properties) mentioned later in detail. Also, a display material (label part) obtained by peeling from the obtained electrostatic adsorbable laminated sheet was subjected to evaluation (internal charge quantity, adsorbability, adhesiveness, ink adhesiveness, and staining resistance) mentioned later in detail. The results are summarized in Table 6.

Examples 2 to 17, Example 19, Example 21, Example 22, Examples 37 to 45, and Comparative Example 3

Electrostatic adsorbable laminated sheets of Examples 2 to 17, Example 19, Example 21, Example 22, Examples 37 to 45, and Comparative Example 3 were obtained in the same way as in Example 1 except that: in Example 1 of the electrostatic adsorbable laminated sheet, the label part obtained in Production Example 1 and the support part obtained in Production Example 19 were changed to the label part and the support part described in Table 6; the discharge voltage was changed to the discharge voltage described in Table 6; and the surface at the grip layer side or the label layer side of the label part was subjected to charge injection treatment.

Results of evaluating the obtained electrostatic adsorbable laminated sheets and display materials (label parts) are summarized in Table 6.

Example 18

The surface at the recording layer side (surface at a side opposite to the grip layer) of the label part obtained in Production Example 15 was coated with an adhesive for dry lamination (a mixed solution of trade name TM-329 and trade name CAT-18B manufactured by Toyo-Morton, Ltd in equal amounts further diluted to 33% by mass (solid concentration) with ethyl acetate) at a rate of 60 m/min using a gravure coater so as to attain a dry solid content of 2 $g/m^2$ (dry thickness: 2 μm). The adhesive was dried for 10 seconds in an oven of 40° C. to form an adhesive layer. Then, the label part was continuously laminated with the label part obtained in Production Example 21 such that the adhesive layer and the surface at the label layer side (surface at a side opposite to the recording layer) of the label part of Production Example 21 were in contact with each other. Both the parts were pressed with a press roll, then taken up, and further cured at 40° C. for 8 hours to obtain a roll of a label part having a multilayer structure (1/j/j/j/adhesive/1/i/h/e). In this label part (1), the recording layer (A) is represented by 1 as an outermost layer, the label layer (B) is represented by j/j/j/adhesive/1/i/h, and the grip layer (C) is represented by e as an outermost layer.

Subsequently, the surface at the grip layer side (surface at the resin composition e side) of the label part obtained in Production Example 15 in the label part having the multilayer structure described above was subjected to charge injection treatment using the electrostatic adsorbable laminated sheet production apparatus schematically shown in FIG. 13. As for the conditions of the charge injection treatment, the distance between wire-like electrode 125 and counter electrode roll 126 in FIG. 13 was set to 1 cm, and the discharge voltage was set to −25 kV. The multilayer-structure label part that underwent charge injection treatment was laminated such that its surface at the grip layer side and the surface, at a side which was not the recording layer (at the resin composition h side), of the support part obtained in Production Example 19 were in contact with each other. Both the parts were pressure-bonded with press roll 129 to obtain an electrostatic adsorbable laminated sheet of Example 18.

Results of evaluating the obtained electrostatic adsorbable laminated sheet and display material (label part) are summarized in Table 6.

Example 20 and Comparative Example 2

Electrostatic adsorbable laminated sheets of Example 20 and Comparative Example 2 were obtained in the same way as in Example 18 except that: in Example 18 of the electrostatic adsorbable laminated sheet, the label part obtained in Production Example 16 or the label part obtained in Production Example 18 was used as material instead of the label part obtained in Production Example 15 to obtain a label part having a multilayer structure; and the discharge voltage in the processing conditions described in Table 6 was used as the conditions of the charge injection treatment. The charge injection treatment and the lamination for the label part having a multilayer structure in Example 20 were carried out on the surface at the grip layer side (surface at the resin composition f side) of the label part obtained in Production Example 16. The charge injection treatment and the lamination for the label part having a multilayer structure in Comparative Example 2 were carried out on the surface at the label layer side (surface at the resin composition h side) of the label part obtained in Production Example 18.

Results of evaluating the obtained electrostatic adsorbable laminated sheets and display materials (label parts) are summarized in Table 6.

Comparative Example 1

In Example 5 described above, the charge injection treatment was not carried out, and the lamination was carried out such that the surface at the grip layer side (surface at the resin composition a side) of the label part and the surface at the support layer side (surface at the resin composition h side) of the support part were in contact with each other. Both the parts were pressure-bonded with a press roll (29) to obtain a laminated sheet of Comparative Example 1.

Results of evaluating the obtained laminated sheet and display material (label part) are summarized in Table 6.

In the layer configurations in the table, the underlined layers represent the grip layers. The same holds true for the tables described below.

TABLE 6

<table>
<tr><th></th><th colspan="3">Configuration of electrostatic adsorbable laminated sheet</th><th colspan="2">Processing conditions</th><th colspan="2">Results of evaluating electrostatic adsorbable laminated sheet</th><th colspan="6">Results of evaluating label part (display material)</th></tr>
<tr><th></th><th>Label part</th><th>Support part</th><th>Entire layer configuration ("|" represents an electrostatic adsorbable interface, and "AL" represents an adhesive layer)</th><th>Discharge-treated surface</th><th>Discharge voltage (kV)</th><th>Displacement in printing</th><th>Antiblocking properties</th><th>Internal charge quantity (μC/m²)</th><th>Adsorbability (kg/m²)</th><th>Adhesiveness (g/cm²)</th><th>Ink adhesiveness</th><th>Resistance to glass staining</th></tr>
<tr><td>Example 1</td><td>Production Example 1</td><td>Production Example 19</td><td>1/j/j/a|h/j/j/1</td><td>Label part side</td><td>−15</td><td>○</td><td>○</td><td>451</td><td>50</td><td>156</td><td>○</td><td>⊙</td></tr>
<tr><td>Example 2</td><td>Production Example 2</td><td>Production Example 19</td><td>2/j/j/a|h/j/j/1</td><td>Label part side</td><td>−12</td><td>○</td><td>○</td><td>275</td><td>63</td><td>140</td><td>○</td><td>⊙</td></tr>
<tr><td>Example 3</td><td>Production Example 3</td><td>Production Example 7</td><td>2/j/j/a|a/j/j/1</td><td>Label part side</td><td>−15</td><td>○</td><td>○</td><td>276</td><td>57</td><td>681</td><td>○</td><td>⊙</td></tr>
<tr><td>Example 4</td><td>Production Example 3</td><td>Production Example 18</td><td>2/j/j/a|h</td><td>Label part side</td><td>15</td><td>○</td><td>Δ</td><td>318</td><td>32</td><td>210</td><td>○</td><td>⊙</td></tr>
<tr><td>Example 5</td><td>Production Example 3</td><td>Production Example 19</td><td>2/j/j/a|h/j/j/1</td><td>Label part side</td><td>−15</td><td>○</td><td>○</td><td>341</td><td>59</td><td>198</td><td>○</td><td>⊙</td></tr>
<tr><td>Example 6</td><td>Production Example 4</td><td>Production Example 19</td><td>2/j/j/a|h/j/j/1</td><td>Label part side</td><td>−15</td><td>○</td><td>○</td><td>582</td><td>72</td><td>219</td><td>○</td><td>⊙</td></tr>
<tr><td>Example 7</td><td>Production Example 5</td><td>Production Example 19</td><td>3/j/j/a|h/j/j/1</td><td>Label part side</td><td>−15</td><td>○</td><td>Δ</td><td>347</td><td>55</td><td>292</td><td>○</td><td>⊙</td></tr>
<tr><td>Example 9</td><td>Production Example 7</td><td>Production Example 19</td><td>1/j/j/a|h/j/j/1</td><td>Label part side</td><td>−15</td><td>○</td><td>○</td><td>438</td><td>67</td><td>231</td><td>○</td><td>⊙</td></tr>
<tr><td>Example 10</td><td>Production Example 8</td><td>Production Example 19</td><td>2/j/j/a|h/j/j/1</td><td>Label part side</td><td>−15</td><td>○</td><td>○</td><td>438</td><td>63</td><td>220</td><td>○</td><td>⊙</td></tr>
<tr><td>Example 11</td><td>Production Example 9</td><td>Production Example 19</td><td>2/j/j/b|h/j/j/1</td><td>Label part side</td><td>−15</td><td>○</td><td>○</td><td>383</td><td>54</td><td>228</td><td>○</td><td>⊙</td></tr>
<tr><td>Example 12</td><td>Production Example 10</td><td>Production Example 19</td><td>2/j/j/c|h/j/j/1</td><td>Label part side</td><td>−15</td><td>○</td><td>○</td><td>490</td><td>82</td><td>375</td><td>○</td><td>Δ</td></tr>
<tr><td>Example 13</td><td>Production Example 11</td><td>Production Example 19</td><td>2/j/j/c|h/j/j/1</td><td>Label part side</td><td>−15</td><td>○</td><td>○</td><td>489</td><td>81</td><td>371</td><td>○</td><td>Δ</td></tr>
<tr><td>Example 14</td><td>Production Example 12</td><td>Production Example 19</td><td>2/j/j/d|h/j/j/1</td><td>Label part side</td><td>−15</td><td>○</td><td>○</td><td>335</td><td>55</td><td>218</td><td>○</td><td>⊙</td></tr>
<tr><td>Example 15</td><td>Production Example 13</td><td>Production Example 19</td><td>2/j/j/d|h/j/j/1</td><td>Label part side</td><td>−15</td><td>○</td><td>○</td><td>380</td><td>87</td><td>212</td><td>○</td><td>⊙</td></tr>
<tr><td>Example 16</td><td>Production Example 14</td><td>Production Example 19</td><td>2/j/j/d|h/j/j/1</td><td>Label part side</td><td>−15</td><td>○</td><td>○</td><td>397</td><td>59</td><td>282</td><td>○</td><td>⊙</td></tr>
<tr><td>Example 17</td><td>Production Example 15</td><td>Production Example 19</td><td>1/i/h/e|h/j/j/1</td><td>Label part side</td><td>−12</td><td>○</td><td>○</td><td>229</td><td>71</td><td>68</td><td>○</td><td>○</td></tr>
<tr><td>Example 18</td><td>Production Example 21 Production Example 15</td><td>Production Example 19</td><td>1/j/j/j/AL/1/i/h/e|h/j/j/1</td><td>Label part side (Production Example 15 side)</td><td>−25</td><td>○</td><td>○</td><td>600</td><td>63</td><td>230</td><td>○</td><td>○</td></tr>
<tr><td>Example 19</td><td>Production Example 16</td><td>Production Example 19</td><td>1/i/h/f|h/j/j/1</td><td>Label part side</td><td>−12</td><td>○</td><td>○</td><td>278</td><td>59</td><td>70</td><td>○</td><td>⊙</td></tr>
</table>

TABLE 6-continued

| | Configuration of electrostatic adsorbable laminated sheet: Label part | | Configuration of electrostatic adsorbable laminated sheet: Support part | Entire layer configuration ("\|" represents an electrostatic adsorbable interface, and "AL" represents an adhesive layer) | Processing conditions: Discharge-treated surface | Processing conditions: Discharge voltage (kV) | Results of evaluating electrostatic adsorbable laminated sheet: Displacement in printing | Results of evaluating electrostatic adsorbable laminated sheet: Antiblocking properties | Results of evaluating label part (display material): Internal charge quantity ($\mu C/m^2$) | Adsorbability ($kg/m^2$) | Adhesiveness ($g/cm^2$) | Ink adhesiveness | Resistance to glass staining |
|---|---|---|---|---|---|---|---|---|---|---|---|---|---|
| Example 20 | Production Example 21 | Production Example 16 | Production Example 19 | 1/j/j/j/AL/1/i/h/f\|h/j/j/1 | Label part side (Production Example 16 side) | −20 | ○ | ○ | 643 | 65 | 221 | ○ | ⊙ |
| Example 21 | Production Example 17 | | Production Example 19 | 1/j/j/g\|h/j/j/1 | Label part side | 15 | ○ | ○ | 300 | 20 | 200 | ○ | ⊙ |
| Example 22 | Production Example 19 | | Production Example 3 | 1/j/j/h\|a/j/j/2 | Label part side | −15 | ○ | ○ | 312 | 11 | 215 | ○ | ⊙ |
| Example 37 | Production Example 22 | | Production Example 19 | 1/j/j/m\|h/j/j/1 | Label part side | −15 | ○ | ○ | 304 | 82 | 352 | ○ | ⊙ |
| Example 38 | Production Example 23 | | Production Example 19 | 1/j/j/n\|h/j/j/1 | Label part side | −15 | ○ | ○ | 349 | 76 | 321 | ○ | ○ |
| Example 39 | Production Example 24 | | Production Example 19 | 1/j/j/o\|h/j/j/1 | Label part side | −15 | ○ | ○ | 250 | 95 | 495 | ○ | ⊙ |
| Example 40 | Production Example 25 | | Production Example 19 | 1/j/j/p\|h/j/j/1 | Label part side | −15 | ○ | ○ | 220 | 95 | 655 | ○ | ○ |
| Example 41 | Production Example 26 | | Production Example 19 | 1/j/j/q\|h/j/j/1 | Label part side | −15 | ○ | ○ | 218 | 66 | 288 | ○ | ⊙ |
| Example 42 | Production Example 27 | | Production Example 19 | 1/j/j/r\|h/j/j/1 | Label part side | −15 | ○ | ○ | 151 | 87 | 387 | ○ | ○ |
| Example 43 | Production Example 28 | | Production Example 19 | 1/j/j/s\|h/j/j/1 | Label part side | −15 | ○ | ○ | 192 | 93 | 311 | ○ | ⊙ |
| Example 44 | Production Example 29 | | Production Example 19 | 1/j/j/t\|h/j/j/1 | Label part side | −15 | ○ | ○ | 195 | 81 | 335 | ○ | ⊙ |
| Example 45 | Production Example 15 | | Production Example 30 | 1/i/h/e\|h/h/h/2 | Label part side | −12 | ○ | ○ | 255 | 65 | 135 | ○ | ○ |
| Comparative Example 1 | Production Example 3 | | Production Example 19 | 2/j/j/a\|h/j/j/1 | — | 0 | X | ○ | 1 | 0 | 0 | ○ | — |
| Comparative Example 2 | Production Example 21 | Production Example 18 | Production Example 19 | 1/j/j/j/AL/h\|h/j/j/1 | Label part side (Production Example 18 side) | −18 | X | ○ | 491 | 15 | 30 | ○ | ⊙ |
| Comparative Example 3 | Production Example 20 | | Production Example 19 | 2/j/j/h\|h/j/j/1 | Label part side | −15 | X | ○ | 399 | 12 | 25 | ○ | X |

Example 23

Two electrostatic adsorbable laminated sheets of Example 3 were provided. In one of the electrostatic adsorbable laminated sheets, the surface at the recording layer (prepared from the coating solution of Preparation Example 2) side of the label part obtained in Production Example 3 was coated with an adhesive for dry lamination (a mixed solution of trade name TM-329 and trade name CAT-18B manufactured by Toyo-Morton, Ltd in equal amounts further diluted to 33% by mass (solid concentration) with ethyl acetate) at a rate of 60 μm/min using a gravure coater so as to attain a dry solid content of 2 g/$m^2$ (dry thickness: 2 μm). The adhesive was dried for 10 seconds in an oven of 40° C. to form an adhesive layer. Then, the electrostatic adsorbable laminated sheets were laminated such that the adhesive layer and the surface at the recording layer (prepared from the coating solution of Preparation Example 2) side of the other electrostatic adsorbable laminated sheet were in contact with each other. Both the electrostatic adsorbable laminated sheets were pressed with a press roll, then taken up, and further cured at 40° C. for 8 hours to obtain an electrostatic adsorbable laminated sheet of Example 23.

This electrostatic adsorbable laminated sheet has a laminated structure where the support part (2), the label part (3), and the support part (4) are electrostatically adsorbed in this order, and the label part (3) has a multilayer structure (a/j/j/2/adhesive layer/2/j/j/a) with the grip layers (C) and (I) placed on both surfaces. Results of evaluating the obtained electrostatic adsorbable laminated sheet and label part are summarized in Table 7.

Examples 24 to 30 and Comparative Example 4

Electrostatic adsorbable laminated sheets of Examples 24 to 30 and Comparative Example 4 were obtained in the same way as in Example 23 except that: in Example 23 of the electrostatic adsorbable laminated sheet, the electrostatic adsorbable laminated sheets obtained in Examples and Comparative Examples described in Table 7 were used as a material instead of the electrostatic adsorbable laminated sheets of Example 3; and two electrostatic adsorbable laminated sheets were laminated as shown in the entire layer configuration in Table 7.

Results of evaluating the obtained electrostatic adsorbable laminated sheets and display materials are summarized in Table 7.

TABLE 7

<table>
<tr><th></th><th colspan="4">Configuration of electrostatic adsorbable laminated sheet</th></tr>
<tr><th></th><th>Electrostatic adsorbable laminated sheet at support part (2) side</th><th>Adhesive layer thickness (μm)</th><th>Electrostatic adsorbable laminated sheet at support part (4) side</th><th>Entire layer configuration (support part (2)|label layer|support part (4)) ("|" represents an electrostatic adsorbable interface, and "AL" represents an adhesive layer)</th></tr>
<tr><td>Example 23</td><td>Example 3</td><td>2</td><td>Example 3</td><td>1/j/j/a|a/j/j/2/AL/2/j/j/a|a/j/j/1</td></tr>
<tr><td>Example 24</td><td>Example 5</td><td>2</td><td>Example 5</td><td>1/j/j/h|a/j/j/2/AL/2/j/j/a|h/j/j/1</td></tr>
<tr><td>Example 25</td><td>Example 5</td><td>2</td><td>Example 20</td><td>1/j/j/h|a/j/j/2/AL/1/j/j/j/AL/1/i/h/f|h/j/j/1</td></tr>
<tr><td>Example 26</td><td>Example 8</td><td>2</td><td>Example 8</td><td>1/j/j/h|a/j/j/AL/j/j/a|h/j/j/1</td></tr>
<tr><td>Example 27</td><td>Example 15</td><td>2</td><td>Example 15</td><td>1/j/j/h|d/j/j/2/AL/2/j/j/d|h/j/j/1</td></tr>
<tr><td>Example 28</td><td>Example 20</td><td>2</td><td>Example 20</td><td>1/j/j/h|f/h/i/1/AL/j/j/j/1/AL/1/j/j/j/AL/1/i/h/f|h/j/j/1</td></tr>
<tr><td>Example 29</td><td>Example 21</td><td>2</td><td>Example 21</td><td>1/j/j/h|g/j/j/1/AL/1/j/j/g|h/j/j/1</td></tr>
<tr><td>Example 30</td><td>Example 22</td><td>2</td><td>Example 22</td><td>2/j/j/a|h/j/j/1/AL/1/j/j/g|a/j/j/2</td></tr>
<tr><td>Comparative Example 4</td><td>Comparative Example 2</td><td>2</td><td>Comparative Example 2</td><td>1/j/j/h|h/AL/j/j/j/1/AL/1/j/j/j/AL/h|h/j/j/1</td></tr>
</table>

| | Results of evaluating electrostatic adsorbable laminated sheet | | Results of evaluating label part | | | | | |
|---|---|---|---|---|---|---|---|---|
| | | | Label part | Internal charge | Adsorbability ($kg/m^2$) | | Adhesiveness ($g/cm^2$) | |
| | Displacement in printing | Antiblocking properties | Thickness (μm) | quantity ($\mu C/m^2$) | (2) side | (4) side | (2) side | (4) side |
| Example 23 | ○ | ○ | 166 | 28 | 61 | 52 | 432 | 467 |
| Example 24 | ○ | ○ | 166 | 20 | 59 | 63 | 219 | 212 |
| Example 25 | ○ | ○ | 185 | 340 | 55 | 49 | 304 | 212 |
| Example 26 | ○ | ○ | 162 | 19 | 48 | 39 | 297 | 241 |
| Example 27 | ○ | ○ | 166 | 22 | 69 | 66 | 276 | 247 |
| Example 28 | ○ | ○ | 204 | 19 | 58 | 59 | 179 | 233 |
| Example 29 | Δ | ○ | 172 | 38 | 62 | 52 | 159 | 173 |
| Example 30 | ○ | ○ | 166 | 17 | 55 | 42 | 248 | 263 |
| Comparative Example 4 | X | ○ | 208 | 27 | 10 | 5 | 17 | 12 |

Example 31

Silicone-treated glassine paper (trade name: G7B, manufactured by Oji Tac Co., Ltd.) was used as a peelable sheet layer. Its silicone-treated surface was coated with a mixed solution containing 100 parts by mass of a solvent-type acrylic pressure-sensitive adhesive (trade name: ORIBAIN BPS1109, manufactured by Toyochem Co., Ltd.) and 3 parts by mass of an isocyanate-type cross-linking agent (trade name: ORIBAIN BHS8515, manufactured by Toyochem Co., Ltd.) using a comma coater so as to attain a dry solid content of 25 g/$m^2$ (thickness: 25 μm). The pressure-sensitive adhesive was dried for 10 seconds in an oven of 40° C. to form a pressure-sensitive adhesive layer.

Subsequently, the electrostatic adsorbable laminated sheet of Example 5 was provided. The coated paper and the electrostatic adsorbable laminated sheet were laminated such that the pressure-sensitive adhesive layer and the surface at the recording layer (prepared from the coating solution of Preparation Example 2) side of the label part obtained in Production Example 3 in the electrostatic adsorbable laminated sheet were in contact with each other. The electrostatic adsorbable laminated sheet and the glassine paper were pressed with a press roll, then taken up, and further cured at 40° C. for 8 hours to obtain an electrostatic adsorbable laminated sheet of Example 31.

This electrostatic adsorbable laminated sheet has a laminated structure where the support part (2), the label part (5) having the pressure-sensitive adhesive layer (M), and the peelable sheet layer (protective layer (4)) are laminated in this order, and has a laminated structure where the support part (2) and the label part (5) are electrostatically adsorbed to each other, and the label part (5) and the peelable sheet layer are laminated with each other through the tackiness of the pressure-sensitive adhesive layer (M).

Results of evaluating the obtained electrostatic adsorbable laminated sheet and label part are summarized in Table 8.

Example 32

A pressure-sensitive adhesive layer was formed on a peelable sheet layer in the same way as in Example 31.

Subsequently, the label part of Production Example 6 was provided. The coated paper and the label part were laminated such that the pressure-sensitive adhesive layer and the surface at the label layer side (at the resin composition j side) of the label part were in contact with each other. The label part and the glassine paper were pressed with a press roll, then taken up, and further cured at 40° C. for 8 hours to obtain an adhesive label part.

Subsequently, the surface at the grip layer side (at the resin composition a side) of the adhesive label part described above was subjected to charge injection treatment using the electrostatic adsorbable laminated sheet production apparatus schematically shown in FIG. 13. As for the conditions of the charge injection treatment, the distance between wire-like electrode 125 and counter electrode roll 126 in FIG. 13 was set to 1 cm, and the discharge voltage was set to −25 kV. The label part that underwent charge injection treatment was laminated such that its surface at the grip layer side and the surface, at a side which was not the recording layer (at the resin composition h side), of the support part obtained in Production Example 19 were in contact with each other. Both the parts were pressure-bonded with press roll 129 to obtain an electrostatic adsorbable laminated sheet of Example 32.

This electrostatic adsorbable laminated sheet has a laminated structure equivalent to that of Example 31, and has a laminated structure where the support part (2) and the label part (5) are electrostatically adsorbed to each other, and the label part (5) and the peelable sheet layer (protective layer (4)) are laminated with each other through the tackiness of the pressure-sensitive adhesive layer (M).

Results of evaluating the obtained electrostatic adsorbable laminated sheet and label part are summarized in Table 8.

Examples 33 to 36 and Comparative Example 5

Electrostatic adsorbable laminated sheets of Examples 33 to 36 and Comparative Example 5 were obtained in the same way as in Example 31 except that: in Example 31 described above, the electrostatic adsorbable laminated sheets obtained in Examples and Comparative Examples described in Table 8 were used as a material instead of the electrostatic adsorbable laminated sheet of Example 5; and the lamination was carried out as shown in the entire layer configuration in Table 8.

Results of evaluating the obtained electrostatic adsorbable laminated sheets and display materials are summarized in Table 8.

TABLE 8

| | Configuration of electrostatic adsorbable laminated sheet | | | |
|---|---|---|---|---|
| | Electrostatic adsorbable laminated sheet at support part (2) side (support part + label part) | Pressure-sensitive adhesive layer thickness (μm) | Peelable sheet layer | Entire layer configuration (support layer\|label layer/PSAL/peelable sheet layer) ("\|" represents an electrostatic adsorbable interface, "AL" represents an adhesive layer, and "PSAL" represents a pressure-sensitive adhesive layer) |
| Example 31 | Example 5 | 25 | Silicone-treated glassine paper | 1/j/j/h\|a/j/j/2/PSAL/glassine paper |
| Example 32 | Production Example 19 + Production Example 6 | 25 | Silicone-treated glassine paper | 1/j/j/h\|a/j/j/PSAL/glassine paper |
| Example 33 | Example 15 | 25 | Silicone-treated glassine paper | 1/j/j/h\|d/j/j/2/PSAL/glassine paper |
| Example 34 | Example 20 | 25 | Silicone-treated glassine paper | 1/j/j/h\|f/h/i/1/AL/j/j/j/1/PSAL/glassine paper |
| Example 35 | Example 21 | 25 | Silicone-treated glassine paper | 1/j/j/h\|g/j/j/1/PSAL/glassine paper |
| Example 36 | Example 22 | 25 | Silicone-treated glassine paper | 2/j/j/a\|h/j/j/1/PSAL/glassine paper |

TABLE 8-continued

| | | | | |
|---|---|---|---|---|
| Comparative Example 5 | Comparative Example 3 | 25 | Silicone-treated glassine paper | 1/j/j/h\|h/j/j/2/PSAL/glassine paper |

| | Processing conditions | | Results of evaluating electrostatic adsorbable laminated sheet | | Results of evaluating label part | | |
|---|---|---|---|---|---|---|---|
| | Order of processing | Discharge voltage (kV) | Displacement in printing | Antiblocking properties | Internal charge quantity (μC/m$^2$) | Adsorbability (kg/m$^2$) | Adhesiveness (g/cm$^2$) |
| Example 31 | Adhesive processing after electrostatically charge | −15 | ○ | ○ | 399 | 52 | 242 |
| Example 32 | Electrostatically charge after adhesive processing | −25 | ○ | ○ | 422 | 51 | 232 |
| Example 33 | Adhesive processing after electrostatically charge | −15 | ○ | ○ | 302 | 52 | 247 |
| Example 34 | Adhesive processing after electrostatically charge | −20 | ○ | ○ | 590 | 63 | 265 |
| Example 35 | Adhesive processing after electrostatically charge | −15 | ○ | ○ | 493 | 47 | 151 |
| Example 36 | Adhesive processing after electrostatically charge | 15 | Δ | ○ | 384 | 10 | 282 |
| Comparative Example 5 | Adhesive processing after electrostatically charge | −15 | X | ○ | 320 | 12 | 20 |

Example 46

One surface of an ethylene-tetrafluoroethylene copolymer film (trade name: NEOFLON ETFE, manufactured by Daikin Industries, Ltd.) of 50 μm in thickness was subjected to charge injection treatment by direct-current corona discharge. As for the conditions of the charge injection treatment, the discharge voltage was set to −15 kV. The corona discharge-treated surface was directly coated with a one-solvent acrylic pressure-sensitive adhesive of strong tack type (trade name: ORIBAIN BPS5160, manufactured by Toyochem Co., Ltd.) using a comma coater so as to attain a dry thickness of 25 μm. An adhesion layer was formed by drying to obtain a film as a protective layer (A).

Subsequently, the electrostatic adsorbable laminated sheet of Example 5 was provided. The film and the electrostatic adsorbable laminated sheet were laminated such that the adhesion layer side of the protective layer (A) and the surface at the recording layer (prepared from the coating solution of Preparation Example 2) side of the label part obtained in Production Example 3 in the electrostatic adsorbable laminated sheet were in contact with each other. The electrostatic adsorbable laminated sheet and the protective layer (A) were pressure-bonded with a press roll to obtain an electrostatic adsorbable laminated sheet (whiteboard) of Example 46.

In the electrostatic adsorbable laminated sheet of Example 46, the label part obtained in Production Example 3 and the support part obtained in Production Example 19 were subjected to electrostatically charge and then laminated with each other, and then, the obtained electrostatic adsorbable laminated sheet was further provided with the protective layer (A).

Results of evaluating the obtained electrostatic adsorbable laminated sheet and label part are summarized in Table 10.

Example 47

A fluororesin coating material (trade name: ZEFFLE GK570, manufactured by Daikin Industries, Ltd.) and a curing agent (trade name: CORONATE HX, manufactured by Nippon Polyurethane Industry Co., Ltd.) were mixed at a mass ratio of 100:15 to prepare a coating solution for a protective layer. One surface of a biaxially drawn PET film of 100 μm in thickness (trade name: O300, manufactured by Mitsubishi Plastics, Inc.) was coated with this coating solution for a protective layer so as to attain a dry coating amount of 2 g/m$^2$, and dried to form a coat layer. Further, the other surface of the film was directly coated with a one-solvent acrylic pressure-sensitive adhesive of strong tack type (trade name: ORIBAIN BPS5160, manufactured by Toyochem Co., Ltd.) using a comma coater so as to attain a dry thickness of 25 μm. An adhesion layer was formed by drying to obtain a film as a protective layer (B).

Subsequently, the electrostatic adsorbable laminated sheet of Example 5 was provided. The film and the electrostatic adsorbable laminated sheet were laminated such that the adhesion layer side of the protective layer (B) and the surface at the recording layer (prepared from the coating solution of Preparation Example 2) side of the label part obtained in Production Example 3 in the electrostatic adsorbable laminated sheet were in contact with each other. The electrostatic adsorbable laminated sheet and the protective layer (B) were pressure-bonded with a press roll to obtain an electrostatic adsorbable laminated sheet (whiteboard) of Example 47.

In the electrostatic adsorbable laminated sheet of Example 47, the label part obtained in Production Example 3 and the support part obtained in Production Example 19 were subjected to electrostatically charge and then laminated with each other, and then, the obtained electrostatic adsorbable laminated sheet was further provided with the protective layer (B).

Results of evaluating the obtained electrostatic adsorbable laminated sheet and label part are summarized in Table 10.

Example 48

A coating solution for a protective layer was prepared in the same way as in the preparation of the coating solution for a protective layer obtained in Example 47. The surface at the recording layer (prepared from the coating solution of Preparation Example 2) side of the label part obtained in Production Example 3 in the electrostatic adsorbable laminated sheet obtained in Example 5 was directly coated with the coating solution for a protective layer using a bar coater so as to attain a dry thickness of 2 μm. A protective layer (C) was formed as a coat layer by drying to obtain an electrostatic adsorbable laminated sheet (whiteboard) of Example 48.

In the electrostatic adsorbable laminated sheet of Example 48, the label part obtained in Production Example 3 and the support part obtained in Production Example 19 were subjected to electrostatically charge and then laminated with each other, and then, the obtained electrostatic adsorbable laminated sheet was further provided with the protective layer (C).

Results of evaluating the obtained electrostatic adsorbable laminated sheet and label part are summarized in Table 10.

Example 49

An electrostatic adsorbable laminated sheet (whiteboard) of Example 49 was obtained in the same way as in Example 46 except that in Example 46 of the electrostatic adsorbable laminated sheet, the lamination was carried out such that the adhesion layer side of the protective layer (A) and the surface at the recording layer (prepared from the coating solution of Preparation Example 1) side of the supporting part obtained in Production Example 19 of the electrostatic adsorbable laminated sheet were in contact with each other.

In the electrostatic adsorbable laminated sheet of Example 49, the label part obtained in Production Example 3 and the support part obtained in Production Example 19 were subjected to electrostatically charge and then laminated with each other, and then, the obtained electrostatic adsorbable laminated sheet was further provided with the protective layer (A).

Results of evaluating the obtained electrostatic adsorbable laminated sheet and label part are summarized in Table 10.

Example 50

A protective layer (A) was prepared in the same way as in the protective layer (A) obtained in Example 46.

Subsequently, the label part of Production Example 3 was provided. The protective layer and the label part were laminated such that the adhesion layer side of the protective layer (A) and the recording layer (prepared from the coating solution of Preparation Example 2) side of the label part obtained in Production Example 3 were in contact with each other. The label part and the protective layer (A) were pressure-bonded with a press roll to obtain an electrostatic adsorbable laminated sheet with the protective layer (A) disposed on the label part of Production Example 3.

Subsequently, an electrostatic adsorbable laminated sheet of Example 50 was produced using the electrostatic adsorbable laminated sheet production apparatus schematically shown in FIG. 13. First, the electrostatic adsorbable laminated sheet with the protective layer (A) disposed on the label part of Production Example 3 was rolled out of roll 121, and the surface at the grip layer side (surface at the resin composition a side) of the electrostatic adsorbable laminated sheet was subjected to charge injection treatment by direct-current corona discharge from direct-current high-voltage power source 124. As for the conditions of the charge injection treatment, the distance between wire-like electrode 125 and counter electrode roll 126 in FIG. 13 was set to 1 cm, and the discharge voltage was set to −15 kV. The electrostatic adsorbable laminated sheet that underwent charge injection treatment was directed by grounded guide roll 127 and laminated with the support part obtained in Production Example 19, which was rolled out of roll 122. This lamination was carried out such that the surface at the grip layer side of the electrostatic adsorbable laminated sheet that underwent charge injection treatment, and the surface, at a side which was not the recording layer (surface at the resin composition h side), of the support part were in contact with each other. Further, the electrostatic adsorbable laminated sheet and the support part were pressure-bonded between press rolls 128 and 129, and the resultant was taken up on roll 123 to obtain an electrostatic adsorbable laminated sheet (whiteboard) of Example 50.

In the electrostatic adsorbable laminated sheet of Example 50, the label part obtained in Production Example 3 was provided with the protective layer (A), then further subjected to electrostatically charge, and then laminated with the support part obtained in Production Example 19.

Results of evaluating the obtained electrostatic adsorbable laminated sheet and label part are summarized in Table 10.

Comparative Example 6

An electrostatic adsorbable laminated sheet (whiteboard) of Comparative Example 6 was obtained in the same way as in Example 46 except that: in Example 46 of the electrostatic adsorbable laminated sheet, the electrostatic adsorbable laminated sheet of Example 5 was changed to the electrostatic adsorbable laminated sheet of Comparative Example 3; and the lamination was carried out such that the adhesion layer side of the protective layer (A) and the surface at the recording layer (prepared from the coating solution of Preparation Example 2) side of the supporting part obtained in Production Example 20 of the electrostatic adsorbable laminated sheet were in contact with each other.

In the electrostatic adsorbable laminated sheet of Comparative Example 6, the label part obtained in Production Example 20 and the support part obtained in Production Example 19 were subjected to electrostatically charge and then laminated with each other, and then, the obtained electrostatic adsorbable laminated sheet was further provided with the protective layer (A).

Results of evaluating the obtained electrostatic adsorbable laminated sheet and label part are summarized in Table 10.

Production Examples of the protective layers (A) to (C) are shown in Table 9.

TABLE 9

| Protective layer | Contents | Thickness (mm) |
|---|---|---|
| A | Film with an adhesion layer formed by directly coating the corona discharge-treated surface of an ethylene-tetrafluoroethylene copolymer film of 50 μm in thickness [manufactured by Daikin Industries, Ltd./trade name: NEOFLON ETFE] with a one-solvent acrylic pressure-sensitive adhesive of strong tack type [manufactured by Toyochem Co., Ltd./ORIBAIN BPS5160] using a comma coater so as to attain a dry thickness of 25 μm, followed by drying. | 75 |
| B | Film with an adhesion layer formed by coating one surface of an axially drawn PET film of 100 μm in thickness [manufactured by Mitsubishi Plastics, Inc./trade name: O300] with a 100:15 mixture of a fluororesin coating material [manufactured by Daikin Industries, Ltd./trade name: ZEFFLE GK570] and a curing agent [manufactured by Nippon Polyurethane Industry Co., Ltd./trade name: CORONATE HX] so as to attain a dry coating amount of 2 g/m$^2$, and directly coating another surface of the film with a one-solvent acrylic pressure-sensitive adhesive of strong tack type [manufactured by Toyochem Co., Ltd./ORIBAIN BPS5160] using a comma coater so as to attain a dry thickness of 25 μm, followed by drying. | 127 |
| C | 100:15 mixed solution of a fluororesin coating material [manufactured by Daikin Industries, Ltd./trade name: ZEFFLE GK570] and a curing agent [manufactured by Nippon Polyurethane Industry Co., Ltd./trade name: CORONATE HX] | — |

TABLE 10

| | Configuration of electrostatic adsorbable laminated sheet | | | | |
|---|---|---|---|---|---|
| | Electrostatic adsorbable laminated sheet at support part (2) side (support part + label part) | Protective layer | Entire layer configuration (support part\|label part/PSAL/protective layer) ("\|" represents an electrostatic adsorbable interface) | Processing conditions: Order of processing | Processing conditions: Discharge voltage (kV) |
| Example 46 | Example 5 | A | 1/j/j/h\|a/j/j/2/A | Adhesive processing after electrostatically charge | −15 |
| Example 47 | Example 5 | B | 1/j/j/h\|a/j/j/2/B | Adhesive processing after electrostatically charge | −15 |
| Example 48 | Example 5 | C | 1/j/j/h\|a/j/j/2/C | Adhesive processing after electrostatically charge | −15 |
| Example 49 | Example 5 | A | 2/j/j/a\|h/j/j/1/A | Adhesive processing after electrostatically charge | −15 |
| Comparative Example 6 | Comparative Example 3 | A | 1/j/j/h\|h/j/j/2/A | Adhesive processing after electrostatically charge | 15 |

| | Results of evaluating electrostatic adsorbable laminated sheet | | Results of evaluating label part | | | |
|---|---|---|---|---|---|---|
| | Displacement in printing | Antiblocking properties | Internal charge quantity (μC/m$^2$) | Adsorbability (kg/m$^2$) | Adhesiveness (g/cm$^2$) | Written image erasability |
| Example 46 | ○ | ○ | 400 | 50 | 240 | ○ |
| Example 47 | ○ | ○ | 420 | 60 | 230 | ○ |
| Example 48 | ○ | ○ | 300 | 60 | 250 | ○ |
| Example 49 | ○ | ○ | 400 | 20 | 250 | ○ |
| Comparative Example 6 | X | ○ | 320 | 20 | 50 | ○ |

REFERENCE SIGNS LIST

1 to 10, 1*a*, 1*b*, 2*a*, and 2*b*: Electrostatic adsorbable laminated sheet
11, 11*a*, 12, and 12*a*: Label layer (1)
11*b* and 12*b*: Label layer (6)
13 and 13*a*: Recording layer (A)
13*b*: Recording layer (G)
14 and 14*a*: Resin film layer (B)
14*b*: Resin film layer (H)
15 and 15*a*: Grip layer (C)
15*b*: Grip layer (I)
21, 21*a*, 22, 22*a*, 23, and 24: Support layer (2)
21*b*, 22*b*, and 61: Support layer (4)
25 and 25*a*: Resin film layer (D)
25*b*: Resin film layer (J)
26: Grip layer (E)
26*b*: Grip layer (K)
27: Recording layer (F)
31, 31*a*, 32, 32*a*, 33, 34, 35, and 36: Electrostatic adsorbable interface (N)
31*b* and 32*b*: Electrostatic adsorbable interface (O)
41 and 42: Label layer (3)
43: Adhesive layer (L)
51 and 52: Label layer (5)
53: Pressure-sensitive adhesive layer (M)
62: Peelable sheet layer (P)
201, 202, and 203: Electrostatic adsorbable laminated sheet
211 and 212: Label part
213, 227, and 229: Recording layer
214: Label layer
221 and 222: Support part
225 and 228: Support layer
231, 232, 233, and 234: Electrostatic adsorbable interface
271 and 272: Grip layer
281 and 282: Protective layer
291: Pressure-sensitive adhesive layer

The invention claimed is:

1. An electrostatic adsorbable laminated sheet comprising
a label layer, a support layer, and a grip layer disposed between the label layer and the support layer, wherein
the grip layer comprises a polyolefin resin selected from a polypropylene resin and a polyethylene resin,
the label layer and the support layer are electrostatically adsorbed to each other via the grip layer, and
an adhesiveness between the label layer and the support layer is 60 g/cm$^2$ or more.

2. The electrostatic adsorbable laminated sheet according to claim 1, further comprising
a second grip layer disposed between the grip layer and the support layer, wherein
the grip layer and the second grip layer are electrostatically adsorbed to each other.

3. The electrostatic adsorbable laminated sheet according to claim 1, further comprising
a second support layer placed on a surface, opposite to the surface where the support layer is placed, of the label layer, and a grip layer disposed between the label layer and the second support layer, wherein
the label layer and the second support layer are electrostatically adsorbed to each other via the grip layer disposed between the label layer and the second support layer.

4. The electrostatic adsorbable laminated sheet according to claim 1, further comprising
a pressure-sensitive adhesive layer at the outer side of the label layer.

5. The electrostatic adsorbable laminated sheet according to claim 4, further comprising
a protective layer as an outermost layer at the label layer side or the pressure-sensitive adhesive layer side.

6. The electrostatic adsorbable laminated sheet according to claim 1, wherein the label layer is a layer containing a thermoplastic resin.

7. The electrostatic adsorbable laminated sheet according to claim 1, wherein
the grip layer satisfies the following conditions (1) and/or (2):
(1) the grip layer comprises a propylene resin, wherein when maximum values of absorbance in the ranges of 920±0.5 cm$^{-1}$, 974±0.5 cm$^{-1}$, and 998±0.5 cm$^{-1}$ measured on the grip layer surface by ATR infrared spectroscopy are defined as $A_{920}$, $A_{974}$, and $A_{998}$, respectively, a degree of isotactic crystallinity of the grip layer determined according to the following (Expression 1) is 20 to 65%:

$$\text{Degree of isotactic crystallinity (\%)}=109\times(A_{998}-A_{920})/(A_{974}-A_{920})-31.4 \quad \text{(Expression 1); and}$$

(2) the grip layer comprises an ethylene resin, wherein when maximum values of absorbance in the ranges of 731±1 cm$^{-1}$ and 720±1 cm$^{-1}$ measured on the grip layer surface by ATR infrared spectroscopy are defined as $A_{731}$ and $A_{720}$, respectively, a degree of polyethylene crystallinity of the grip layer determined according to the following (Expression 2) is 20 to 85%:

$$\text{Degree of polyethylene crystallinity (\%)}=100\times(A_{731}/A_{720}) \quad \text{(Expression 2),}$$

except that in the case where the grip layer satisfies the conditions (1) and (2), the condition (1) is applied when $A_{720}/A_{974}$ is less than 1.0, and the condition (2) is applied when $A_{720}/A_{974}$ is 1.0 or more.

8. The electrostatic adsorbable laminated sheet according to claim 1, wherein arithmetic mean roughness (Ra) of at least one surface of the grip layer measured according to JIS B0601: 2003 is 0.1 to 1.0 μm.

9. The electrostatic adsorbable laminated sheet according to claim 1, wherein surface resistivity of at least one surface of the grip layer measured according to JIS C2151: 2006 is $1\times10^{13}$ to $9\times10^{17}\Omega$.

10. The electrostatic adsorbable laminated sheet according to claim 1, wherein bending stiffness (Gurley method) of the label layer and the grip layer, or the label layer and the support layer measured according to bending repulsion method A of JIS L1096: 2010 is 0.05 to 10 mN.

11. A display material comprising
a label layer, and a grip layer in contact with the label layer, wherein
the grip layer comprises a polyolefin resin selected from a polypropylene resin and a polyethylene resin,
the display material has electrostatic adsorbability, and
the grip layer satisfies the following conditions (1) and/or (2):
(1) the grip layer comprises a propylene resin, wherein when maximum values of absorbance in the ranges of 920±0.5 cm$^{-1}$, 974±0.5 cm$^{-1}$, and 998±0.5 cm$^{-1}$ measured on the grip layer surface by ATR infrared spectroscopy are defined as $A_{920}$, $A_{974}$, and $A_{998}$, respectively, a degree of isotactic crystallinity of the grip layer determined according to the following (Expression 1) is 20 to 65%:

$$\text{Degree of isotactic crystallinity (\%)}=109\times(A_{998}-A_{920})/(A_{974}-A_{920})-31.4 \quad \text{(Expression 1); and}$$

(2) the grip layer comprises an ethylene resin, wherein when maximum values of absorbance in the ranges of 731±1 $cm^{-1}$ and 720±1 $cm^{-1}$ measured on the grip layer surface by ATR infrared spectroscopy are defined as $A_{731}$ and $A_{720}$, respectively, a degree of polyethylene crystallinity of the grip layer determined according to the following (Expression 2) is 20 to 85%:

$$\text{Degree of polyethylene crystallinity (\%)} = 100 \times (A_{731}/A_{720}) \quad \text{(Expression 2)},$$

except that in the case where the grip layer satisfies the conditions (1) and (2), the condition (1) is applied when $A_{720}/A_{974}$ is less than 1.0, and the condition (2) is applied when $A_{720}/A_{974}$ is 1.0 or more.

12. The electrostatic adsorbable laminated sheet according to claim 1, wherein the grip layer comprises a propylene resin having an endothermic peak at 120° C. to 180° C. and a resin having no endothermic peak at 0° C. to 200° C.

* * * * *